United States Patent [19]

Mathur

[11] Patent Number: 5,008,814
[45] Date of Patent: Apr. 16, 1991

[54] METHOD AND APPARATUS FOR UPDATING SYSTEM SOFTWARE FOR A PLURALITY OF DATA PROCESSING UNITS IN A COMMUNICATION NETWORK

[75] Inventor: Ashish Mathur, Sunnyvale, Calif.

[73] Assignee: Network Equipment Technologies, Inc., Redwood City, Calif.

[21] Appl. No.: 232,293

[22] Filed: Aug. 15, 1988

[51] Int. Cl.⁵ .................... G06F 15/00; G06F 11/00
[52] U.S. Cl. .................... 364/200; 364/269.2; 364/284.4; 364/285.4; 364/286; 371/19
[58] Field of Search ... 364/200 MS File, 900 MS File, 364/300; 371/19

[56] References Cited

U.S. PATENT DOCUMENTS

| | | | |
|---|---|---|---|
| 3,969,723 | 7/1976 | Kennicott | 364/200 |
| 4,694,003 | 9/1987 | Kerr et al. | 371/19 |
| 4,714,992 | 12/1987 | Gladney et al. | 364/200 |
| 4,755,995 | 7/1988 | Anderson et al. | 371/19 X |
| 4,788,637 | 11/1988 | Tomaru | 364/200 |
| 4,797,885 | 11/1989 | Orimo et al. | 371/19 |
| 4,803,683 | 2/1989 | Mori et al. | 371/19 |
| 4,809,170 | 2/1989 | Leblang et al. | 364/200 |
| 4,823,261 | 4/1989 | Bank et al. | 364/200 |

Primary Examiner—Thomas C. Lee
Attorney, Agent, or Firm—Fliesler, Dubb, Meyer & Lovejoy

[57] ABSTRACT

In maintaining a communication network of processing units distributed in multiple nodes linked by communication channels, system software in a plurality of data processing units is updated by first installing the updated software in a first node. The updated software is transmitted through the network to other nodes. A trial use of the updated software is initiated in the nodes. If failures of the updated software are detected in a node, that node will be restored to the original software version. If the trial use of the updated software is completed successfully in a node, the updated version will be installed as a preferred operational version in the node.

21 Claims, 8 Drawing Sheets

METHOD AND APPARATUS FOR UPDATING SYSTEM SOFTWARE FOR A PLURALITY OF DATA PROCESSING UNITS IN A COMMUNICATION NETWORK

LIMITED COPYRIGHT WAIVER

A portion of this patent document contains material to which a claim of copyright protection is made. The copyright owner has no objection to facsimile production by anyone of the patent document, or the patent disclosure as it appears in the United States Patent and Trademark Office patent file records, but reserves all other rights whatsoever.

FIELD OF THE INVENTION

The present invention relates to communication networks wherein a plurality of processing units are distributed among nodes being linked by communication channels. Specifically, the present invention relates to the maintenance of such communication networks, and more specifically to method and apparatus for updating system management software in a communication network.

BACKGROUND OF THE INVENTION

Recent advances in communication and data processing technologies have given rise to a rapid development of communication networks. In addition to providing distributed data processing capability and data base sharing, modern communication networks allow voice and data to be more efficiently transmitted from one place to another through economical topological configurations (that is the manner in which the nodes of the network are interconnected).

Moreover, whereas the geographical confines of past communication networks, such as local area networks, were limited to closely dispersed stations interconnected by cables (for example, different offices within the same building), modern communication networks can easily span over wide geographical areas, with the stations distributed among nodes interconnected by communication media such as satellite, microwave and fiber optic transmission, using T1 transmission or other communication facilities.

In many modern communication networks, each node has a controller which is typically a processing unit executing system software to perform such management functions as: processing the handshaking communication protocol, routing voice and data messages (based upon topological or other information), and performing other control operations. Because enhancements and new functions may be added to the control operations, there exists a need to periodically update the system management software being executed in the processing units of a communication network.

In conventional local area networks, updating the system management software has been performed without too much difficulty by physically swapping out memory cards which contain the older software and replacing them with cards which contain the new software. However, in modern wide area networks such as the Integrated Digital Network Exchange (IDNX®) products marketed by Network Equipment Technologies, the assignee of the present application, this approach suffers many drawbacks. For example, updating the system management software may become a costly operation both in terms of human resources and system downtime involved in the swapping process. Furthermore, when the size (that is the number of nodes) of a network becomes large, a considerable amount of time may need to be spent to swap the software in all the nodes. These drawbacks may be further aggravated if test runs of the new software become necessary.

In view of the foregoing, there is a need for a method whereby system management software in a communication network can be easily updated.

SUMMARY OF THE INVENTION

The present invention is a maintenance method and apparatus for updating system software among a plurality of data processing units in a communication network. The processing units in the network are distributed among multiple nodes linked by communication channels. The method and the apparatus operate to install a second version of system software in a first node. The second version is communicated to a set of second nodes in response to an update command. A trial use of the second version is then initiated in a subset of the second nodes. Upon detecting predefined failures during the trial use in a second node, the second node is restored to the first version. If the trial use completes successfully in second node, the second version is then used as a preferred version in the second node.

DESCRIPTION OF THE PREFERRED EMBODIMENT

Figure 1:
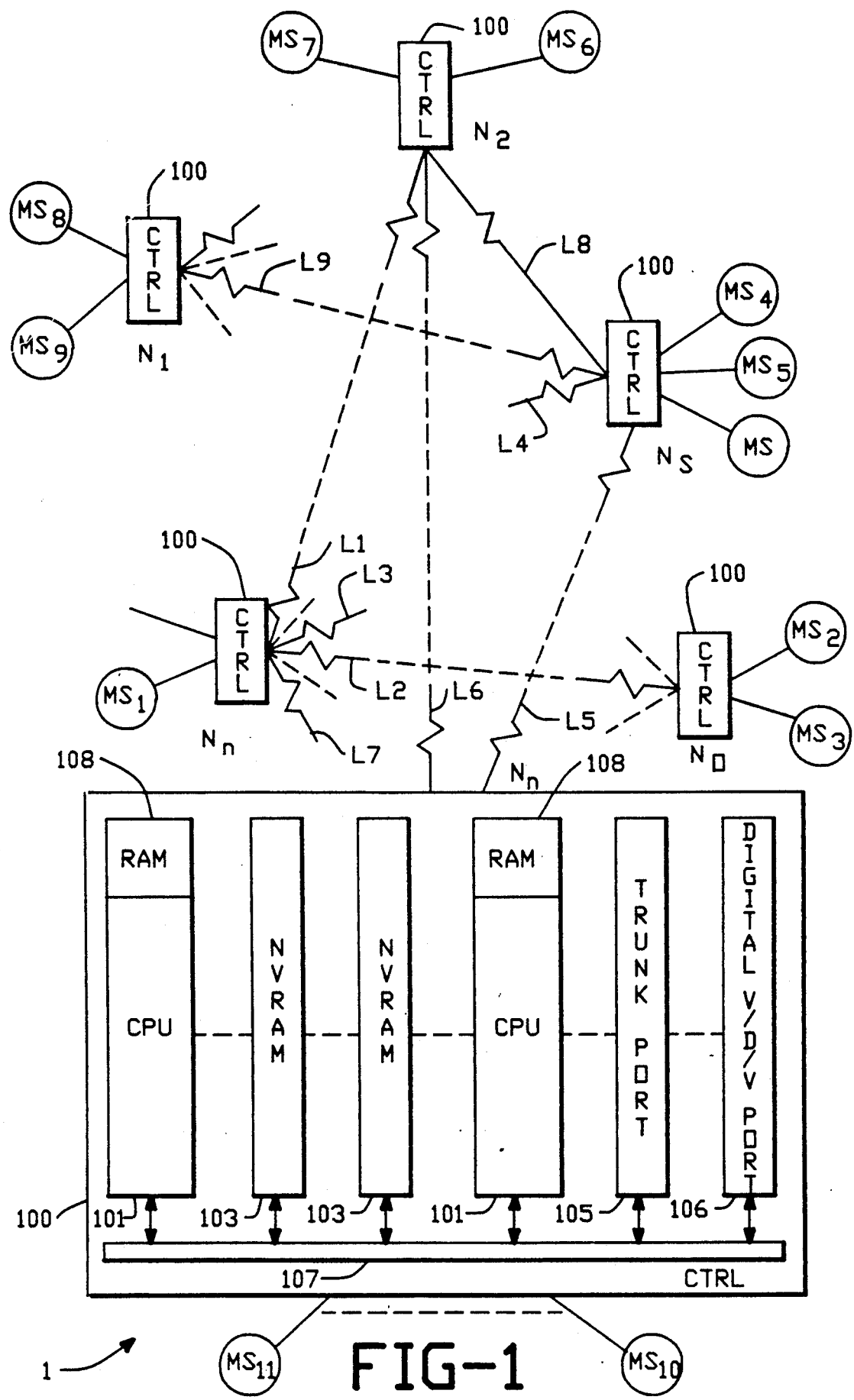
FIG. 1 illustrates a communication network wherein the present invention is embodied.

The present invention is embodied in the Integrated Digital Network Exchange (IDNX) products marketed by Network Equipment Technologies as an improvement thereto. A block diagram of an IDNX wide area communication network is illustrated in FIG. 1. The network comprises a plurality of message stations $MS_1$, $MS_2$, ... distributed among nodes, $N_1$, $N_2$, ...$N_n$, which are interconnected by communication channels $L_1$, $L_2$, ... $L_n$, of, for example, the T1 communication facility. The message stations $MS_1$, $MS_2$, ... communicate voice and data messages with each other. Each node has a controller 100 which controls the communication of messages between its message stations and message stations in other nodes of the network. A controller 100 also controls the routing of messages from one node to another.

The manner in which the messages are communicated and routed, including the protocols used in connection therewith, is well known in the art and need not be described in this disclosure.

Each controller 100 comprises one or more central processing units (CPUs) 101, one or more trunk ports 105 for providing interfaces to the communication channels, one or more digital voice/data/video ports 106 for interfacing with message stations attached to it, as well as one or more non-volatile storage devices 103, such as non-volatile random access memories, for storing system management software. In the preferred embodiment, these components are coupled by a common bus 107 through which data and control signals are communicated. In addition, a controller optionally has input/output devices (not shown) to allow an operator to control and maintain a node in the network. For example, an operator can enter a system maintenance command to disable or enable one or more ports within the node, or a command to download data and software from an auxiliary device to a non-volatile storage device 103.

To communicate voice and data messages between message stations, communication links are established between the nodes, based upon a variety of supported topologies. The process whereby a controller establishes links to the neighbor nodes involves processing a prespecified handshaking protocol by a CPU 101. The CPU 101 performs this function, along with other system operations, by executing instructions residing in its working memory 108. The topological information, which is used for communicating and routing messages between nodes, also resides in a CPU's working memory 108.

The instructions for performing the above-mentioned functions are parts of a system software which, along with the topological information, are stored in the non-volatile storage device 103 and loaded into the working memory 108 of a CPU 101 during an initial program load (IPL), otherwise known as a boot. IPL can be activated manually by pressing a button connected to a CPU, or it can be activated by another CPU which sends an "IPL" signal to the local CPU.

The system software is stored in a non-volatile storage device 103 as a number of modules. At a predefined location in each non-volatile storage device 103, a header is provided to indicate the number of modules of the system software stored therein. This header can be accessed by a CPU 101 as data.

The network topological information is periodically maintained and updated to reflect changes in the configuration of the network, such as when a node goes out of service or when new links are established or deleted. Also, the system software may be changed periodically to add new functions or enhancements.

When the system software is changed, it becomes desirable to perform a process (hereinafter called a "softload process" or "softload") to update the non-volatile storage devices 103 in a predetermined subset of nodes in the network so that the new system software may be used to operate the CPU's 101 of the subset of nodes.

According to the preferred embodiment of present invention, the non-volatile storage devices 103 in the network are classified, based upon the respective statuses of their contents, into four categories:

(a) A "new" non-volatile storage device 103 is a non-volatile storage device 103 which has been installed with a new version of system software. The new software version may be installed either by a download operation, or by the successful completion of a distribution step of the softload process. A "new" non-volatile storage device 103 will not be updated or downloaded. Moreover, a "new" non-volatile storage device 103 will not be used to IPL a CPU 101.

(b) A "dirty" non-volatile storage device 103 is a non-volatile storage device 103 which contains contaminated or unusable data. A non-volatile storage device 103 is contaminated if, for example, an error has occurred during a distribution in the softload process. A non-volatile storage device 103 is unusable if it is being loaded by the distribution step of the softload process. A "dirty" non-volatile storage device 103 will not be updated or downloaded. Moreover, a "dirty" non-volatile storage device 103 will not be used to boot a CPU 101.

(c) A "trial" non-volatile storage device 103 is a non-volatile storage device 103 which is specified to be used in the cutover step of the softload process. Normally, only one "trial" non-volatile storage device 103 exists in a node, all other non-volatile storage devices 103 in the node will be in one of the other states. If a "trial" non-volatile storage device 103 is present in a node, it will be used when a CPU 101 is IPL'ed, unless a predefined number of system crashes have already occurred when the "trial" non-volatile storage device 103 is used to boot a CPU 101. In that case, the CPU 101 will be cutback to the old software and the "trial" non-volatile storage device 103 will be reverted to "new".

(d) An "old" non-volatile storage device 103 is a non-volatile storage device 103 which contains operative software of a node. A non-volatile storage device 103 is marked "old" only when it operates properly. When a CPU 101 is IPL'ed, the content of an "old" non-volatile storage device 103 will be used if no "trial" non-volatile storage device 103 is present. If several "old" non-volatile storage devices 103 exist, the "old" non-volatile storage device 103 with the most recent version number will be selected for an IPL. If the selected non-volatile storage device 103 operates improperly, then the next most recent non-volatile storage device 103 will be used.

Each of the non-volatile storage devices 103 has a status header identifying the status of the software stored therein. The status header of a non-volatile storage device 103 also contains the release number, version number and other data associated with the software residing therein. This status header can be accessed by a CPU 101 as data.

Figure 2:
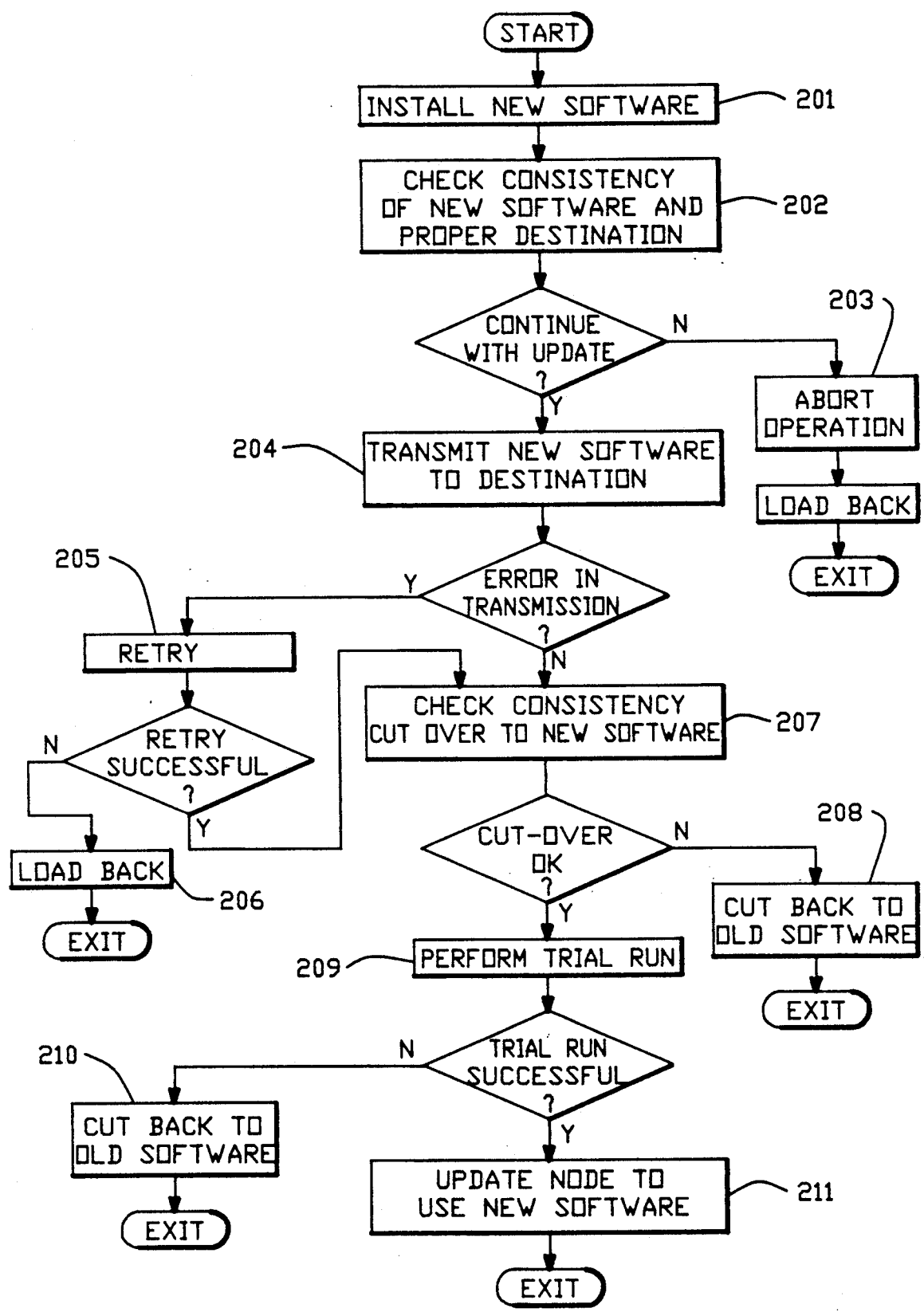
FIG. 2 illustrates the logical steps of a preferred embodiment of the present invention.

FIG. 2 is a flow chart illustrating a softload process wherein is embodied the present invention.

At the beginning of the softload process, the new version of system software is installed in one of the nodes $N_1, N_2, \ldots N_n$ in the network (block 201). The node where the new version of system software is installed is hereinafter called a source node $N_s$. The new system software version may be installed in more than one way. For example, the new version of system software may be programmed into a new non-volatile storage device 103 which is then coupled to the controller 100 of the source node $N_s$. As another example, the new version of system software may be downloaded to a non-volatile storage device 103 in the source node $N_s$.

After the new version of system software is installed in the source node $N_s$, the distribution of the new system software to the other nodes is initiated. Typically, basic operation of the new system software is tested before it is distributed. Advantageously, the distribution is initiated by a "distribution command" which is entered by the operator at an input/output device in one of the nodes $N_1, N_2, \ldots N_n$. The node at which a distribution command is entered, which may or may not be the source node $N_s$, is hereinafter called the operator node $N_o$. The distribution command contains a source field and a destination field. The source field contains a node-card combination which identifies the source node $N_s$ as well as the location of the non-volatile storage device 103 which contains the new system software. The destination field contains a list of node-card combinations each of which identifies one of the nodes in the network which will receive the new version of software (a destination node $N_d$) In the preferred embodiment, only four node-card combinations are identified in the list, but it will be obvious that different values can be used. The destination field also contains the locations of the non-volatile storage devices 103 within a destination node $N_d$ which will be used to receive the new version of system software.

Advantageously, the system is implemented so that a distribution command is recognizable by a controller 100 only when it is issued with predefined access privileges. Furthermore, such privileges may be defined with an hierarchical structure so that the privilege required for a distribution process depends upon the importance of the software.

When the operator node $N_o$ receives a distribution command, it relays appropriate messages to both the source node $N_s$ and the destination nodes $N_d$.

When the source node $N_s$ receives a distribution message, a check is made to see: (1) whether the source node $N_s$ is currently being installed with a new system software version, (2) whether the source node $N_s$ has been designated as the source node $N_s$ of another softload process, and (3) whether the source node $N_s$ has a "new" non-volatile storage device 103 at the specified location. If (1) and (2) are false and (3) is true, a "consistency check" will be performed on the "new" non-volatile storage device 103 (block 202). In the preferred embodiment, the consistency check involves a process of making a checksum verification on the "new" software, as well as checking the actual number of modules of the system software contained in the non-volatile storage device 103. This number of modules is compared against the number stored in the header of the non-volatile storage device 103.

Upon receiving the messages, a CPU in a destination node $N_d$ makes a consistency check to see whether there is a non-volatile storage device 103 at the specified location. The destination node $N_d$ also checks whether data can be written into the specified non-volatile storage device 103. This check is accomplished by a read-modify-write operation. In the read-modify-write operation, predetermined data is first read from the non-volatile storage device 103. This data is then modified (e.g., by exclusively ORing it with a binary "1") and rewritten back to the non-volatile storage device 103. The non-volatile storage device 103 is then read again to check whether it is indeed modified.

After the consistency checks are completed in both the source node $N_s$ and the destination nodes $N_d$, appropriate responses will be sent from these nodes back to the operator node $N_o$. Upon receiving the proper responses, an operator may confirm the softload process to all the available destinations, (2) limit the softload process to a subset of the non-volatile storage devices 103 originally specified, by changing the list of destinations, or (3) abort the softload process (block 203) completely.

If the softload process is not aborted, the status of the non-volatile storage devices 103 selected as destinations to receive the new system software are first marked "dirty" The new software will then be distributed from the source node $N_s$ to the destination non-volatile storage devices 103 (block 204). The distribution can be carried out using one of the many well known data communication techniques in the art.

In the preferred embodiment, the new system software is transmitted in one or more batches of data packets to the destination nodes $N_d$. Each data packet has a header containing a batch-number and packet-number. The header of the first packet in a batch also contains the total number of packets to be sent in that batch. Each packet also contains information which specifies the location of non-volatile storage devices 103 within the controller 100 and the relative location within the non-volatile storage device 103 where the packet is to be loaded. Each packet also contains a checksum value of its data.

During the distribution, the source node $N_s$ retains information concerning the progress of distribution so that it can relay the information to an operator upon request. The distribution can be aborted any time by the operator, although it is usually aborted when one or more errors occur. If the distribution is aborted, a loadback process (block 203) will be preformed.

In the loadback process, an "old" non-volatile storage device 103 will be located and the content of the "old" non-volatile storage device 103 will be copied to the "dirty" non-volatile storage device 103 that was the destination of the softload process. If the loadback process completes successfully, the status of the "dirty" non-volatile storage device 103 will be changed to "old". If the loadback process fails, the status of the non-volatile storage device 103 will remain "dirty" and an alarm will be logged.

The data pockets are received by a CPU in each destination mode. When a CPU receives all of the data packets, it computes a checksum from the packets and compares this checksum against the checksum transmitted from the source node. If the checksum values compare correctly, the destination node $N_d$ sends an acknowledgement to the source node, and loads the packet data into the specified memory location of the specified non-volatile storage device 103. The acknowledgement sent by a destination node $N_d$ contains the packet-number of the packet received by the destination node $N_d$. If no acknowledgement is received, the source node $N_s$ will retransmit the corresponding packet to the destination node $N_d$.

When all the packets of a batch are sent, the source node $N_s$ will send an end-of-transmission message to the destination nodes $N_d$. Upon receiving the end-of-transmission message, a destination node $N_d$ checks the number of packets received thus far against the total number of packets it should receive. This total number was sent along in the first packet. If one or more packets are missing, a destination node $N_d$ will send the packet-numbers corresponding to the missing packets to the source node $N_s$. Thereupon, the source node $N_s$ will retransmit the non-delivered packets (block 205) to the destination node $N_d$. A prespecified number of retries will be performed. If within the prespecified number of retries, transmission of the new system software cannot be completed successfully, a loadback (block 206) will be performed.

This loadback process is similar to the above-described loadback process wherein an "old" non-volatile storage device 103 will be located and copied to the "dirty" non-volatile storage device 103. Also, if the loadback process completes successfully, the status of the "dirty" non-volatile storage device 103 will be changed back to "old". If the loadback process fails, the non-volatile storage device 103 will be left "dirty" and an alarm will be logged.

Upon successful completion of the distribution, the status of the non-volatile storage device 103 will be changed to "new".

Following the distribution, a "cutover command" will be issued from an operator node $N_s$, that may or may not be the same as the operator node $N_s$ which issued the distribution command. The cutover command has a destination field which contains a list of node-card combinations each of which specified a target node, as well as a non-volatile storage device 103 within the target node which are selected for the cutover process.

Upon receiving a cutover command, the target node first saves the identification of the operator node which issued the cutover command. The target node also checks: (1) whether it is in a "trial" mode, and (2) whether it is currently involved in a distribution. If neither (1) nor (2) is true, the cutover process will continue (block 207).

In the cutover process, the non-volatile storage device 103 specified in the cutover command will be located. The target node then checks whether the non-volatile storage device 103 is a "new" non-volatile storage device 103. If so, it performs a consistency check on the target non-volatile storage device 103. This consistency check comprises the steps of comparing the checksums and comparing the numbers of modules in the non-volatile storage device 103.

If the consistency check completes successfully, the target node will set the status of the specified non-volatile storage device 103 to "trial". After the status of the non-volatile storage device 103 has been changed, a CPU 101 in the target node will perform an IPL.

If the target node fails to IPL correctly, a process to cutback to an "old" non-volatile storage device 103 will be performed (block 208). In the cutback process, the target node locates an "old" non-volatile storage device 103 in the controller. The content of this "old" non-volatile storage device 103 is then copied to the "trial" non-volatile storage device 103. The status of the "trial" non-volatile storage device 103 is changed back to "new", so that it will not be used to IPL a CPU in the future.

After the CPU 101 is IPL'ed successfully, a trial use of the new system software is performed (block 209). This trial use includes the step of initiating a dialogue between the target node and the operator node $N_o$ that initiated the cutover command. According to the preferred embodiment, the dialogue involves one or more exchanges of acknowledgments between the target node and the operator node $N_o$. If the dialogue fails, a cutback process is initiated. (block 210).

In this cutback process, the target node checks: (1) whether it is performing a softload process, (2) whether it is running on system software from a "trial" non-volatile storage device 103, (3) whether there is only one "trial" non-volatile storage device 103 in the target node, and (4) whether there is an "old" non-volatile storage device 103 in the target node. If (1) is false, and (2) (3) and (4) are true, the target node will locate an "old" non-volatile storage device 103 in the target node which has the most recent version of system software. When this "old" non-volatile storage device 103 is located, the target node will change the status of the "trial" non-volatile storage device 103 to "old". After the status is changed, the content of the "old" non-volatile storage device 103 will be copied to the "trial" non-volatile storage device 103, and the CPU 101 will perform an IPL. In a node with multiple processors when a CPU becomes inoperational during the trial use or because of a bad "trial" system software, its functions may be taken over by another CPU in the node.

If the trial use completes successfully, an update process will be performed (block 211). In the update process, the content of the "trial" non-volatile storage device 103 will be copied to all the non-volatile storage devices 103 in the node. The status of these non-volatile storage devices 103 will then be changed to "old" so that they will be used to IPL the CPU's.

In the preferred embodiment, the softload process is implemented by a master task and a slave task running in the CPU's 101 of each node. When a "distribution command" is entered at the operator node $N_o$, the master task at that node will accept the command, and based upon the context thereof, relays appropriate messages to the slave task of the source node $N_s$ and the respective slave tasks of the destination nodes $N_d$.

At the source node $N_s$, the master task translates the messages into directives, and send them to its slave task. Responsive to the directives, the slave task obtains information about the non-volatile storage devices 103 and sends this information back to the operator node $N_o$ for display thereat.

The slave tasks at the destination nodes $N_d$ also collect information about their non-volatile storage devices 103 (e.g. software versions, statuses, or whether a non-volatile storage device 103 can be programmed) and send this information back to the operator node $N_o$.

The information from the source node $N_s$ and destination nodes $N_d$ are used by the master task at the operator node $N_o$ to provide the initial checking and selection to exclude nodes that are not appropriate to be a source node for the softload process (e.g. nodes which are currently performing a softload process, nodes currently acting as source nodes for other softload processes, or nodes that do not contain a "new" non-volatile storage device 103, etc.). The master task at the operator node $N_o$ may also exclude nodes which are not appropriate to be destination nodes $N_d$ (e.g. nodes with no communication links connected to the source node, nodes that are not operational, or nodes which have no non-volatile storage device 103, etc.).

When the softload process is confirmed, the master task at the source node $N_s$ partitions the new system software into data packets and transfers them to the slave tasks of the destination nodes $N_d$. The communication of data packets to the slave tasks involves the aforementioned sequencing, flow control and retransmission (if necessary) between the master task of the source node $N_s$ and the slave tasks of the destination nodes $N_d$.

The master task at the source node $N_s$ also retains information concerning the status of the softload process for reporting to the operator when requested.

Optionally, occurrences of such events as breakdowns of communication links or failures in a non-volatile storage device 103 may be logged by the master tasks for future uses.

During the softload process, the slave tasks will update the status of a non-volatile storage device 103 as required. For example, during distribution, the status of a non-volatile storage device 103 will be initially changed to "dirty", and later to "new" if the non-volatile storage device 103 receives the system software successfully.

During a distribution, the respective slave tasks of the destination nodes $N_d$ receive data packets from the master task of the source node $N_s$. Each slave task loads the data packets into their specified non-volatile storage devices 103. If retransmission of data packets is required (e.g. when non-delivery of a packet is detected), the slave task of the destination node $N_d$ will send a retransmission request to the source node $N_s$.

If the non-volatile storage device 103 in a destination node $N_d$ cannot be loaded successfully within the predefined number of retries, its slave task will request its local master task to locate an "old" software, either locally or from a neighbor node. The "old" software is them copied to the "dirty" non-volatile storage device 103. If the non-volatile storage device 103 then operates properly, it will be changed to "old". If this loadback fails, the non-volatile storage device 103 will remain "dirty".

When a cutover command is received, the slave tasks the destination nodes $N_d$ change the status of the non-volatile storage device 103 to "trial" so that it can be used to IPL a CPU 101.

In general, interactions between the master and the slave tasks involve:

(1) A request for information from the master task at the source node $N_s$ to the slave tasks at the destination nodes $N_d$ concerning the non-volatile storage devices 103 at the destination nodes $N_d$. In response, each slave task at the destination node $N_d$ sends the requested information back to the master task. Once the information is received, the master task can select destinations of a distribution.

(2) Once the correct destination nodes $N_d$ have been selected, the master task of the source node $N_s$ informs the slave tasks of the destination nodes $N_d$ regarding the number of packets the master task will send, the number of packets in a batch after which it will expect an acknowledgement, the non-volatile storage device 103 to be used for distribution, and the identification (version and release number) of the system software to be distributed.

(3) The master task in the source node $N_s$ builds data packets from the new system software and sends the packets to the destination nodes $N_d$ in batches. After a batch is sent to a destination node $N_d$, the master task at the source node $N_s$ will wait for an acknowledgement from the destination node $N_d$. If the batch is received successfully, the slave task in the destination node $N_d$ sends an reply message to the master task at the source node $N_s$ to acknowledge the receipt thereof. Otherwise, the slave task will send a retransmission request accompanied by the numbers of packets not yet received, so that the master task at the source node $N_s$ can retransmit the packets that have not been received.

(4) If the operator decides to abort the softload process, the master task at the operator node $N_o$ will issue an abort request and the master task of the source node $N_s$ will stop sending data packets.

(5) The master task at the operator node $N_o$ sends a cutover request to the respective slave tasks of the destination nodes $N_d$ when cutover in these destination nodes $N_d$ is desired. The slave tasks at these nodes will acknowledge receipt of the packet before the performing cutover.

The master task in the preferred embodiment is implemented as a computer program executing within one or more CPU 101 of the controller 100 in each node. A C-Programming Language listing of a master task of the preferred embodiment is given in Appendix A. A block diagram of a master task is illustrated in FIG. 3.

Figure 3:
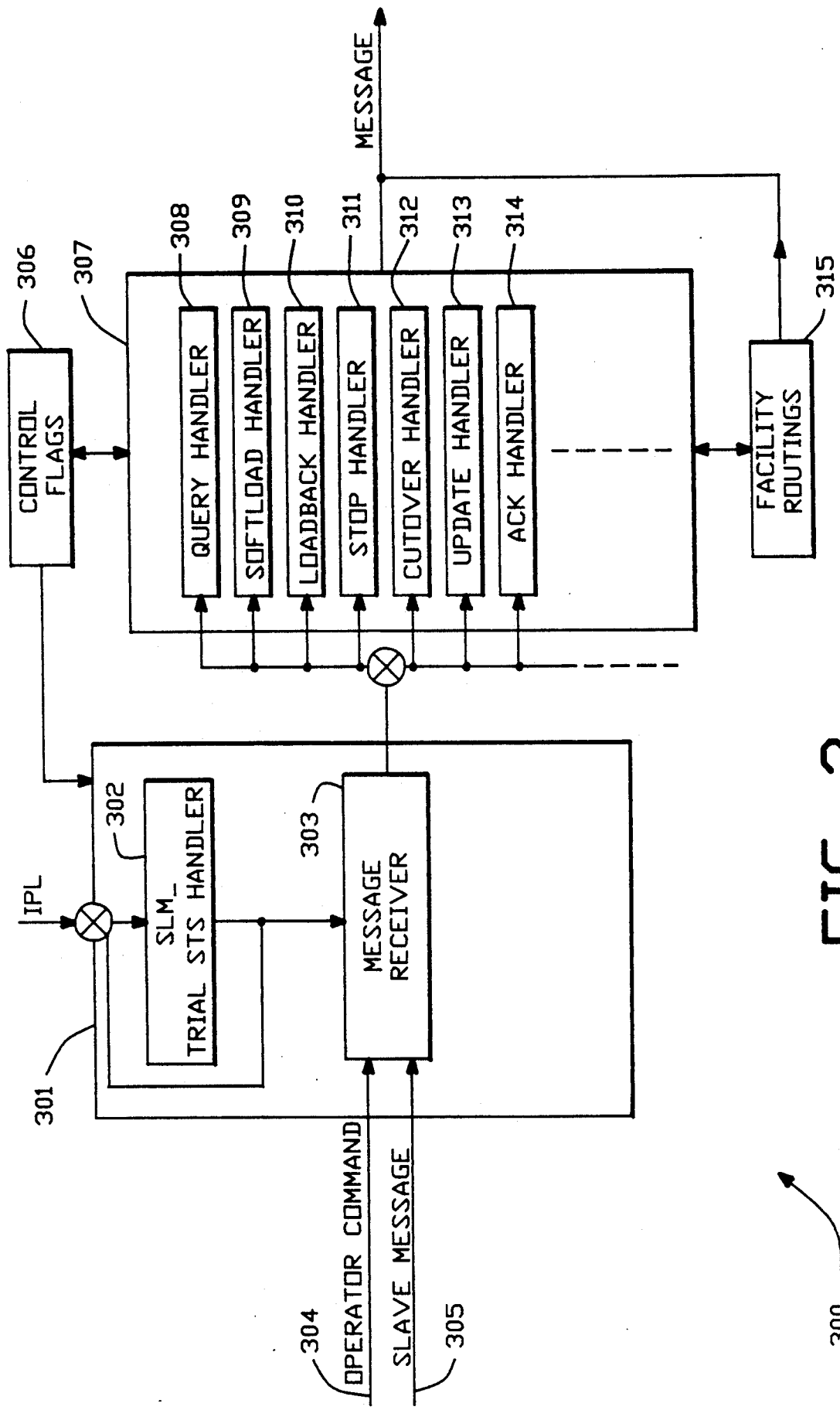
FIG. 3 is a block diagram illustrating the logic structure of the master task of the preferred embodiment.

Referring to FIG. 3, when a CPU 101 is first loaded, the master task 300 will enter into a block 301 whose computer code is given in Appendix A pages 1-2. In block 301, the master task 300 first checks a control flag SL_TRIAL_SW, within block 306 to see whether the node is in a "trial" mode. If SL_TRIAL_SW is set, the master task activates a trial handler (SLM_TrialStsHandler) 302 of page 3 in Appendix A whereby a trial use of a "trial" non-volatile storage device 103 will be performed. This ensures that the new software version still maintains connectivity with a neighbor node.

If the trial process is not run or if the trial process is run successfully, the master task will enter into a message receiver 303 within block 301. The message receiver 303 receives operator commands 304 and messages 305 from slave tasks in the network. In response to an operator command or a message, the message receiver 303 activates one of a plurality of processes in the message handler block 307. These processes in block 307 include a query handler 308 (SLM_QueryHandler, Appendix A page 4) a softload handler 309 (SLM_SoftLoadHandler, Appendix A page 5), a loadback handler 310 (SLM_LoadBackHandler, Appendix A page 6), a cutover handler 312 (SLM_CutOverHandler, Appendix A page 8), an update handler 313 (SLM_UpdateHandler, Appendix pages 9-10), and an acknowledge handler 314 (SLM_AckHandler, Appendix A pages 10-11).

The handlers 308-314 in the blocks 307 are coupled to a plurality of master facilities, collectively illustrated as a block 315, which provide services to the handlers, 308-314. An implementation of some of these facilities is given as an example in the C-Programming Language listing of Appendix C.

The slave task in the preferred embodiment is also implemented as a computer program executing within a CPU 101 in the controller 100 of each node. A C-Programming Language listing of the slave task of preferred embodiment is given in Appendix B. A block diagram of a slave task is illustrated in FIG. 4.

Figure 4:
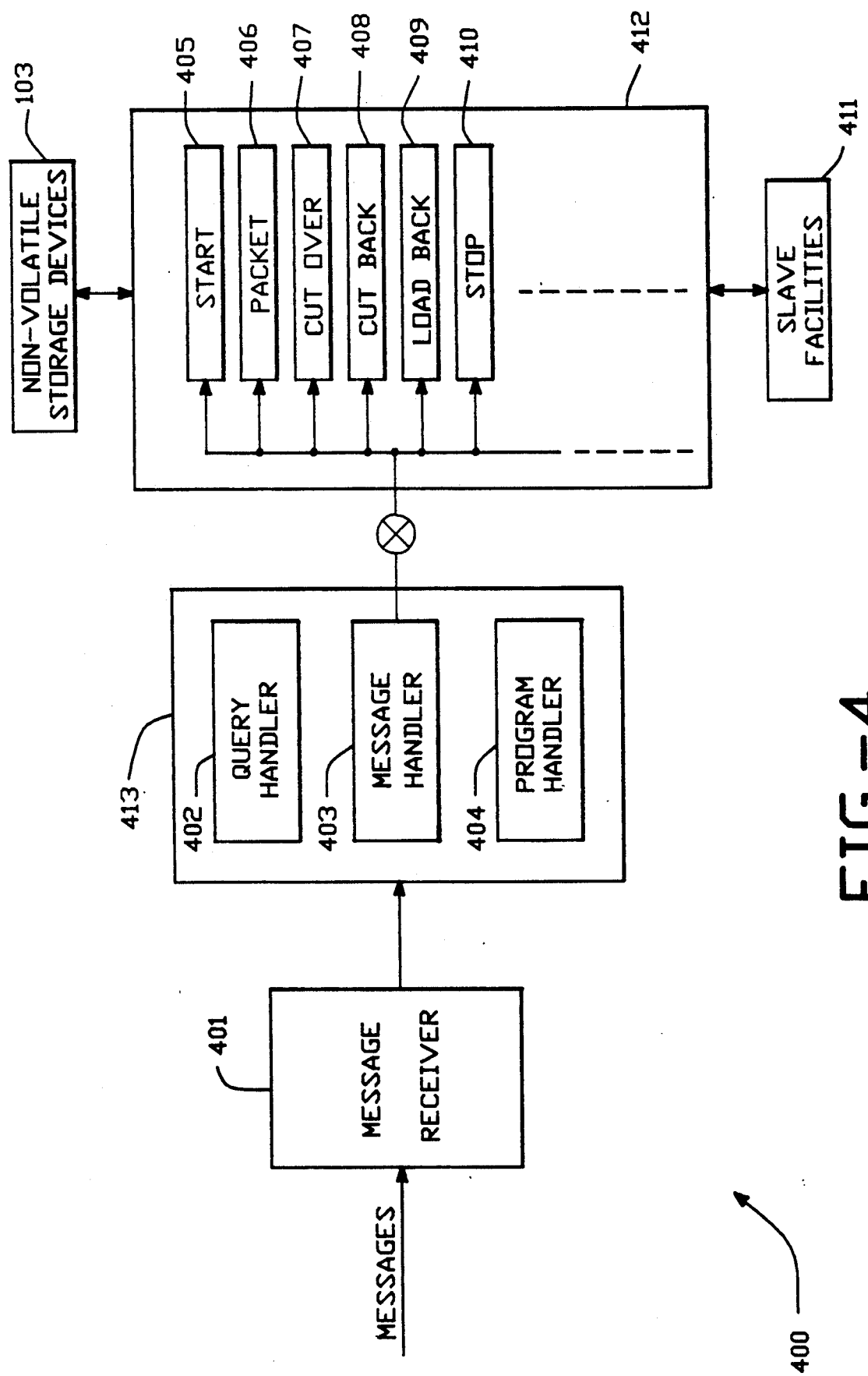
FIG. 4 is a block diagram illustrating the logic structure of the slave task of the preferred embodiment.

Referring to FIG. 4, there is shown a slave task 400 which includes a message receiver 401. The code of the message receiver according to the preferred embodiment is given in pages 1-2 of Appendix B, The message receiver 401 receives messages from the master tasks and, in response to a message, activates one of a plurality of handlers 413. The handlers 413 include a query handler 402 (SLS_QueryHandler, as listed in pages 3-4 of Appendix B), a message handler 403 (SLS_MsgHandler, as listed in pages 4-5 of Appendix B), and a program handler 404 (SLS_ProgramHandler, as listed in page 6 of Appendix B).

When the slave task enters into the message handler 403, it further decodes a message and performs one of a plurality of operations 412. Such operations may include generating a message to the master task, or activating one of a plurality of handlers including a start handler 405 (SLS_start, Appendix B pages 6-7), a packet receiving handler 406 (SLS_Packet, Appendix B page 8), a cutover handler 407 (SLS_CutOver, Appendix B page 11), a cutback handler 408 (SLS_CutBack, Appendix B page 12), a loadback handler 409 (SLS_Loadback, Appendix B page 13), and a end-of-transfer handler 410 (SLS_Stop, Appendix B page 9).

The handlers 405-410 are coupled to a plurality of slave facilities, collectively illustrated as a block 411, which provide services to the handlers 405-410. An implementation of the facilities is given as an example in the C-Programming Language listing of Appendix C.

Figure 5:
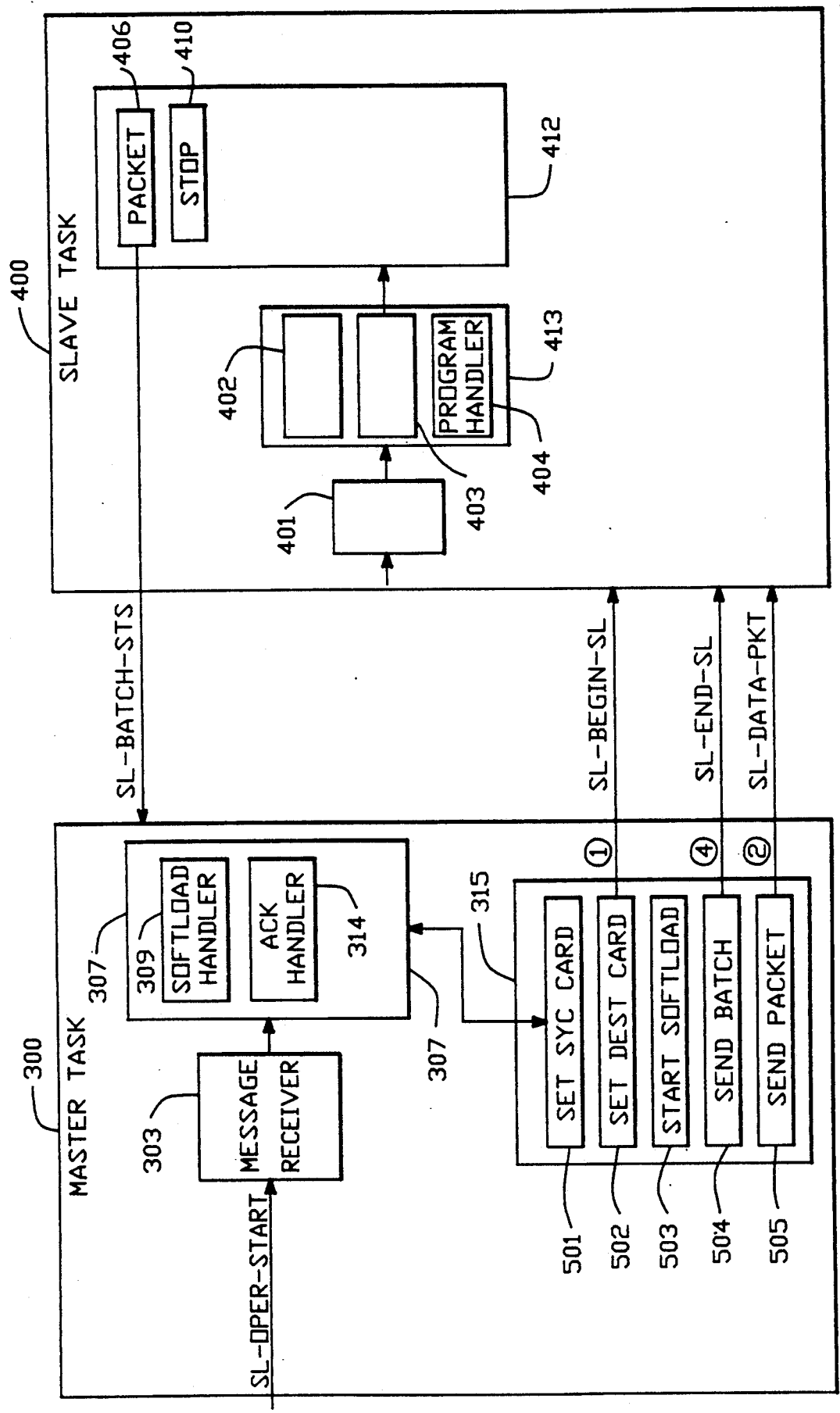
FIG. 5 is a block diagram illustrating the distribution of a new software.

FIG. 5 is a block diagram illustrating the communication of a new system software version from a source node $N_s$ to a destination node $N_d$. The communication is initiated by an operator command, "SL_OPER_START", to the master task of a node that has been selected as the source node $N_s$ of a softload process. In response to the command, the softload handler 309 is activated by the message receiver 303. The softload handler 309 checks the source and destination non-volatile storage devices 103 selected by the command by calling two master facilities, SLM_SetSrcCard 501 of Appendix A page 13 and SLM_SetDestCard 502 Appendix A page 14 sets up the source non-volatile storage device 103 and the destination non-volatile storage devices 103. The SLM_SetDestCard 502 send a message, "SL_BEGIN_SL", to each of the slave tasks in the selected destination nodes $N_d$. The "SL_BEGIN.SL" message activates a process SLS_Start in a destination node $N_d$ which sets up the destination non-volatile storage devices 103 for distribution of the new system software, including changing the respective statuses to "dirty" ("SL_DIRTY SW").

The softload handler 309 in the master task then initiates a master facility SLM_Start_Softload 503 of Appendix A page 15. The SLM_Start_Softload 503 calls another master facility SLM_SendBatch 504 of Appendix A page 17 to send the new software in batches of data packets. SLM_SendBatch 504 calls another master facility SLM_SendPacket 505 of Appendix A page 18 to send data packets of a corresponding batch to the destination nodes $N_d$.

Packets are sent to the slave tasks of the destination nodes $N_d$ with a message type identifier, "SL_DATA_PKT". The slave task in response to this message type identifier, activates its SLS Packet process 406, which is responsible for keeping track the proper message sequence and for sending an acknowledgement message, "SL_BATCH_STS", back to the master task of the source node $N_s$ after receiving each batch. Because there is a softload in progress, the slave task 400 also calls the program handler 404 every time it is activated to program the received data into selected non-volatile storage device 103. If there occurs an error during the softload process, the slave task of a destination node $N_d$ will make a request to abort the distribution and to initiate a loadback process whereby the content of a non-volatile storage device 103 with an "old" status will be written back into the "dirty" memory.

The "SL_BATCH_STS" message causes the master task of the source node $N_s$ to enter into the acknowledge handler 314. The acknowledge handler 314 checks whether all the batches have been sent, and if there are still some more batches left, the acknowledge handler 314 will call SLM_SendBatch 504 again. When all the batches are sent, SLM_SendBatch 504 will send a "SL_END_SL" message to the slave tasks of the destination node $N_d$. The "SL_END_SL" message causes a slave task to enter the SLS_Stop process 410 which verifies the integrity of the programmed non-volatile storage device 103 changes the status of a destination non-volatile storage device 103 to "new".

Figure 6:
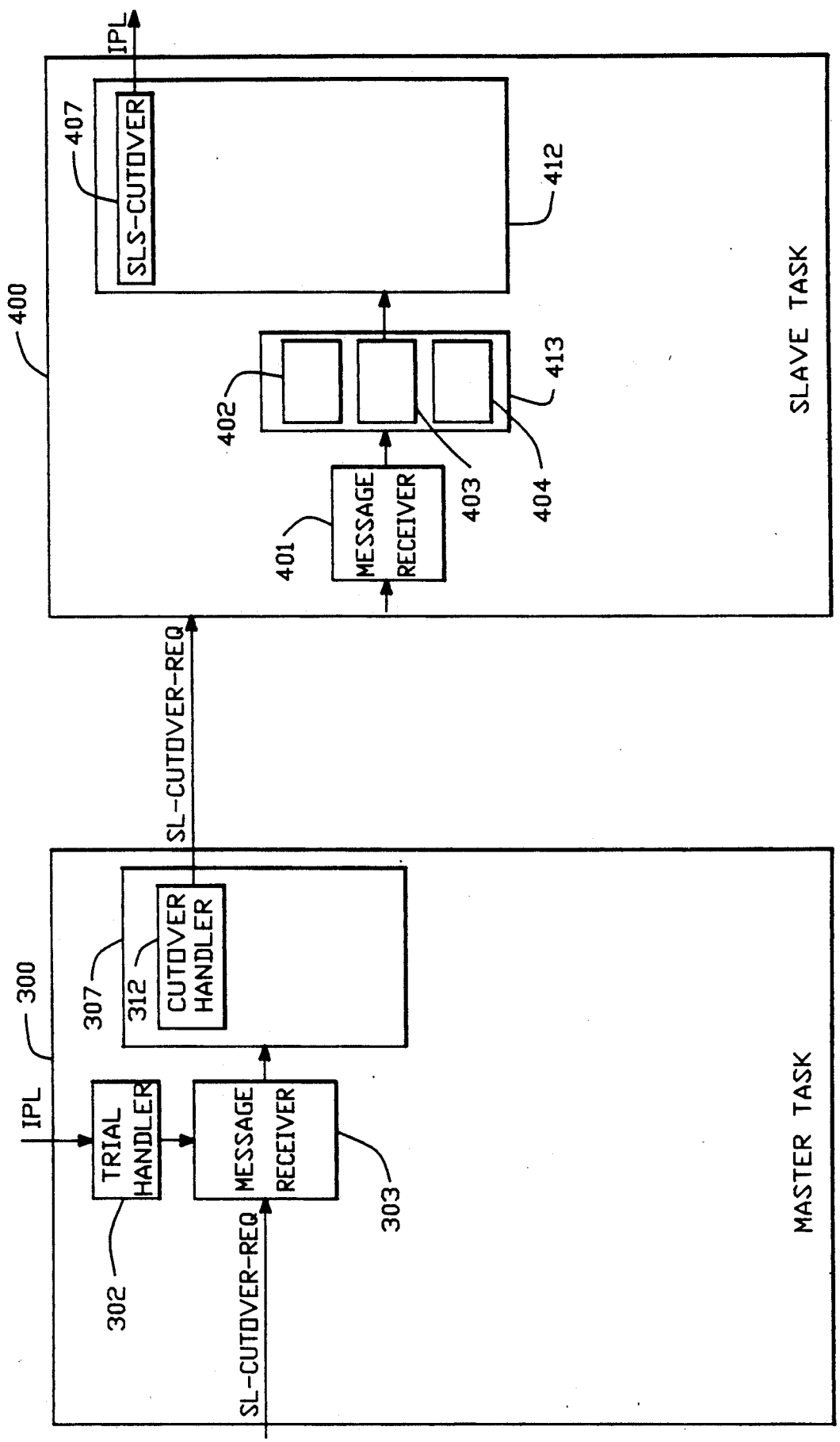
FIG. 6 is a block diagram illustrating the initiation of a trial use.

FIG. 6 is a block diagram illustrating how a trial use of a new system software is initiated. The trial use is initiated when the operator issues a "cutover" command to a master task. The cutover command causes the master task to enter its cutover handler 312. If a softload is not in progress at that node, the master task will send a "SL_CUTOVER_REQ" message to the slave task.

The slave task, in response to the "SL_CUTOVER_REQ", enters the SLS CutOver process 407. The SLS_CutOver process 407 gets the information about the non-volatile storage devices 103 then existing in the node and searches for the one being designated as the source of the cutover. After making sure that the source of the cutover has a "new" status and that its content is consistent, the SLS-CutOver process 407 also sets the flag SL_TRIAL_SW. The SLS_CUTOVER_processor 407 then initiates an initial program load (IPL) signal to the CPU's 101.

When a CPU 100 is IPL'ed, its master task 300, in response to the SL_TRIAL_SW being set, will activate the trial handler 302. The trial handler 302 sends a message to a predetermined node and monitors for a response. If a response is received, then a "success" return code is generated. Otherwise the trial handler 302 will cause the master task 300 to wait for the initiation of a cutback process.

Figure 7:
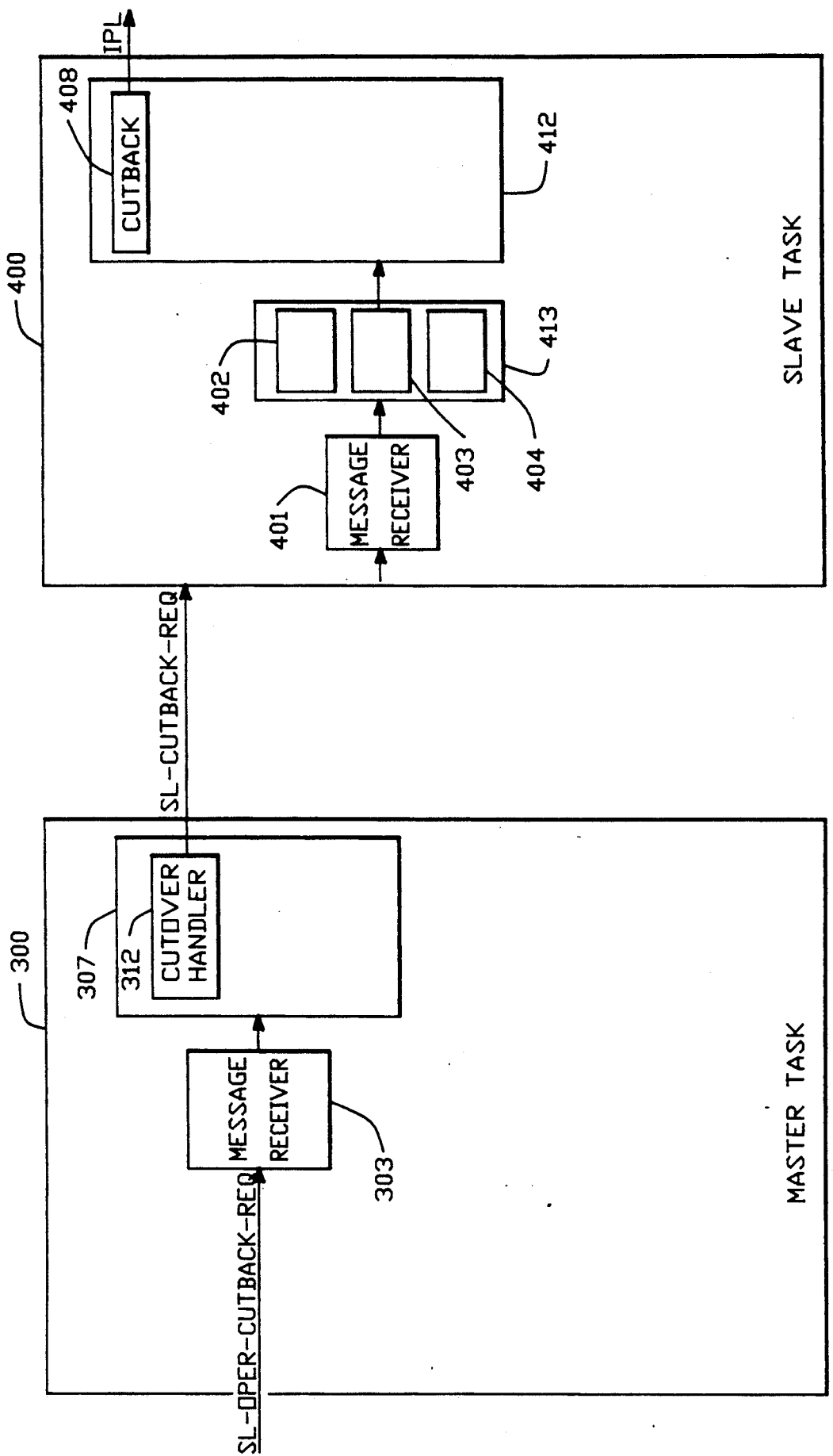
FIG. 7 is a block diagram illustrating the restoring of a node to an old version.

FIG. 7 is a block diagram illustrating a cutback process which restores a node to an "old" software version when a trial use fails. The cutback process is initiated by an operator command, "SL_OPER_CUTBACK_REQ", which takes the master task into the cutover handler 312. The cutover handler 312 generated an "SL_CUTBACK_REQ" and sends it to the selected slave tasks.

Each of the selected slave tasks, after receiving a "SL_CUTBACK_REQ" and sends it to the selected slave tasks.

Each of the selected slave tasks, after receiving a "SL_CUTBACK_REQ", will call the cutback process 408. The cutback process, 408 gets information about the non-volatile storage devices 103 currently existing in the node and checks if there exists a non-volatile storage device 103 with an "old" status. If so, the cutback process 408 makes sure that there is only one non-volatile storage device 103 with a trial status. The cutback process then changes the status of this non-volatile storage device 103 to "new". When finished, the cutback process 408 wil IPL the CPU's 100. Since there is no longer a non-volatile storage device 103 with "trial" status in the controller, the CPU's 101 will be IPL'ed with the content from an "old" non-volatile storage device 103.

Figure 8:
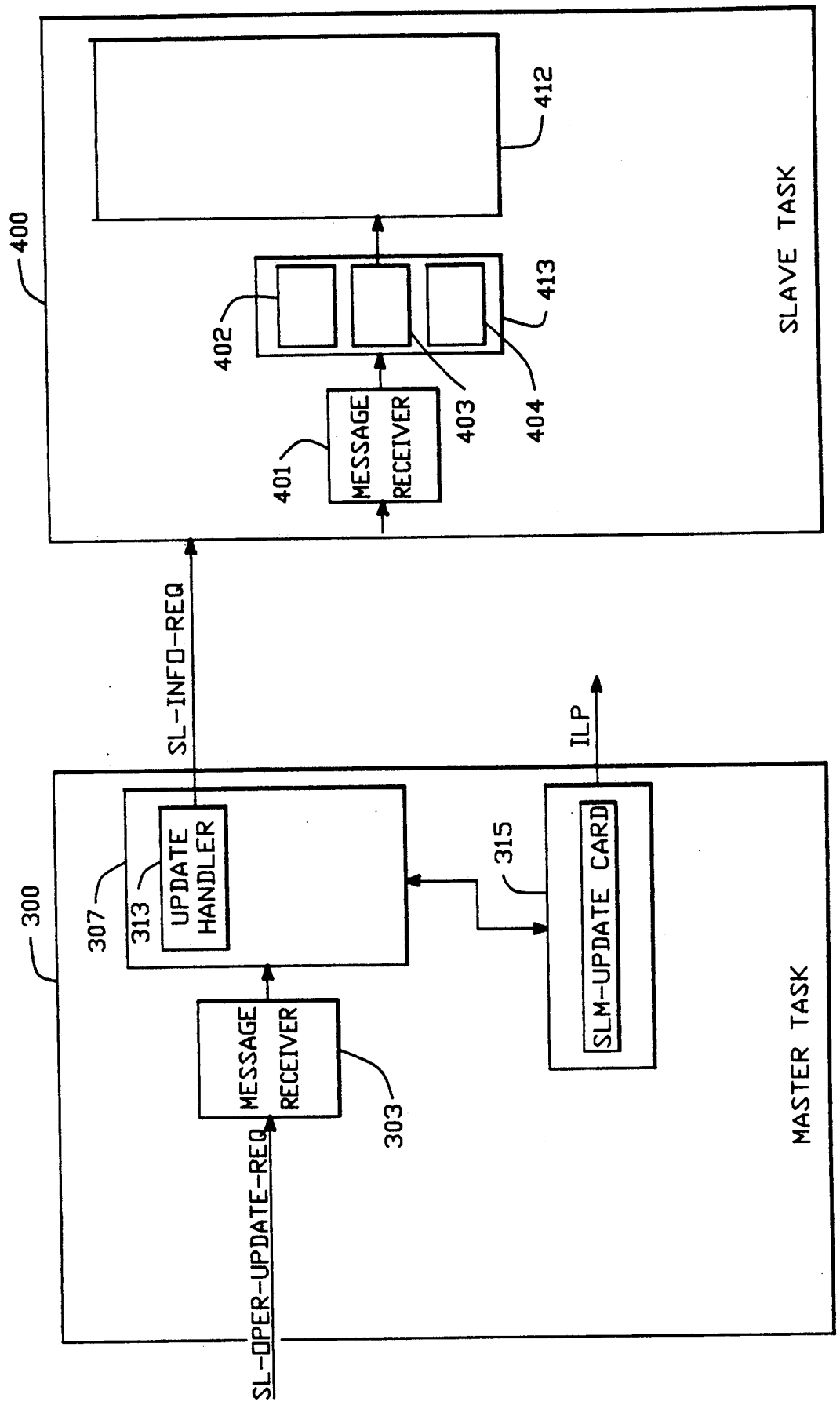
FIG. 8 is a block diagram illustrating the designation of a new version of the preferred version of the system software.

FIG. 8 is a block diagram illustrating an update process whereby a system software in a plurality of target nodes is designated as a preferred operative version of a node.

The update process is initiated by an operator command, "SL_OPER_UPDATE REQ", which takes the master task 300 of each target node to the update handler 313. The update handler 313 first makes sure that the node is running "trial" software and that the node is not currently performing another softload process The update handler 313 then sends a message, "SL—IN-FO—REQ", to the slave task to request information concerning all non-volatile storage device 103 in the node. This request is being handled by the Query handler 402 of the slave task 400. When the information is received from the slave task, the update handler 313 will go through all the non-volatile storage devices 103 to see if one with a "trial" status exists. The update handler then calls a master facility, SLM—UpdateCard of Appendix A pages 44–45, which changes the status of the "trial" non-volatile storage device 103 to "old". It then copies the content from the trial non-volatile storage device 103 to all non-volatile storage devices 103 in the node.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application thereby enabling others skilled in the art to understand the invention for various embodiments and with various modifications as are suited to the particular use contemplated. It is intended that the scope of the invention be defined by the accompanying claims and their equivalents.

APPENDIX A sl_master.c

```
/*SHeader: /nb/v17/.rcs/RCS/sl_master.c,v 17.1 88/04/26 17:.4:15 kr..shr Exp $*/
/***************************************************************
 *                                                              *
 *         Network Equipment Technologies                       *
 *              * *   IDNX    * *                               *
 *                                                              *
 *         SOFTLOAD:SL_Master Task                              *
 *                                                              *
 ****************************************************************
 *                                                              *
 *              Copyright Statement                             *
 *                                                              *
 *              Copyright (c) 1987 by                           *
 *         Network Equipment Technologies                       *
 *         Redwood City, California 94063                       *
 *                                                              *
 *              All Rights Reserved                             *
 *                                                              *
 ****************************************************************
 * This software is furnished under a license and may be used   *
 * only in accordance with the terms of such license. This      *
 * software may not be copied, provided, or otherwise made      *
 * available to anyone other than the licensee. Title to and    *
 * ownership of this software remains with Network Equipment    *
 * Technologies. This listing of source code is confidential,   *
 * and may not be copied, provided, or otherwise made available *
 * to any person or third party not authorized by Network       *
 * Equipment Technologies.                                      *
 ****************************************************************/ include    "global_def.h"
include    "kernel_def.h"
#include    "DBC_def.h"
#include    "NetMgr_def.h"
#include    "softload_def.h"
#include    "cboot_def.h"
#include    "extern_def.h"
#include    "macros_def.h"

static  struct  Tid     SLM_Tid = TID_SOFTLOAD_MASTER, 0};

static  struct  Tid     SLS_Tid = TID_SOFTLOAD_SLAVE, 0};

SL_Master()
{
    unsigned short              Type;
    struct      SLM_Local_Data  *pSLM;
    struct      ItcHeader       *pMsg;

/* Set up the local data area by requesting memory for it first */
    /* and setting up the global pointer area for all functions to  */
    /* access.   Then initialize this area before starting.         */ while ( SL_ReqMem(&pSLM, sizeof (*pSLM), -1) != SUCCESS );
    SetGlobalP(pSLM);
    SLM_InitLocalArea();

/* If the software being executed is trial, inform the next    */
    /* neighbour that we are up. This makes the neighbour node master */
    /* task log a network significant event, informing that trial  */
    /* software is indeed up. This should happen within a minute of the */
    /* cutover command.                                            */ if( (SW_State == SL_TRIAL_SW) && (BootData.TrialRestartCount == 0) )
        SLM_TrialStsHandler();

/* Now get into the business of things by staying in this forever */
    /* loop, getting messages from tasks like the debugger and command */
    /* processor (user interface) and executing them in a serial fashion*/ while(TRUE)
    {
        /* First flush out the messages on the EX_LISTEN, these might */
        /* be leftovers from previous queries to the slave task.      */ while( SL_ReqMsg(&pMsg, M_EX_RESPONSE, 0) == SUCCESS )
            FreeMem(pMsg);

/* Now get messages from EX_INITIAL. These are requests from */
        /* the user interface (cp and debugger and slave) tasks.     */ while( SL_ReqMsg(&pMsg, M_EX_INITIAL, SLM_MsgTimer()) != SUCCESS );

/* Get the message type and decided what to do about it */

Type = (unsigned short)pMsg -> Type;

printf("\nSLM: ");
        printf("Received message type %d from Task %d:%d on Nid.\n",
               Type, pMsg->OrigTid.Generic, pMsg->OrigTid.Instance,
               pMsg -> OrigNode);

switch (Type) { case SL_OPER_QUERY:
        case SL_OPEN_CUTOVER_QUERY:

/* When the user requests a memory card query, th */
                /* message type is either one of these. The later */
                /* done during a cutover request from the user.   */

SLM_QueryHandler(pMsg);
                break;

case SL_OPER_START:
``` sl_master.c

```c
        /* This is an instruction to start softload from
        /* source node to various destination nodes. The
        /* message contains the exact node card information
        /* required to set this up.

SIM_SoftloadHandler(pMsg);
        break;

case SL_LOADBACK_REQ:
        /* This is a request usually by the slave task,
        /* specifically, when a softload has been disrupt
        /* This request is handled by either starting a n
        /* softload intra-node, or by copying the softwar
        /* the CPU to the dirty memory card.

SIM_LoadBackHandler(pMsg);
        break;

case SL_OPER_STOP:
        /* At any time during an active softload, the ope
        /* may abort the process by stopping the softload SIM_StopHandler(pMsg);
        break;

case SL_OPER_STATUS:
        /* The operator may enquire about the status of
        /* softload through the operator interface.

SIM_StatusHandler(pMsg);
        break;

case SL_OPER_CUTOVER_REQ:
    case SL_OPER_CUTBACK_REQ:
        /* Once a card gets trial software, it is not pos
        /* to run code from it until the software has bee
        /* tested by cutting over to it.
        /* When the operator thinks that the trial softwa
        /* not running that well, this request could be 1
        /* to back out to a previous version of software.

SIM_CutOverHandler(pMsg);
        break;

case SL_OPER_UPDATE_REQ:
        /* After we are sure that the trial software runs
        /* all the memory cards are updated to the same t
        /* software and are marked as old software.

SIM_UpdateHandler(pMsg);
        break;

case SL_BATCH_STS:
        /* The master receives acknowledgements from the
        /* task for each batch of software messages that
        /* sends.

SIM_AckHandler(pMsg);
        break;

case SL_ABORT_SL:
    case SL_ABORT_LB:
        /* If the slave task recognizes an unrecoverable
        /* problem, it informs the master so that it can
        /* the softload immediately.

SIM_AbortHandler(pMsg);
        break;

case SL_TRIAL_STS:
        /* A message from a neighbour node indicating tha
        /* is running trial software. If a node running t
        /* software is unable to inform the softload mast
        /* its immediate neighbour, there is a potential
        /* problem.

SendEventLogMsg(EV_TYPE_SL, EV_SLM_TRIAL_NODE_UP,
                                       pMsg -> OrigNode, (pMsg
                                       pMsg -> Return & 0x0f);
        break;

case SL_SLIP_QUERY:
        /* A message a task inquiring whether any softloa
        /* is running in the node. Both the master or the
        /* can respond true to this query.

SIM_SlipHandler(pMsg);
        break;

default:
        break;
    }

/* Reuse the message just received for cutover and update
    /* requests, but free the message received otherwise.

if( Type != SL_OPER_CUTOVER_REQ && Type != SL_OPER_UPDATE_REQ &&
        Type != SL_OPER_CUTBACK_REQ && Type != SL_SLIP_QUERY )
        FreeMem(pMsg);

/* Should never reach here !!!

return(FAILURE);
```

```
sl_master.c

SLM_TrialStsHandler()
{
    int             Node;
    unsigned char   Release;

/* Before the cutover there were no neighbors - so do not even
    /* bother to send a message to a neighbor because there will not be */
    /* one.

if( !( BootData.StartUpSaveCodes & THERE_ARE_NEIGHBORS ) )
        return(SUCCESS);

/* At startup, delay for about thirty seconds to let links come up

Delay(TEN_SECONDS * 3);

Node = MAXNODES + 1;
    Retry = 3;

while ( (--Retry) > 0 )
    {
        while( (--Node) >= 0 )
        {
            /* Skip your own node, because Route will always find it if( Node == GetNodeId() )
                continue;

if( Route(Node) == Node )
            {
                /* Pack the release number and subrelease in a ch Release = SW_Release << 4 | (SW_SubRelease >> 4);

/* If the neighbour gets the message thats all we if( SL_SendMsg( Node, SL_TRIAL_STS, SLM_TId, SLM_TId,
                                EX_INITIAL, Release, NULL
                    return(SUCCESS);
            }
        }

/* Delay for another minute before trying again !!

Delay(3 * TEN_SECONDS);
    }

/* If there were neighbors before this software was executed, we
    /* should cutback because we have lost the connectivity that was
    /* previously there.

/* Log the event that the node is about to cutback and wait for
    /* the cutback to happen !

SendEventLogMsg(EV_TYPE_NODE, EV_CUTBACK_NO_NEIGHBOR,
                    SW_Release, SW_Version, SW_Edit, CPUNetAd Delay(TEN_SECONDS);

/* Tell the GM to cutback because of this reason and just wait
    /* for the cutback to happen !

SL_TellGM(SL_GM_CUTBACK_ISOLATED, NULL);

SL_DelayForever();
    return(SUCCESS);
}
```

```c
SLM_QueryHandler(pMsg)
struct SL_NodeCard_Packet       *pMsg;
{
    unsigned short              DestNode[SL_MAX_T
                                              C
                                              N
    int struct  ItcHeader
    struct  SL_Query_Packet         *pSLM;
    register struct SLM_Local_Data  *pItc;

pSLM = (struct SLM_Local_Data *)GlobalP;

/* Get the memory required to send the query response. */ if( (Status = SL_ReqMem(&pPkt, sizeof (*pPkt), -1)) != SUCCESS )
        return(Status);

/* Flush out the response exchange to clean-up any messages from
    /* the slave task before doing this query.

while( SL_ReqMsg(&pItc, M_EX_RESPONSE, 0) == SUCCESS )
        FreeMem(pItc);

/* Initialize the destination node fields to zero in a local area.
    /* This are will eventually contain the nodes that the query
    /* request has been sent out to.

SL_InitBytes(&DestNode[0], sizeof (DestNode), 0);
    NbrNodes = 0;
    pNode = &DestNode[0];

for( Counter = 0; Counter < SL_MAX_TARGET_NODES; ++Counter )
    {
        /* If the node number is zero, we are done with the list */ if( !(*pNode = pMsg -> SL_Dest[Counter].SL_NodeNo) )
            break;

/* If we could send a message to the node requested, we will
        /* save the information.

else if( (Status = SL_SendMsg(*pNode, SL_MEMCARD_REQ, SLM_TId, SLS_TId,
                                                                EX_INITIAL, 0,
        {
            ++pNode;
            ++NbrNodes;
        }

/* If there is no memory in the system there is no point in
        /* even responding.

else if( Status == SL_NO_MEMORY )
            return(FAILURE);

else
            /* Set the current node to 0, indicating that we should n
            /* look for it.

*pNode = 0;
    }
```

```c
/* Initialize the number of nodes and set status to SUCCESS */

Status = SUCCESS;

/* Now wait on a response from each of the nodes that we have
/* queried and format the memory card information compactly using
/* the SLM_FormResponse function.

while( NbrNodes && Status == SUCCESS )
{
    if( (Status = SL_ReqMsg(&pItc, M_EX_RESPONSE, -1)) == SUCCESS )
    {
        pNode = &DestNode[0];
        Counter = SL_MAX_TARGET_NODES;
        while ( --Counter >= 0 )
        {
            if( !(*pNode) )
                break;

if (*pNode == pItc->OrigNode)
            {
                SLM_FormResponse(pItc, pPkt);
                --NbrNodes;
                break;
            }
            pNode++;
        }
        FreeMem(pItc);

/* If there are still more nodes to respond, we are out of luck
        /* since we have waited enough for them.

else if( NbrNodes )
            Status = SL_TIMEOUT;

else
            Status = SUCCESS;
    }

/* Send the message only if there is something to say
    /* The SLM_FormResponse routine fills in the number of nodes that
    /* have responded. If that is zero, let the user task time out.

if( pPkt -> SL_ItcHdr.Return )
    {
        pPkt -> SL_ItcHdr.Length = sizeof (*pPkt) - sizeof (pItc);

Status = SL_SendMsg(pMsg -> SL_ItcHdr.OrigNode, SL_ACK, SLM_TId,
                                    pMsg -> SL_ItcHdr.OrigTId, EX_OPE
                                    pPkt -> SL_ItcHdr.Return, pPkt);
    }
    else
        FreeMem(pPkt);

return(Status);
}
``` sl_master.c

```c
SLM_SoftloadHandler(pMsg)
struct  SL_NodeCard_Packet         *pMsg;
{
    unsigned char                   RC,
    unsigned short                  Node, Card;
    int                             *pNode;     *pNodeCard;
    struct  SL_Node_Descriptor      *pNode;
    struct  SL_NodeCard             *pNodeCard;
    register struct SLM_Local_Data  *pSLM;

pSLM = (struct SLM_Local_Data *)lGlobalP;
    Card = pMsg -> SL_Src.SL_CardNo;

#ifdef ERNIE_PROM_CODE

/* If this software is running on the Ernie basic system set, do
    /* not allow this node to be the source, since it might be
    /* autoloading and will cause a restart in the near future. !!

RC = SL_S20_BASIC_CODE_RUNNING;

#else

/* This request is valid only if the master task and the slave task */
    /* are not currently busy doing softloads, together with a rather
    /* stringent set of other requirements. Only if the climate is
    /* absolutely perfect will the master allow a softload to start.

RC = SL_MASTER_SL_IN_PROG;
    if( !(pSLM -> SLM_In_Progress) )
    {

/* Set the local source card up first. The master sends a local
        /* info request to the slave task and determines from this
        /* information if the source card is appropriate. If not it
        /* lets the user task know through the return mechanism what
        /* the problem is.

if( (RC = SLM_SetSrcCard(Card)) == SUCCESS')

/* Now inform the slave tasks in all the destination node
            /* about an impending softload in birth. The slave tasks
            /* should acknowledge this.

*(int *)&EventNodes[0] = 0;
            pNodeCard = &pMsg -> SL_Dest[0];
            pNode = &pSLM -> SLM_Ndsc[0];
            Counter = SL_MAX_TARGET_NODES;
            while( --Counter >= 0 )
            {

/* Derieve the node and card requested by the use
                /* the destination targets. Let the slave know.

if( !(Node = pNodeCard -> SL_NodeNo) )
                    break;
                Card = pNodeCard++ -> SL_CardNo;

if( (Status = SLM_SetDstCard(Node, &Card)) == SUCCESS )
                {
                    pNode -> SL_Ndsc.NodeCard.SL_NodeNo = Node;
                    pNode -> SL_Ndsc.NodeCard.SL_CardNo = Card;
                    EventNodes[pSLM -> SLM_NbrTgtNodes] = Node;
                    ++(pSLM -> SLM_NbrTgtNodes);
                    ++pNode;
                }
                else
                {
                    /* RC does get overwritten in the stateme
                    /* If two or more nodes indicate failures
                    /* right now we will have to bear with th RC = Status;
                    Status = SUCCESS;
                    continue;
                }
            }

/* If none of the nodes are ok, initialize the source car if( !(pSLM -> SLM_NbrTgtNodes) )
                SL_InitCard(&pSLM -> SLM_Cdsc);
        }
    } endif  /* ERNIE_PROM_CODE if( (RC != SL_MASTER_SL_IN_PROG) && (pSLM -> SLM_NbrTgtNodes) )
    {
        Status = SL_ACK;
        SendEventLogMsg(EV_TYPE_SL, EV_SLM_SOFTLOAD_INITIATED,
                        CardNetAddr(&pSLM -> SLM_Cdsc.SL_Card_Sts.
                        *(int *)&EventNodes[0]);
    }
    else
        Status = SL_NAK;

/* Send the status of the start softload command to the user

SL_SendMsg(    pMsg -> SL_ltclHdr.OrigNode, Status, SLM_Tld,
                   pMsg->SL_ltcHdr.OrigTid, EX_OPER_RESPONSE, RC, NULL);

/* Start the softload as soon as we can, sending software to the
    /* nodes in question.

if (Status == SL_ACK)
        SLM_Start_Softload();

return(SUCCESS);
}
``` sl_master.c

```c
SLM_LoadBackHandler(pMsg)
struct ItcHeader       *pMsg;
{
    struct SLM_Local_Data    *pSLM;

pSLM = (struct SLM_Local_Data *)GlobalP;
    if( pSLM -> SLM_In_Progress )
    {
        /* If there is a softload to the current node, it is alright to  *
         * start a loadback, otherwise we have to let it go and hope for *
         * other recovery mechanisms to work - through the boot on a     *
         * restart.                                                      */ if( (pSLM->SLM_NbrTgtNodes > 1) ||
            (pSLM->SLM_Ndsc[0].SL_Ndsc_NodeCard.SL_NodeNo != pMsg->OrigNode)
        {
            SL_SendMsg(pMsg -> OrigNode, SLM_LOADBACK_STS, SIM_TId, SLS_TId,
                EX_PACKET, SL_MASTER_SL_IN_PROG, NULL);

SendEventLogMsg(EV_TYPE_SL, EV_SIM_LOADBACK_NOT_ATTEMPTED);

return(FAILURE);
        }

/* There is a softload to the local slave currently in *
         * progress, abort it and start a loadback procedure.  */

SendEventLogMsg(EV_TYPE_SL, EV_SIM_SLABORT_SLAVE,
            CardNetAddr (pSLM -> SIM_Cdsc.SL_Card_Sts.SL_Card),
            EV_TOK_CARD_ID(pSLM -> SIM_Ndsc[0].SL_Ndsc_NodeCard.SL_No
                pSLM -> SIM_Ndsc[0].SL_Ndsc_Nod
            SL_LOADBACK_INITIATED);
        SIM_CleanUp(0, SL_SOFTLOAD_ABORTED, SL_LOADBACK_INITIATED);
    }

/* Now analyze the message from the slave task and determine if the */
    /* loadback really has to be performed. If it has, there are two    */
    /* choices. If an additional card exists that contains good         */
    /* softloadable code, start a new softload, otherwise go and copy   */
    /* the code from the CPU to the correct memory card.                */

SIM_LoadBack(pMsg);

return(SUCCESS);
}

SIM_StopHandler(pMsg)
struct SL_NodeCard_Packet    *pMsg;
{
    unsigned char    Status;
    unsigned short   RC;
    int              Node;
    register struct SIM_Local_Data  *pSIM;
    struct   SL_NodeCard            *pNC;
    struct   SL_Node_Descriptor     *pNdsc;

pSLM = (struct SIM_Local_Data *)GlobalP;

RC = SL_NO_SL_IN_PROG;
    Status = SL_NAK;
    if( pSLM -> SIM_In_Progress )
    {

/* If no nodes are specified, then abort the entire softload *
         * otherwise pick the nodes that have to be discouraged from *
         * doing a softload.                                         */

RC = SUCCESS;
        pNC = &pMsg -> SL_Dest[0];
        pNdsc = &pSLM -> SIM_Ndsc[0];
        Node = pNC -> SL_NodeNo;
        Counter = SL_MAX_TARGET_NODES;
        if( !Node )
        {
            /* Copy all the nodes doing a softload to the message tha *
             * was just received.                                     */ while(--Counter >= 0)
                pNC++ -> SL_NodeNo = pNdsc++ -> SL_Ndsc_NodeCard.SL_NodeN /* Now try to send a message to the nodes that are being *
             * requested to stop the softload in progress.           */ pNC = &pMsg -> SL_Dest[0];
            Counter = SL_MAX_TARGET_NODES;
            while(--Counter >= 0 )
            {
                if ( !(Node = pNC++ -> SL_NodeNo) )
                    continue;

pNdsc = &pSLM -> SIM_Ndsc[0];

for( Dummy = 0; Dummy < SL_MAX_TARGET_NODES; ++Dummy, ++pNdsc )
                {
                    if( Node == pNdsc -> SL_Ndsc_NodeCard.SL_NodeNo )
                    {
                        SL_SendMsg (Node, SL_ABORT_SL, SIM_TId, SLS_TId,
                            EX_PACKET, 0, NULL);
                        SendEventLogMsg(EV_TYPE_SL, EV_SIM_SLABORT_OPER,
                            CardNetAddr(pSLM -> SIM_Cdsc.SL_Card_Sts.SL_Ca
                            EV_TOK_CARD_ID(Node,pNdsc->SL_Ndsc_NodeCard.SL
                        SIM_CleanUp(Dummy, SL_SOFTLOAD_ABORTED, 0);
                        Status = SL_ACK;
                        break;
``` sl_master.c

```
                        }
              else if( Dummy == SL_MAX_TARGET_NODES )
                        RC = FAILURE;
              }
      SL_SendMsg(pMsg -> SL_ItcHdr.OrigNode, Status, SIM_Tid,
                 pMsg -> SL_ItcHdr.OrigTid, EX_OPER_RESPONSE, RC, NULL);
      return(Status);
      }

SIM_StatusHandler(pMsg)
struct  ItcHeader                               *pMsg;
     {
     unsigned char                              RC;
     int
     struct    SL_LoadSts_Descriptor            *pSts = NULL;
     struct    SL_Card_Status                   ,           *pCard;
     register struct SIM_Local_Data             *pSLM;

pSLM = (struct SIM_Local_Data *)GlobalP;

RC = SL_NO_SL_IN_PROG;
     if( pSLM -> SLM_In_Progress )
          {
          RC = SL_NO_MEMORY;
          if ( SL_ReqMem(&pSts, sizeof (*pSts), -1) == SUCCESS )
               {
               Status = SL_ACK;
               pCard = &pSLM -> SLM_Cdsc.SL_Card_Sts;
               pSts -> SL_ldsc_Card      = pCard -> SL_Card;
               pSts -> SL_ldsc_Rel       = pCard -> SL_Rel;
               pSts -> SL_ldsc_LoadBytes = pSLM -> SLM_LoadBytes;
               SLM_Fill_ldsc(pSts);
               pSts -> SL_ItcHdr.Length = sizeof (*pSts) - sizeof (*pMsg);
               RC = SUCCESS;
               }
          }

SL_SendMsg(pMsg -> OrigNode, Status, SIM_Tid, pMsg -> OrigTid,
                EX_OPER_RESPONSE, RC, pSts);

return(RC);
     }
``` sl_master.c

```c
SLM_CutOverHandler(pMsg)
struct  SL_NodeCard_Packet              *pMsg;
{
    unsigned char                       RC;
    unsigned short                      Node;
    int struct  ItcHeader                   *pItc = N
    struct  Tid                         OrigTid;
    register struct SLM_Local_Data      *pSLM;

pSLM = (struct SLM_Local_Data *)GlobalP;

/* Extract the origination node and TID from the message and reuse it*/

Node = pMsg -> SL_ItcHdr.OrigNode;
    OrigTid = pMsg -> SL_ItcHdr.OrigTid;

If( pMsg -> SL_ItcHdr.Type == SL_OPER_CUTOVER_REQ )
        Type = SL_CUTOVER_REQ;
    else
        Type = SL_CUTBACK_REQ;

/* Disallow the cutover if the master is still softloading

RC = SL_MASTER_SL_IN_PROG;
    If( !(pSLM -> SLM_In_Progress) )
    {
                                        /* Ask the slave if it is ready to do the cutover. This is the  *
                                         /* only function that requires intelligence in th slave task.   *
                                         /* The slave will determine if the cutover target exists,       *
                                         /* contains new code and the software on the card is good. If   *
                                         /* not it will return the appropriate error.

RC = SL_TASK_NOT_RESPONDING;
        If ( SL_SendMsg (GetNodeId(), Type, SLM_Tid, SLS_Tid, EX_PACKET,
                    0, pMsg) == SUCCESS )
        {
            If ( SL_ReqMsg(&pItc, M_EX_RESPONSE, -1) == SUCCESS )
            {
                                        /* Look at the message received from the slave ta
                                         /* determine if it is a go or no go situation and
                                         /* in the return code from the slave.

If( pItc -> Type == SL_NAK )
                    RC = pItc -> Return;
                else
                {
                    RC = SUCCESS;
                    Status = SL_ACK;
                }
                FreeMem(pItc);
            }
            else
            {
ifdef PRINTF
                printdbg("\nSLM: ");
                printdbg("Timed out on cutover request to slave");
                printdbg("\n");
endif
            }
```

```c
#ifdef PRINTF
            else
            {
                printdbg("\nSLM: ");
                printdbg("Unable to request slave to perform cutover");
                printdbg("\n");
            }
#endif
        }
        else
        {
ifdef PRINTF
            printdbg("\nSLM: ");
            printdbg("Softload in progress, cannot accomodate cutover request");
            printdbg("\n");
endif
        }

SL_SendMsg(Node, Status, SLM_Tid, OrigTid, EX_OPER_RESPONSE, RC, NULL);

FreeMem(pMsg);

return(SUCCESS);
    }
}
``` sl_master.c

```c
SLM_UpdateHandler(pMsg)
struct  SL_NodeCard_Packet              *pMsg;
{
    unsigned char                       NbrTrial,
    unsigned short                      Node, int                                 OrigTid;
    struct      TId                     *pMem = NULL;
    struct      SL_MemCard               *pMem = NULL;
    struct      SL_MemCard_Packet
    struct      SL_Card_Status           *pSts;
    register struct SLM_Local_Data       *pSLM;

/*          Get the global data area pointer, save off the Origination      */
    /*          node and tid for future use and reuse the message                */
    pSLM = (struct SLM_Local_Data *)Global;
    Node = pMsg -> SL_ItcHdr.OrigNode;
    OrigTid = pMsg -> SL_ItcHdr.OrigTid;
    pMsg -> SL_ItcHdr.Length = 0;
    printdbg("\nSLM: ");

/* If this node is not running trial software there is no need to           */
    /* update that node.                                                        */ if( SM_State != SL_TRIAL_SW )
    {
        printdbg("N%d is not running TRAIL SW, update ignored.", GetNodeId());
        RC = SL_TRIAL_NOT_RUNNING;
    }

/*  If the master is busy doing softload, back off                          */ else if( (pSLM -> SIM_In_Progress) )
    {
        printdbg("SL in progress in N%d, update disallowed.", GetNodeId());
        RC = SL_MASTER_SL_IN_PROG;
        FreeMem(pMsg);
    }

/* Send a message to the slave task to determine the memory card            */
    /* situation in that node. Use the same message block that we got           */
    /* for this command.                                                        */
    /* Also wait to see if there is a response from the slave task and          */
    /* Nak otherwise.                                                           */ else if( (SL_SendMsg(GetNodeId(), SL_INFO_REQ, SIM_TId, SLS_TId,
                            EX_INITIAL, 0, pMsg) != SUCCESS) ||
             (SL_ReqMsg(&pMem, M_EX_RESPONSE, -1) != SUCCESS) )
    {
        printdbg("Error in communication with SLAVE on N%d.", GetNodeId());
        RC = SL_TASK_NOT_RESPONDING;
    }

/* We have a reply, apply algorithm for validity. First verify              */
    /* that the slave is not softloading. Go through all the cards and          */
    /* see if a trial card exists with a full release set, i.e.                 */
    /* Version != 0. Also make sure that no more than trial card                */
    /* exists for sanity.                                                       */ else if( pMem -> SL_Nsts.SL_Nsts_Progress )
    {
        printdbg("SL in progress in N%d, update disallowed.", GetNodeId());
```

```c
        RC = SL_SLAVE_SL_IN_PROG;
    }
    else
    {
        /* Go through all the cards in the node and determine their             */
        /* status with respect to softload.                                     */ pMemCard = &pMem -> SL_MemCard_Pkt[0];
        for( Counter = 0; Counter < SL_MAX_MEM_CARDS ; ++Counter )
        {
            pSts = &pMemCard->SL_Card_Sts;

/* If the end of the list is reached, exit.                         */ if( pSts -> SL_Card == 0xffff)
                break;

/* If this is a trial card, check to see if there is code           */
            /* on it.                                                           */ if( (pSts -> SL_State == SL_TRIAL_SW) &&
                (pSts -> SL_Rel.SL_Version != 0) )
            {
                CardIndex = Counter;
                ++NbrTrial;
            }
            ++pMemCard;
        }

/*      Based on the algorithm above, set RC accordingly. This wi       */
        /*      inform the command processor the appropriate status of         */
        /*      "Update"                                                        */ if( !NbrTrial )
        {
            printdbg("No trial cards found.");
            RC = SL_NO_TRIAL_CARD;
        }
        else if (NbrTrial > 1)
        {
            printdbg("More than one trial card present.");
            RC = SL_2_TRIAL_CARDS;
        }
        else
        {
            /* If the trial cards version and edit # of software matc           */
            /* with what is currently running, go for it.                       */ pSts = &pMem -> SL_MemCard_Pkt(CardIndex).SL_Card_Sts;
            if ( (pSts -> SL_Rel.SL_Version == SW_Version) &&
                 (pSts -> SL_Rel.SL_Edit == SW_Edit) )
                RC = SUCCESS;
            else
            {
                printdbg("TRIAL SW not currently loaded.");
                RC = SL_TRIAL_NOT_RUNNING;
            }
        } if( (RC == SUCCESS) || NodeIsErnie() )
        {
            if( SL_VerifyMemory() != SUCCESS )
            {
``` sl_master.c

```
            FreeMem(pMem);
            printdbg("Checksum error on cpu code.");
            RC = SL_CPU_CHECKSUM_ERROR;
        }
        else
        {
            printdbg("... Updating SW on N%d ",        GetNodeId());
            Status = SL_ACK;
            if( RC == SUCCESS )
                printdbg("to Version %d.%d on Card %d.",
                            SW_Version, SW_Edit, pSts -> SL_
            else        RC = SUCCESS;
        }
    } printdbg("\n");

/* Send the appropriate response to the operator interface.

SL_SendMsg(Node, Status, SLM_Tid, OrigTid, EX_OPER_RESPONSE, RC, NULL);

/* If the update has to happen, do it for each card in the node
    /* except the trial card that has the software already, but change
    /* its status to SL_OLD_SW before starting off.

if( Status == SL_ACK )
    {
        SLM_UpdateCard(pMem, CardIndex);
        FreeMem(pMem);
    } return(Status);
}
```

```
SLM_AckHandler(pMsg)
SL_Status_Packet                   *pMsg;
{
    unsigned char                  NbrMsgs,
    unsigned short                 Node;
    int
    register struct  SL_Node_Descriptor
    register struct  SL_Batch_Descriptor     *pBatch;    *pNode;
    register struct  SL_Batch_Status                     *pSts;
    register struct  SLM_Local_Data                      *pSLM;

pSLM = (struct SLM_Local_Data *)GlobalP;
    Node = pMsg -> SL_ItcHdr.OrigNode;
    RC = pMsg -> SL_ItcHdr.Return;

pSts  = &pMsg -> SL_Sts_Pkt;
    pNode = &pSLM -> SLM_Ndsc[0];
    NodeIndex = -1;

for( NodeIndex = 0; NodeIndex < pSLM -> SLM_NbrTgtNodes;
                        ++NodeIndex, ++pNode )
    {
        if( Node == pNode -> SL_Ndsc_NodeCard.SL_NodeNo )
        {
            if( pNode -> SL_Ndsc_Over )
            {
                            /* If softload has completed, this is an indicati
                            /* the slave task that it has also completed the
                if( RC == SUCCESS )
                    Counter = EV_SIM_SOFTLOAD_COMPLETE;
                else
                    Counter = EV_SIM_SLABORT_ERROR;

SendEventLogMsg(EV_TYPE_SL, Counter,
                    CardNetAddr(pSLM -> SLM_Cdsc.SL_Card_Sts.SL_Card)
                    EV_TOK_CARD_ID(Node,            pNode->SL_Ndsc_NodeCar
                SLM_CleanUp(NodeIndex, (RC == SUCCESS ? SUCCESS:FAILURE),
            }
            else if( pSts->SL_Sts_BatchNo == pNode->SL_Ndsc_BatchNo )
            {
                            /* Go through the number of messages sent and set
                            /* the messages actually received to SL_EMPTY. Th
                            /* the slots could be used for new messages.

NbrMsgs = 0;
                for(Counter = 0; Counter < pNode -> SL_Ndsc_NbrMsgs; ++Co
                {
                    pBatch = &pSLM -> SLM_Bdsc[Counter] [NodeIndex];
                    if( pSts -> SL_Sts_BatchSeqNo(Counter) )
                    {
                        if (pBatch->SL_Bdsc_Sts != SL_EMPTY)
                        {
                            pNode -> SL_Ndsc_BytesRcvd +=
                            pBatch ->SL_Bdsc_Hdr.SL_ByteCount;
                            pBatch -> SL_Bdsc_Sts = SL_EMPTY;
                        }
                        ++NbrMsgs;
                    }
                    else if( pBatch -> SL_Bdsc_Sts != SL_EMPTY )
                        pBatch -> SL_Bdsc_Sts = SL_RETRY;
``` sl_master.c

```c
int                      SLM_AbortHandler(pMsg)
struct   ItcHeader       *pMsg;
{
    int
    struct     SL_Node_Descriptor              *pNdsc;
    register struct SLM_Local_Data             *pSLM;

pSLM = (struct SLM_Local_Data *)GlobalP;

/* If the master task is not busy doing a softload why should it
    /* abort, eh ?
    */
    if (pSLM -> SLM_In_Progress)
    {
        pNdsc = &pSLM -> SLM_Ndsc[0];
        for( Counter = 0; Counter < pSLM -> SLM_NbrTgtNodes;
            ++Counter, ++pNdsc )
        {
            /* Found the node which the master was softloading to !
            /* Issue the abort and forget about it. The slave node wi
            /* do the loadback if necessary.
            */
            if (pNdsc -> SL_Ndsc_NodeCard.SL_NodeNo == pMsg -> OrigNode)
            {
                SendEventLogMsg(EV_TYPE_SL, (pMsg -> Type == SL_ABORT_SL ?
                        EV_SLM_SLABORT_SLAVE : EV_SLM_SLABORT_LOADBACK),
                        CardNetAddr(pSLM -> SLM_Cdsc.SL_Card_Sts.SL_Card)
                        EV_TOK_CARD_ID(pMsg -> OrigNode,
                                       pNdsc -> SL_Ndsc_NodeC
                                       pMsg -> Return),
                        pNdsc -> SL_Ndsc_NodeC
                        pMsg -> Return);

SLM_CleanUp(Counter, SL_SOFTLOAD_ABORTED, pMsg -> Return)
                break;
            }
        }
    } return(SUCCESS);
}
```

```c
    /* If all the messages have been received, then q
    /* ahead and send another batch to the slave. Oth
    /* send the current one with the messages not rec
    */
    if( NbrMsgs == pNode -> SL_Ndsc_NbrMsgs )
        SLM_Fill_Bdsc(NodeIndex);

SLM_SendBatch(NodeIndex);

}
    break;
} return(SUCCESS);
}
``` sl_master.c

```
SLM_SlipHandler(pMsg)
struct  ItcHeader                               *pMsg;
{
    register unsigned char                      slip = 0;
    struct   ItcHeader                          *pItc;
    register struct SLM_Local_Data              *pSLM;

pSLM = (struct SLM_Local_Data *)GlobalP;

/* Send to this slave and determine if the slave is busy
            /* softloading.

if( SL_SendMsg(GetNodeId(), SL_SLIP_QUERY, SLM_TId, SLS_TId,
                    EX_PACKET, 0, NULL) == SUCCESS )
    {
        if ( SL_ReqMsg(&pItc, M_EX_RESPONSE, -1) == SUCCESS )
        {
            slip = pItc -> Return;
            FreeMem(pItc);
        }
    } if( pSLM -> SLM_In_Progress )
        slip |= (SL_MASTER_SL_IN_PROG << 4);

if( !slip )
        slip = SL_NO_SL_IN_PROG;

SL_SendMsg(pMsg->OrigNode, SL_SLIP_QUERY, SLM_TId, pMsg->OrigTId,
                EX_RESPONSE, slip, pMsg);

return(SUCCESS);
}

SLM_FormResponse(pMQ, pPkt)
struct  SL_MemCard_Query                        *pMQ;
struct  SL_Query_Packet                         *pPkt;
{
    int         SL_Card_Status
    struct      SL_Card_Status                  *pQCard, *pMQCard;

/* Find an empty slot in the list of memory card information and
            /* fill in the slot with information about the node in the query
            /* packet.

for( Counter = 0; Counter < SL_MAX_TARGET_NODES; ++Counter )
    {
        if( !(pPkt -> SL_QNode(Counter)) )
        {
                    /* Fill in the node number pPkt -> SL_QNode(Counter) = pMQ -> SL_ItcHdr.OrigNode;

/* The status of the node regarding the software it is
                    /* running (version and status)

pPkt -> SL_QNode_Sts(Counter) = pMQ -> SL_MQNode_Sts;

/* Fill in the information about the memory card that it pMQCard = &pMQ -> SL_MQCard_Sts[0];
            pQCard  = &pPkt -> SL_QCard_Sts[Counter][0];
            Counter = SL_MAX_MEM_CARDS;
            while( --counter >= 0 )
                *pQCard++ = *pMQCard++;

/* Increment the return # to indicate how many responded

++(pPkt -> SL_ItcHdr.Return);
            break;
        }
    }
    return(SUCCESS);
}
```

```
SLM_SetSrcCard(Card)
unsigned short                           Card;
{
    int                                   s;
    struct   SL_MemCard                   *pMemCard;
    struct   SL_Card_Status               *pSts;
    struct   SL_MemCard_Packet            *pMem;
    struct   SL_NodeCard_Packet           *pInfo;
    register struct  SIM_Local_Data       *pSLM;

pSLM = (struct SIM_Local_Data *)GlobalP;

Status = FAILURE;
    if( SL_ReqMem(&pInfo, sizeof (*pInfo), -1) == SUCCESS )
    {
        /* Send an info request to the slave requesting information
        /* about the cards in this node.

pInfo -> SL_Src.SL_NodeNo = GetNodeId();
        pInfo -> SL_Src.SL_CardNo = Card;
        pInfo -> SL_ItcHdr.Length = sizeof(*pInfo) - sizeof(struct ItHeader);

Status = SL_TASK_NOT_RESPONDING;
        if( SL_SendMsg(GetNodeId(), SL_INFO_REQ, SIM_Tid, SLS_Tid, EX_INITIAL,
                       0, pInfo) == SUCCESS )
        {
            /* If the message could be sent to the slave task, wait t
            /* hear its response.

if( SL_ReqMsg(&pMem, M_EX_RESPONSE, -1) == SUCCESS )
            {
                if( pMem->SL_ItcHdr.OrigNode == GetNodeId() )
                {
                    Status = SL_CARD_NOT_FOUND;
                    pMemCard = &pMem -> SL_MemCard_Pkt[0];
                    Counter = SL_MAX_MEM_CARDS;
                    while( --Counter >= 0 )
                    {
                        /* Search through all the cards a
                        /* if the source card exists and
                        /* has decent software.

pSts = &pMemCard->SL_Card_Sts;
                        if( pSts -> SL_Card == Card )
                        {
                            if( pSts -> SL_State == SL_DIRTY
                                Status = SL_CARD_IS_DIRTY
                            else if( pSts -> SL_Rel.SL_Verslo
                                Status = SL_CARD_SW_VERSI
                            else
                            {
                                /* Voila, go for
                                pSLM -> SIM_Cdsc = *pMemC
                                Status = SUCCESS;
                            }
                            break;
                        }
                        ++pMemCard;
                    }
                }
                FreeMem(pMem);
``` return(Status);

sl_master.c

```
SIM_SetDestCard(Node, pCard)
unsigned short                                  Node, *pCard;
{
    int
    struct    ItcHeader
    struct    SL_NodeCard_Packet        *pSLM;
    register struct SIM_Local_Data      *pInit;
                                        *pitc;

pSLM = (struct SIM_Local_Data *)GlobalP;

Status = SUCCESS;
    Delay = -1;

if( Node == GetNodeId() )
    {
        if( *pCard == pSLM->SIM_Cdsc.SL_Card_Sts.SL_Card )
        {
            /* The same card has been specified as the source and
            /* destination - disallow this !!

Status = SL_SAME_SRC_AND_TGT_CARD;
        }
#ifndef CLBDBG
        else if( *pCard == 0xffff )
        {
            /* The same node as the source has been specified as the
            /* destination for a CLB load !! - disallow this !!

Status = SL_SAME_SRC_AND_TGT_NODE;
        }
#endif
    } if( Status == SUCCESS )
    {
        Status = FAILURE;
        if( SL_ReqMem(&pInit, sizeof (*pInit), -1) == SUCCESS )
        {
            pInit -> SL_Src.SL_NodeNo = Node;
            pInit -> SL_Src.SL_CardNo = *pCard;
            pInit -> SL_ItcHdr.Length = sizeof (*pInit) - sizeof (*pitc);

Status = SL_TASK_NOT_RESPONDING;
            if( SL_SendMsg(Node, SL_BEGIN_SL, SIM_TId, SLS_TId, EX_PACKET, 0,
                           pInit) == SUCCESS )
            {
ifdef S20
                /* If the destination node is a S20, make sure t
                /* delay for a long period of time since the S20
                /* restart to accomodate softload.

if( *pCard == 0xffff )
                    Delay = MAXTIME_MSG * 3;
#endif
                if( SL_ReqMsg(&pitc, M_EX_RESPONSE, Delay) == SUCCESS )
                {
                    if( pitc -> OrigNode == Node )
                    {
                        if( pitc -> Type == SL_ACK )
                        {
                            Status = SUCCESS;
#ifdef S20
                            /* If we are softloading
                            /* get the CLBId that we
                            /* going to be programmin
                            if( *pCard == 0xffff )
                                *pCard = pitc -> Return;
                            else
#endif
                                Status = pitc -> Return;
                        }
                        FreeMem(pitc);
                    }
                }
            }
        }
    }
    return(Status);
}
``` sl_master.c

```c
SLM_Start_SoftLoad()
{
    int                                                 *pNode;
    struct  SL_Node_Descriptor
    register struct SLM_Local_Data                      *pSLM;

pSLM = (struct SLM_Local_Data *)GlobalP;

/* Set up the prom descriptors for the memory card to assist in the */
    /* download process. */

Status = SUCCESS;
    SLM_Fill_Pdsc();

pNode = &pSLM -> SLM_Ndsc[0];
    for( Node = 0; Node < pSLM -> SLM_NbrTgtNodes; ++Node, ++pNode )
    {
        if (pNode -> SL_Ndsc_NodeCard.SL_NodeNo != 0)

/* If there is a node to softload, fill up its batch */ pNode -> SL_Ndsc_LastBatchTime = 0;
            SLM_Fill_Bdsc(Node);

/* And send it to the node */ if( (Status = SLM_SendBatch(Node)) < FAILURE )
            {
                /* If there is serious error - passing the card o */
                /* sorts , there is no point in continue with thi */
                /* softload. */ break;
            }
            else if( Status == SUCCESS )
            {
                /* If the batch was sent to the node, we are in l */
                /* and we have begun. */ pNode -> SL_Ndsc_StartTime = GetTime();
            }
            , Status = SUCCESS;
    }

/* Set up softload in progress if we have indeed begun */ if( Status == SUCCESS && pSLM -> SLM_NbrTgtNodes )
        pSLM -> SLM_In_Progress = 1;

return(Status);
}
```

```c
SLM_Fill_Bdsc(NodeIndex)
int
{
    unsigned short                                          Prom, Batch, Fill
    int
    struct      SL_Node_Descriptor                          *pNode;
    struct      SL_Prom_Descriptor                          *pProm;
    register struct SL_Batch_Descriptor                     *pBatch;
    register struct SLM_Local_Data                          *pSLM;

/* Initialize the batch descriptors for the node in question. Since */
    /* each node may be responding differently, there is a chance that */
    /* they might be out of step, consequently each node has its own */
    /* set of descriptors. */ pSLM  = (struct SLM_Local_Data *)GlobalP;
    pNode = &pSLM -> SLM_Ndsc [NodeIndex];
    pBatch = &pSLM -> SLM_Bdsc [0] [NodeIndex];

SL_InitBytes( pBatch, (sizeof (*pBatch) * SL_MAX_BATCH_SEQ), 0);

pNode -> SL_Ndsc_NbrMsgs = 0;
    pNode -> SL_Ndsc_Timeouts = 0;

/* If we have finished downloading to this node, there is hardly */
    /* any point in continuing. */ if( pNode -> SL_Ndsc_Over )
        return(SUCCESS);

/* Increment the batch number to be sent and start filling the */
    /* header for each of messages to be sent in this batch for this */
    /* node. */

Batch = ++(pNode -> SL_Ndsc_BatchNo);

for (Counter = 0; Counter < SL_MAX_BATCH_SEQ; Counter++)
    {
        pBatch = &pSLM->SLM_Bdsc[Counter][NodeIndex];
        Filled = 0;
        Cnt = SL_MAX_PROMS;
        while( --Cnt >= 0 )
        {
            /* Rotate to the next prom in available to read from and */
            /* we are the end go back to 1. */ if( (Prom = pNode -> SL_Ndsc_PromNo++) == SL_MAX_PROMS)
                pNode -> SL_Ndsc_PromNo = 1;

pProm = &pSLM -> SLM_Pdsc[Prom - 1];
            pSize = &pProm -> SL_Pdsc_Left [NodeIndex];

/* Determine if there is any more data left in the */
            /* specified prom. If there is, fill in the details of ho */
            /* much to fill in this time around, where to start fill */
            /* from and the message and batch numbers. */ if( *pSize )
            {
                Size = *pSize;
                if ( Size > SL_MAX_MSG_SIZE )
                    Size = SL_MAX_MSG_SIZE;
```

```
sl_master.c

SIM_Fill_Pdsc()
{
    unsigned char                               Socket;
    unsigned int                                LoadBytes;
    int
    struct    SL_Prom_Descriptor       *pProm;
    struct    SL_MemCard                *pCard;
    register struct  SL_MemSocket      *pSocket;
    register struct  SIM_Local_Data    *pSLM;

pSLM  = (struct SIM_Local_Data *)GlobalP;
    pProm = &pSLM -> SIM_Pdsc[0];

SL_InitBytes( pProm, ( sizeof (*pProm) * SL_MAX_PROMS ), 0);
    pCard = &pSLM -> SIM_Cdsc;
    LoadBytes = 0;

for( Counter = 0; Counter < SL_MAX_PROMS; ++Counter )
    {
        Socket = SL_PromToSocket(Counter + 1);
        pSocket = &pCard -> SL_Socket[Socket];

if ( pSocket -> SL_PromType != SL_EMPTY_SOCKET &&
             pSocket -> SL_PromSeqNo > 0 &&
             pSocket -> SL_PromSeqNo <= SL_MAX_PROMS )
        {
            pProm -> SL_Pdsc_Size = sizeof (struct EP_Header);
            LoadBytes += pProm -> SL_Pdsc_Size;
            pSize = &pProm -> SL_Pdsc_Left[0];
            Node = SL_MAX_TARGET_NODES;
            while( --Node >= 0 )
                *pSize++ = pProm -> SL_Pdsc_Size;
        }
        ++pProm;
    } pSLM -> SIM_LoadBytes = LoadBytes;

return(SUCCESS);
} pBatch -> SL_Bdsc_Hdr.SL_BatchNo      = Batch;
        pBatch -> SL_Bdsc_Hdr.SL_BatchSeqNo   = pBatch -> SL_Bdsc_Hdr.SL_BatchPromNo  = Prom;
        pBatch -> SL_Bdsc_Hdr.SL_StartByte    = pBatch -> SL_Bdsc_Hdr.SL_ByteCount    = Size;
        pBatch -> SL_Bdsc_Sts = SL_FILLED;
        *pSize -= Size;
        Filled = 1;
        break;
    }

/* If the descriptor was not filled, get out of this loop */
    if( !(Filled) )
        break;
}

/* If there were no messages this time around, obviously we have
/* completed the softload process for this node.
*/
if( !(pNode -> SL_Ndsc_NbrMsgs) )
    pNode -> SL_Ndsc_Over = 1;

return(SUCCESS);
}
``` sl_master.c

```c
SLM_SendBatch(NodeIndex)
int
{
    int
    struct    SL_Node_Descriptor           *pNode;
    struct    SL_Batch_Descriptor          *pBatch;
    register  struct SLM_Local_Data        *pSLM;

pSLM = (struct SLM_Local_Data *)GlobalP;

/* If there is no node to send the message to we are done.

pNode = &pSLM -> SLM_Ndsc[NodeIndex];
    if( pNode -> SL_Ndsc_NodeCard.SL_NodeNo == 0 )
        return(SUCCESS);

/* Determine if it time to send the batch. We come here for resends */
    /* and retries, so we need to clarify that we are not sending the
    /* batch too soon.

if( (GetTime() - pNode->SL_Ndsc_LastBatchTime) > SL_LOAD_TIMEOUT )
    {
        if( ++(pNode -> SL_Ndsc_Timeouts) >= SL_MAX_MSG_RETRIES )
        {
            SendEventLogMsg(EV_TYPE_SL, EV_SLM_SLABORT_TIMEOUT,
                            CardNetAddr(pSLM -> SLM_Cdsc.SL_Card_Sts.SL_Card)
                            EV_TOK_CARD_ID(pNode -> SL_Ndsc_NodeCard.SL_NodeN
                                           pNode -> SL_Ndsc_NodeC SLM_CleanUp(NodeIndex, SL_TIMEOUT, 0);
            return(FAILURE);
        }

/* If the load is complete send the SL_END_SL signal if( pNode -> SL_Ndsc_Over )
        {
            Status = SL_SendMsg(pNode -> SL_Ndsc_NodeCard.SL_NodeNo,
                                SL_END_SL, SLM_TId, SLS_TId, EX_PACKE
        }

/* For all other batches send the packets themselves.

NbrMsgs = pNode -> SL_Ndsc_NbrMsgs;
        for (Counter = 0; Counter < NbrMsgs; Counter++)
        {
            pBatch = &pSLM->SLM_Bdsc[Counter](NodeIndex];
            if( pBatch -> SL_Bdsc_Sts != SL_EMPTY )
                if( (Status = SLM_SendPacket(pBatch, pNode)) != SUCCESS )
                    break;
        } if (Status == SUCCESS)
            pNode -> SL_Ndsc_LastBatchTime = GetTime();
#ifdef PRINTF
        printdbg("\nSLM: ");
        printdbg("Batch %d sent to Node %d with %d messages",
                 pNode -> SL_Ndsc_BatchNo,
                 pNode -> SL_Ndsc_NodeCard.SL_NodeNo, pNode -> SL_Ndsc_Nbr
#endif
        }
        else
            SLM_CleanUp(NodeIndex, FAILURE, Status);

return(Status);
    }
}
```

```c
SLM_SendPacket(pBatch, pNode)
struct  SL_Batch_Descriptor   *pBatch;
struct  SL_Node_Descriptor    *pNode;
{
    int
    unsigned int                              Dummy;
    struct  SL_Data_Msg                       *pData = NULL;
    struct  SL_Batch_Header                   *pBatchHdr;
    register struct SLM_Local_Data            *pSLM;

pSLM = (struct SLM_Local_Data *)GlobalP;

Status = SL_ReqMem(&pData, sizeof (*pData), MAXTIME_MEM);
    if (Status != SUCCESS)
        return(Status);
    /*       Initialize the header of the message            */ pBatch -> SL_Bdsc_Hdr.SL_NextByte = 0;
    pBatch -> SL_Bdsc_Hdr.SL_BatchNbrMsgs = pNode -> SL_Ndsc_NbrMsgs;
    pBatch -> SL_Bdsc_Hdr.SL_pNextMsg = NULL;

pBatchHdr = &pData -> SL_Batch_Hdr;
    *pBatchHdr = pBatch -> SL_Bdsc_Hdr;

/* Tas the source memory card before starting to read. */
    Status = SL_TasMemCard(pSLM -> SLM_Cdsc.SL_Card_Sts.SL_Card,
                           &pSLM -> SLM_TasCard);
    if (Status == SUCCESS)
    {
        /* We have the tas, go ahead and read the memory card for    */
        /* software data. All the information for the read resides in */
        /* the batch header.                                          */

Status = SL_PromIO(pData, SL_READ);

/* Untas the memory card after the read so that others may get */
        /* in.                                                          */

SL_UnTasMemCard(pSLM -> SLM_Cdsc.SL_Card_Sts.SL_Card,
                        &pSLM -> SLM_TasCard);
    }
    else
    {
        /* Could not tas the memory card, abort the softload !! */

SendEventLogMsg(EV_TYPE_SL, EV_SLM_SLABORT_ERROR,
                        CardNetAddr(pSLM -> SLM_Cdsc.SL_Card_Sts.
                        EV_TOK_CARD_ID(pNode -> SL_Ndsc_NodeCard.
                        pNode -> SL_Ndsc_NodeCard.SL_CardNo), Sta SL_SendMsg (pNode -> SL_Ndsc_NodeCard.SL_NodeNo, SL_ABORT_SL, SIM_Tid,
                    SLS_Tid, EX_PACKET, 0, NULL);
    }
    if (Status == SUCCESS)
    {
        /* Send this packet to the slave task in the correct node. */ pData->Sl_ItcHdr.length = sizeof (*pData) - sizeof (struct ItcHeader);

Status = SL_SendMsg(pNode -> SL_Ndsc_NodeCard.SL_NodeNo, SL_DATA_PKT,
                            SIM_Tid, SLS_Tid, EX_PACKET, 0, p /* Fill in the status information for softload queries. */ if (Status == SUCCESS)
        {
            Dummy = pBatch -> SL_Bdsc_Hdr.SL_ByteCount;

if (pBatch -> SL_Bdsc_Sts == SL_FILLED)
            {
                ++(pNode -> SL_Ndsc_MsgsSent);
                pNode -> SL_Ndsc_BytesSent += Dummy;
                pBatch -> SL_Bdsc_Sts = SL_SENT;
            }
            else if (pBatch -> SL_Bdsc_Sts == SL_SENT)
            {
                ++(pNode -> SL_Ndsc_MsgsResent);
                pNode -> SL_Ndsc_BytesResent += Dummy;
            }
            else
            {
                ++(pNode -> SL_Ndsc_MsgsRetried);
                pNode -> SL_Ndsc_BytesRetried += Dummy;
            }
            pBatch -> SL_Bdsc_Sts = SL_SENT;
        }
        else
            SendEventLogMsg(EV_TYPE_SL, EV_SLM_SLABORT_MSGERROR,
                            CardNetAddr(pSLM -> SLM_Cdsc.SL_Card_Sts.
                            EV_TOK_CARD_ID(pNode -> SL_Ndsc_NodeCard.
                            pNode -> SL_Ndsc_NodeCard.SL_CardNo));
    }
    else
        FreeMem(pData);

return(Status);
}
``` sl_master.c

```c
SLM_UpdateCard(pMem, CardIndex)
struct  SL_MemCard_Packet       *pMem;
unsigned char                    CardIndex;
{
    int                  Sts;
    struct  SL_MemCard          *pMemCard;
    struct  SL_Card_Status      *pSts;
    char    Sts = 0;
    /* Mark the trial card as containing old software first. */ if( CardIndex < SL_MAX_MEM_CARDS )
    {
        pMemCard = &pMem -> SL_MemCard_Pkt[CardIndex];
        SL_Change_SW_Sts(pMemCard -> SL_Card_Sts.SL_Card, SL_OLD_SW, SIM_Tid);
    }

/* Also let the OM know that the software is no longer trial ! */

SL_TellOM(SL_OM_UPDATE, NULL);

/* Now go ahead and copy the code from this cpu to all the memory
    /* cards in the node.
    */
    pMemCard = &pMem -> SL_MemCard_Pkt[0];
    for( Counter = 0; Counter < SL_MAX_MEM_CARDS; ++Counter, ++pMemCard )
    {
        /* Skip the trial card itself - It now has "old" software. */ if( Counter == CardIndex )
            continue;

pSts = &pMemCard -> SL_Card_Sts;

/* If all cards are completed, we are done. */ if( pSts -> SL_Card == 0xffff)
            break;

/* Skip newer card types */
        /* Memory cards with CodeType > 0 are treated differetly */
        /* So we have reserved 1...0x40 for new codetypes */
        Sts = pMemCard->SL_Card_Sts.SL_State;
        if ((Sts > SL_OLD_SW) && (Sts < SL_NEW_TYPE_RANGE))
            continue;

/* Set the card to dirty first. Then do the copy, and finally
        /* change the status back to old.
        */
        SLM_Recovery (pSts -> SL_Card);
    }
    return(SUCCESS);
}
```

```c
SLM_LoadBack(pMsg)
struct  SL_MemCard_Packet       *pMsg;
{
    unsigned short                   SrcCard, DestCard;
    unsigned char                    NbrMemCards, Stat
    int                              C
    struct  SL_Card_Status          *pSts;
    struct  SL_MemCard              *pMemCard;
    register struct SIM_Local_Data  *pSIM;

/* Initialize the source and destination card and indices */ pSLM = (struct SLM_Local_Data *)GlobalP;
    SrcCard = DestCard = 0xfff;
    SrcIndex = 0xff;
    NbrMemCards = 0;

/* Find out the total number of memory cards. If we have only one
    /* we are in trouble !!
    */
    pMemCard = &pMsg -> SL_MemCard_Pkt[0];
    Counter = SL_MAX_MEM_CARDS;
    while( --Counter >= 0 )
    {
        if (pMemCard++ -> SL_Card_Sts.SL_Card == 0xffff)
            break;
        ++NbrMemCards;
    }

/* If there is only one memory card in the node and that is the
    /* dirty one, we are in deep trouble - The only memory card in the
    /* node is bad, so we will not be able to load if we have a
    /* problem. Do a drastic copy from the CPU if there are no checksum */
    /* errors.
    */ pMemCard = &pMsg -> SL_MemCard_Pkt[0];
    pSts = &pMemCard -> SL_Card_Sts;

if( NbrMemCards == 1 )
    {
        /* Just making sure that the card is indeed dirty. If it is
        /* not just return because there is nothing to be done. The
        /* recovery has been self completed. Chances are that it will
        /* be since softload just failed, but the card being written
        /* into could have been removed leaving a solitary good card.
        */
        if( pSts->SL_State != SL_DIRTY_SW && pSts->SL_Rel.SL_Version != 0 )
        {
            SL_SendMsg (pMsg -> SL_ItcHdr.OrigNode, SL_LOADBACK_STS, SIM_Tid,
                        SLS_Tid, EX_PACKET, SUCCESS, NULL);
            return(SUCCESS);
        }

/* Else set up the destination card as this card for a cpu to
        /* memory card copy.
        */
        DestCard = pSts -> SL_Card;
    }
    else if ( NbrMemCards > 0 )
    {
        /* Now check whether the dirty card exists in the slot that was
``` sl_master.c

```c
/* specified. If not there is no point in continuing.

Counter = NbrMemCards;
while( --Counter >= 0 )
{
    /* Now determine from the set of cards available, which o
    /* is the one to source from. Make sure that the dirty ca
    /* still exists, because most of the time, it will be the
    /* culprit that caused the problem in the first place - 1
    /* being pulled out.

State = pSts -> SL_State;

if( State == SL_DIRTY_SW && DestCard == 0xffff )
        DestCard = pSts -> SL_Card;
    else if( (State == SL_OLD_SW || State == SL_TRIAL_SW) &&
             SrcCard == 0xffff )
    {
        /* This is a good candidate, make sure that the
        /* version atleast corresponds to the one running
        /* the CPU !

if ( pSts -> SL_Rel.SL_Version == SW_Version &&
             pSts -> SL_Rel.SL_Edit    == SW_Edit )
        {
            SrcIndex = NbrMemCards - Counter - 1;
            SrcCard = pSts -> SL_Card;
        }
    }

/* Go to the next card and the search continues

++pMemCard;
    pSts = &pMemCard -> SL_Card_Sts;

/* Now look at what we have got. We will start a loadback only  *
    /* If we have both a source card and a destination card !! This *
    /* means that there should be both a good software card and a   *
    /* bad one !!. If there is no bad card we are in luck !

if( DestCard != 0xffff )
    {
        if( SrcCard != 0xffff )
        {
            /* We have bot a good and a bad card, set the tar
            /* card and away we go.

pSLM -> SLM_Cdsc = pMsg -> SL_MemCard_Pkt[SrcIndex];
            if( SLM_SetDestCard( pMsg -> SL_ItclHdr.OrigNode, &DestCar
            {
                pSLM -> SLM_Ndsc[0].SL_Ndsc_NodeCard.SL_NodeNo =
                        pMsg -> SL_ItclHdr.OrigNode;
                pSLM -> SLM_Ndsc[0].SL_Ndsc_NodeCard.SL_CardNo =
                pSLM -> SLM_NbrTgtNodes = 1;
                SendEventLogMsg(EV_TYPE_SL, EV_SLM_LOADBACK_INITI
                        CardNetAddr(pSLM -> SLM_Cdsc.SL_Card_Sts.
                        CardNetAddr(DestCard) );
                SLM_Start_Softload();
                return(SUCCESS);
            }
        }
        else
            SL_InitCard(&pSLM -> SLM_Cdsc);

SL_SendMsg(pMsg -> SL_ItclHdr.OrigNode, SL_LOADBACK_STS, SLM_Tid,
                   SLS_Tid, EX_PACKET, SUCCESS, NULL);
        return(SUCCESS);
    }
    else
    {
        /* No memory cards in this node, just say that we are done.
        SL_SendMsg(pMsg -> SL_ItclHdr.OrigNode, SL_LOADBACK_STS, SLM_Tid,
                   SLS_Tid, EX_PACKET, SUCCESS, NULL);
        return(SUCCESS);

/* No good source card available - The only way out is to copy from
        /* memory onto this card.

SL_SendMsg(pMsg -> SL_ItclHdr.OrigNode, SL_LOADBACK_STS, SLM_Tid, SLS_Tid,
                   EX_PACKET, FAILURE, NULL);

SLM_Recovery(DestCard);

return(SUCCESS);
    }
}
```

```c
SLM_Recovery(Card)
unsigned short        Card;
{
    unsigned char     State;
    int
    struct SLM_Local_Data    *pSLM;

pSLM = (struct SLM_Local_Data *)GlobalP;

#ifdef PRINTF
    printdbg("\nSLM: ");
    printdbg("Programming card %d from CPU card %d.\n", Card, GetProcId() );
endif SendEventLogMsg(EV_TYPE_SL, EV_SLM_MEM_CPU_UPDATE, CardNetAddr(Card),
                    CPUNetAddr(), SW_Release, (SW_SubRelease >> 4) );

/* First change the memory card software status to dirty.
    */
    SL_Change_SW_Sts(Card, SL_DIRTY_SW, SLM_TId);

/* Then begin the CPU to memory card copy. This includes
    /* verification at the end of the programming.
    */
    if( (Status = SL_MemCardCopy(Card, (pSLM -> SLM_TasCard)) != SUCCESS )
    {
ifdef PRINTF
        printdbg("\nSLM: ");
        printdbg("Programming error %d on card %d.\n", Status, Card);
endif SendEventLogMsg(EV_TYPE_SL, EV_SLM_MEM_CPU_UPDATE_ABORT,
                        CardNetAddr(Card), CPUNetAddr(), SW_Relea
                        (SW_SubRelease >> 4), Status);
    }
    else
    {
        /* Now convert the status to the correct status according
        /* to the software that is running on the master CPU.
        */
        if( SW_State == SL_TRIAL_SW )
            State = SL_NEW_SW;
        else
            State = SL_OLD_SW;

SL_Change_SW_Sts(Card, State, SLM_TId);

#ifdef PRINTF
        printdbg("\nSLM: ");
        printdbg("Card %d updated, SW State: %d.\n", Card,
                 State);
endif SendEventLogMsg(EV_TYPE_SL, EV_SLM_MEM_CPU_UPDATED, CardNetAddr(Card)
                        CPUNetAddr(), SW_Release, (SW_SubRelease
    }
#ifdef PRINTF
    printdbg("\n");
endif return(Status);
}
``` sl_master.c

```
SLM_InitNode(NodeIndex)
int
{
    register struct SL_Node_Descriptor      *pNode;
    register struct SLM_Local_Data          *pSLM;

pSLM = (struct SLM_Local_Data *)GlobalP;
    pNode = &pSLM -> SLM_Ndsc(NodeIndex];
    SL_InitBytes (pNode, sizeof (*pNode), 0);

pNode -> SL_Ndsc_NodeCard.SL_CardNo  = 0xffff;
    pNode -> SL_Ndsc_PromNo              = 1;

return(SUCCESS);
}

SLM_InitLocalArea()
{
    int
    register struct SLM_Local_Data          *pSLM;

pSLM = (struct SLM_Local_Data *)GlobalP;

pSLM -> SLM_In_Progress = 0;
    pSLM -> SLM_LoadBytes = 0;
    pSLM -> SLM_NbrTgtNodes = 0;
    for( Counter = 0; Counter < SL_MAX_TARGET_NODES; ++Counter )
        SLM_InitNode(Counter);

SL_InitCard(&pSLM -> SLM_Cdsc);

pSLM -> SLM_TasCard.SL_CardTassed = -1;

return(SUCCESS);
}
``` sl_master.c

```c
SLM_Fill_Ldsc(pSts)
struct  SL_LoadSts_Descriptor           *pSts;
{
    int
    unsigned int                                    Time;
    struct  SL_Node_Descriptor              *pNode;
    struct  SL_Load_Status                  *pLdsc;
    register struct SLM_Local_Data  *pSLM;

pSLM = (struct SLM_Local_Data *)GlobalP;

/* Fill in the data for the current softload in progress for the
    /* interested user. This contains information regarding the number
    /* of bytes and messages sent, resent and retried.

Time = GetTime();
    pNode = &pSLM -> SLM_Ndsc[0];
    pLdsc = &pSts -> SL_Ldsc_Sts[0];
    Counter = pSLM -> SLM_NbrTgtNodes;
    while( --Counter >= 0 )
    {
        if( pNode -> SL_Ndsc_NodeCard.SL_NodeNo )
        {
            pLdsc -> SL_LS_NodeCard     = pNode -> SL_Ndsc_NodeCard;
            pLdsc -> SL_LS_MsgsSent     = pNode -> SL_Ndsc_MsgsSent;
            pLdsc -> SL_LS_MsgsResent   = pNode -> SL_Ndsc_MsgsResent;
            pLdsc -> SL_LS_MsgsRetried  = pNode -> SL_Ndsc_MsgsRetried;
            pLdsc -> SL_LS_BytesSent    = pNode -> SL_Ndsc_BytesSent;
            pLdsc -> SL_LS_BytesResent  = pNode -> SL_Ndsc_BytesResent;
            pLdsc -> SL_LS_BytesRetried = pNode -> SL_Ndsc_bytesRetried;
            pLdsc -> SL_LS_ElapsedTime  = Time - pNode -> SL_Ndsc_StartTime;
        }
        ++pNode;
        ++pLdsc;
    }
    return(SUCCESS);
}

SLM_MsgTimer()
{
    register unsigned int             Delta, LastDelta = TEN_SE_C
    int                               *pNode;
    struct  SL_Node_Descriptor        *pSLM;
    register struct SLM_Local_Data pSLM = (struct SLM_Local_Data *)GlobalP;

if (pSLM -> SLM_In_Progress)
    {
        pNode = &pSLM -> SLM_Ndsc[0];
        for( Counter = 0;Counter < pSLM -> SLM_NbrTgtNodes;Counter++, pNode++ )
        {
            if (pNode -> SL_Ndsc_NodeCard.SL_NodeNo)
            {
                Delta = GetTime() - pNode -> SL_Ndsc_LastBatchTime;
                if (Delta >= SL_LOAD_TIMEOUT)
                    SLM_SendBatch(Counter);
                if (Delta < TEN_SECONDS && Delta < LastDelta)
                    LastDelta = Delta;
            }
        }
    }
    return(LastDelta);
}
```

```
SLM_CleanUp(NodeIndex, Reason, SubReason)
int
int
{
    int
    struct   SL_Node_Descriptor         *pNode;
    struct   SL_TOD                                   Time;
    register struct SLM_Local_Data      *pSLM;

pSLM = (struct SLM_Local_Data *)GlobalP;

pNode = &pSLM -> SLM_Ndsc[NodeIndex];

printe("\n SLM: Completed SoftLoad to node %d, card %d: Code = %d, %d",
            pNode -> SL_Ndsc_NodeCard.SL_NodeNo,
            pNode -> SL_Ndsc_NodeCard.SL_CardNo, Reason, SubReason);

printe("\n Statistics:   Elapsed Time = ");
    SL_GetTime( pNode -> SL_Ndsc_StartTime, GetTime(), &Time);
    if (Time.SL_Days)
            printe(" %d Days = ");
    printe("%d:%d:%d\n", Time.SL_Hours, Time.SL_Minutes,
                        Time.SL_Seconds, Time.SL_Mseconds);

#ifdef PRINTF
    printdbg("\n  **** Messages ****           **** Number of Bytes ******");
    printdbg("\n  Sent  Resent  Retried        Sent   Resent   Retried");
    printdbg("\n  ----  ------  -------        ----   ------   -------");
    printdbg("\n  %6d   %6d   %6d              %7x    %7x     %7x\n",
            pNode -> SL_Ndsc_MsgsSent,  pNode -> SL_Ndsc_MsgsResent,
            pNode -> SL_Ndsc_MsgsRetried, pNode -> SL_Ndsc_BytesSent,
            pNode -> SL_Ndsc_BytesResent, pNode -> SL_Ndsc_BytesRetried);
endif SLM_InitNode(NodeIndex);
    SL_InitBytes(&pSLM -> SLM_Bdsc[0][NodeIndex],
                 sizeof (struct SL_Batch_Descriptor)*SL_MAX_BATCH_SEQ, 0)

pNode = &pSLM -> SLM_Ndsc[0];
    for( Counter = 0; Counter < pSLM -> SLM_NbrTgtNodes; ++Counter, pNode++ )
            if (pNode -> SL_Ndsc_NodeCard.SL_NodeNo != 0)
                    break;

if (Counter >= pSLM -> SLM_NbrTgtNodes)
            SLM_InitLocalArea();

return(SUCCESS);
}
```

APPENDIX B of

UPDATING SOFTWARE IN A COMMUNICATION NETWORK

Inventor : Ashish Mathur

NETW6268DEL/SKL sl_slave.c

```c
/*$Header: /nb/v17/.rcs/RCS/sl_slave.c,v 17.2 88/04/27 08:49:36 krishr Exp $*/
/****************************************************************/
/*                                                              */
/*           Network Equipment Technologies                     */
/*               **   IDNX   **                                 */
/*                                                              */
/*           SOFTLOAD:SL_Slave  Task                            */
/*                                                              */
/****************************************************************/
/*                                                              */
/*             Copyright Statement                              */
/*                                                              */
/*             Copyright (c) 1987 by                            */
/*         Network Equipment Technologies                       */
/*         Redwood City, California 94063                       */
/*                                                              */
/*             All Rights Reserved                              */
/*                                                              */
/****************************************************************/
/* This software is furnished under a license and may be used   */
/* only in accordance with the terms of such license. This      */
/* software may not be copied, provided, or otherwise made      */
/* available to anyone other than the licensee. Title to and    */
/* ownership of this software remains with Network Equipment    */
/* Technologies. This listing of source code is confidential,   */
/* and may not be copied, provided, or otherwise made available */
/* to any person or third party not authorized by Network       */
/* Equipment Technologies.                                      */
/*                                                              */
/****************************************************************/ include "global_def.h"
include "kernel_def.h"
#include "softload_def.h"
#include "cboot_def.h"
#include "DBC_def.h"
#include "NetMgr_def.h"
#include "extern_def.h"
#include "macros_def.h"
/* These are some TID definitions for all the tasks that messages are
   sent to and received from. It makes the task of sending messages
   very simple.
   The tasks involved here are the softload master and slave tasks, as
   well as the database task for certain memory card updates. */ static struct Tid        SIM_Tid =       TID_SOFTLOAD_MASTER, 0};

static struct Tid        SLS_Tid =       TID_SOFTLOAD_SLAVE, 0};

extern unsigned char     SL_PromSocketMap();
/*
*/
SL_Slave()
{
    struct  SLS_Local_Data    *pSLS = NULL;
    struct  ItcHeader         *pMsg;

/*  Get the global area before embarking on this ambitious  */
    /*  project. This data area is quite large - it needs enough memory *
    /*  space to contain information about SL_MAX_MEMORY_CARDS         */ while( SL_ReqMem(&pSLS, sizeof(*pSLS), -1) != SUCCESS );

/*  Now set up the pointer to the global area for use by all sub- */
    /*  routines and also initialize it                               */

SetGlobalP(pSLS);
    SLS_InitLocalArea(pSLS);

/*  Get into the forever loop waiting to hear from the master task */
    /*  and obey commands. There are several services provided by the  */
    /*  slave and the message type indicates the service requested.    */ while(TRUE)
    {
        /*  Get a message from the two exchanges it has. The delay  */
        /*  is dependent on the state of affairs, normally this shoul */
        /*  be around 10 seconds                                    */

SL_ReqMsg( &pMsg, M_EX_INITIAL | M_EX_PACKET, SLS_TimerHandler() );

/*  If a message is received, determine which exchange it was */
        /*  from and perform the requisite action                     */ if( pMsg != NULL )
        {
            if( pMsg -> Exchange == EX_INITIAL )
            {
                /*  All messages on this exchange are Query T  */
                /*  SL_INFO_REQ or SL_MEMCARD_REQ, the latter  */
                /*  from remote nodes and a smaller message h  */
                /*  sent.                                      */

SLS_QueryHandler(pMsg -> OrigNode, pMsg -> OrigTid,
                                 pMsg -> Type, SL_ACK, EX
                FreeMem (pMsg);
            }
            else
            {
                /*  The messages on this exchange are all rel  */
                /*  softload. Examples are ones to initiate s  */
                /*  to end it, or the data packets which are   */
                /*  batch sent by the master task.             */

SLS_MsgHandler(pMsg);
            }

/*  If there is current softload in progress, program the pro */
            /*  once every time in this loop.                             */ if( pSLS -> SLS_In_Progress )
                SLS_ProgramHandler();

/* It we ever get out of this loop, we are in big trouble !!!. We */
            /* should probably crash, but if this happens my faith in software */
```

```
sl_slave.c

/* will be drastically shattered.
            return(FAILURE);
            }
            /*
            */
            SLS_MemCardHandler()
            {
            int                                                  Card, Car
            unsigned short                                       TasCard = 0xffff;
            struct      SL_MemCard                               *pMemCard;
            struct      SL_MemSocket                             *pSocket;
            struct      EP_Header                                Hdr, *pHdr;
            register struct SLS_Local_Data                       *pSLS;
            char CodeType = 0;

pSLS = (struct SLS_Local_Data *)GlobalP;

/*      Initialize the memory card array in the global area. We are
                /*      assured that this will not overwrite the existing values in use
                /*      by a softload because the caller makes sure this is so.
                /*      When a softload is in progress, this array is assured to be
                /*      available.

pMemCard = &pSLS -> SLS_MemCard[0];
            CardIndex = SL_MAX_MEM_CARDS;
            while( --CardIndex >= 0 )
                SL_InitCard(pMemCard++);
            pSLS -> SLS_NbrMemCards = 0;

/*      Now get the memory card information starting at card 0 and
                /*      continuing until there are no more cards or we have exhausted
                /*      SL_MAX_MEMORY_CARDS.

CardIndex = 0;
            pMemCard = &pSLS -> SLS_MemCard[0];
            for( Card = 0; Card < MAXCARDS; ++Card )
            {
                    /* If the card slot does not contain a memory card, continue if( SL_VerifyCard(Card, CARD_CPU_MEMORY) == CARD_NONE )
                    continue;

/* If the card is indeed a memory card, get its information
                    /* socket by socket.

pMemCard -> SL_Card_Sts.SL_Card = Card;
                pSocket = &pMemCard -> SL_Socket[0];
                for( Socket = 0; Socket < SL_MAX_SOCKETS; ++Socket, ++pSocket )
                {
                    Status = SL_Get.SocketData(pSocket,Socket,Card,&pSLS->SLS_TasCard)
                    if ( Status != SUCCESS && Status != SL_INVALID_SOCKET )
                        break;
                    Status = SUCCESS;
                }

/* Having got this data, get the software status from the
                /* database prom numbered by SL_DB_SOCKET. This data is
                /* consolidated by the MemCardMgr() into the basic software
                /* release and edit number for the memory card, and the prom
                /* type for the memory card.

if (Status == SUCCESS)
                {
                    /* Determine the CodeType that is in the memory card.....
                    /* For v1? and up..there will newer code type in the node
                    /* that doesnot conform to the existing model of THIAL.. OLD etc */
``` sl_slave.c

```c
SLS_QueryHandler(OrigNode, OrigTid, TypeIn, TypeOut, Exchange, ForceMemCard)
    unsigned short      OrigNode;
    struct Tid          OrigTid;
    unsigned short      TypeIn, TypeOut;
    int                 Exchange;
    unsigned char       ForceMemCard;
{
    int                         *pMem;
    struct SL_MemCard_Packet    *pCard, *pMemCard;
    struct SL_MemCard           *pMQ;
    struct SL_MemCard_Query     *pSts;
    struct SL_Card_Status
    register struct SLS_Local_Data *pSLS;

pSLS = (struct SLS_Local_Data *)GlobalP;

if( SL_ReqMem(&pMem, sizeof (*pMem), -1) == SUCCESS )
    {
        /*  Get the information about cards if there is no softload
         *  progress. If it is, the information will already be prese
         *  in the global area
         */
        if( ForceMemCard || (pSLS -> SLS_In_Progress == 0 ) )
            SLS_MemCardHandler();

/* If there is a request for only the memory card headers,
         * (from a remote node) just fill in the partial information.
         * Otherwise fill in all the information that is required incl-
         * uding the socket information.
         */
        if ( TypeIn == SL_MEMCARD_REQ)
        {
            pMQ = (struct SL_MemCard_Query *)pMem;

/* Fill in the node status first */ pMQ->SL_MQNode_Sts.SL_Nsts_Rel.SL_Release  = SW_Release;
            pMQ->SL_MQNode_Sts.SL_Nsts_Rel.SL_Version  = SW_Version;
            pMQ->SL_MQNode_Sts.SL_Nsts_Rel.SL_Edit     = SW_Edit;
            pMQ->SL_MQNode_Sts.SL_Nsts_State           = SW_State;
            pMQ->SL_MQNode_Sts.SL_Nsts_Progress        = pSLS->SLS_In_Progress /* Fill in the card header status next */ pCard = &pSLS -> SLS_MemCard[0];
            pSts  = &pMQ  -> SL_MQCard_Sts[0];

Counter = SL_MAX_MEM_CARDS;
            while( --Counter >= 0 )
                *pSts++ = pCard++ -> SL_Card_Sts;

pMem->SL_ItcHdr.Length = sizeof(*pMQ) - sizeof(struct ItcHeader);
        }
        else                            /* When Type == S
        {
            pMem->SL_Nsts.SL_Nsts_Rel.SL_Release  = SW_Release;
            pMem->SL_Nsts.SL_Nsts_Rel.SL_Version  = SW_Version;
            pMem->SL_Nsts.SL_Nsts_Rel.SL_Edit     = SW_Edit;
            pMem->SL_Nsts.SL_Nsts_State           = SW_State
            pMem->SL_Nsts.SL_Nsts_Progress        = pSLS -> SLS_In_Progress;

/* Fill in the node status first */ pHdr = &Hdr;
            Status = SL_MemCardPromInfo(Card, pHdr);
            CodeType = pHdr->CodeType;
            printdbg("Memory %d contains CodeType %d SoftwareIn",Card,CodeType);
            /* Lets verify whether the card passes checksum validation */
            /* There is little use for a card that is corrupt. Also    */
            /* this prevents softload from reading a bad header and    */
            /* acting on it...which might cause bus error: BUGR# 2928  */ if ((Status == -1)|| (CodeType == IDNX_LOAD_IMAGE))
            { /* IDNX basic image or may even be TAS failure */ if (SL_VerifyChecksums(Card,&TasCard) == FAILURE)
                {
                    /* Change the software status to dirty */
                    SL_Write_SW_Sts(Card,SL_DIRTY_SW);

pMemCard -> SL_Card_Sts.SL_State = SL_Read_SW_Sts(Card);
                    SL_MemCardMgr(pMemCard);
                }
                else
                {
                    pMemCard -> SL_Card_Sts.SL_Type        = SL_EPROM_256K;
                    pMemCard -> SL_Card_Sts.SL_State       = CodeType;
                    pMemCard -> SL_Card_Sts.SL_Rel.SL_Version = pHdr->Version
                    pMemCard -> SL_Card_Sts.SL_Rel.SL_Edit    = pHdr->Edit;
                    pMemCard -> SL_Card_Sts.SL_Rel.SL_Release = pHdr->Release
                }
                ++pMemCard;
                ++pSLS -> SLS_NbrMemCards;
                if ((++CardIndex) >= SL_MAX_MEM_CARDS)
                    break;
            }
            else
                SL_InitCard(pMemCard);
        }

/* As a diagnostic, display the memory card information for all */
        /* sockets. Since this requires several print statements, it really */
        /* bogs down the processing                                      */ ifdef PRINTF
/* Commented for now, used only for debugging.

if( pSLS -> SLS_PrintEnabled )
            SL_MemCardDisplay(&pSLS -> SLS_MemCard[0], SL_MAX_MEM_CARDS);
*/
#endif
        return(SUCCESS);
    }
/*
``` sl_slave.c

```c
                    /* Fill in the card header status next             */ pMemCard = &pMem -> SL_MemCard_Pkt[0];
    Counter = SL_MAX_MEM_CARDS;
    while (--Counter >= 0)
        SL_InitCard(pMemCard++);

Counter = SL_MAX_MEM_CARDS;
    pCard = &pSLS -> SLS_MemCard[0];
    pMemCard = &pMem -> SL_MemCard_Pkt[0];
    while (--Counter >= 0)
        *pMemCard++ = *pCard++;

pMem->SL_ItcHdr.Length = sizeof(*pMem) - sizeof(struct ItcHeader)

/* Send the message to the requestor */

SL_SendMsg(OrigNode, TypeOut, SLS_Tid, OrigTid, Exchange,
              (pSLS -> SLS_In_Progress ? pSLS -> SLS_SrcNode : 0), p return(SUCCESS);
}

/*
 *      SLS_MsgHandler(pMsg)
 */
struct ItcHeader                                     *pMsg;
{
    unsigned short                                    Type;
    register struct SLS_Local_Data                   , *pSLS;

pSLS = (struct SLS_Local_Data *)GlobalP;

/* For all messages other than data packets, print a message saying */
    /* that they were received.                                         */ if( (Type = pMsg -> Type) != SL_DATA_PKT)
    {
        printf("\nSLS: ");
        printf("Received message type %d from Task %d on N%d.\n", Type,
                                pMsg -> OrigTid.Generic, pMsg -> OrigTid.Instance,
                                pMsg -> OrigNode);
    } switch (Type){ case    SL_BEGIN_SL:
                    /* SL_BEGIN_SL is the message type instructing the slave to set  *
                     * up the destination card for the softload process. After this  *
                     * message, the master sends data packets containing software.   */

SLS_Start(pMsg);
                break;

case    SL_DATA_PKT:

/* SL_DATA_PKT is the message type accompanied by a software      *
                     * code data packet. The message is one of a batch of messages    *
                     * of upto SL_MAX_BATCH_SEQ. This is done for flow control over   *
                     * SCLP. Ignore this message if there is no softload in progress *
                     * or the message is not from the expected node and task. The    *
                     * data packet message is stored in a linked list of messages    *
                     * and has to be stored until the memory card is completely      *
                     * programmed, so this type of message cannot be freed until     *
                     * later.                                                         */ if ( (pSLS -> SLS_In_Progress) &&
                     (pMsg -> OrigNode == pSLS -> SLS_SrcNode) &&
                     (pMsg -> OrigTid.Generic == pSLS -> SLS_SrcTid.Generic) )
                        SLS_Packet(pMsg);
                else
                        Type = SL_BEGIN_SL;
                break;

case    SL_END_SL:

/* SL_END_SL is the signal that all the code has been            *
                     * transferred and that it should verify that the code has been  *
                     * programmed correctly on the memory card.  Again this messag   *
                     * should be accepted when a softload is in progress and is      *
                     * from the expected node and task                               */ if ( (pSLS -> SLS_In_Progress) &&
                     (pMsg -> OrigNode == pSLS -> SLS_SrcNode) &&
                     (pMsg -> OrigTid.Generic == pSLS -> SLS_SrcTid.Generic) )
                        SLS_Stop(pMsg);
``` sl_slave.c

```c
        break;

case SL_ABORT_SL:

/* SL_ABORT_SL is an indication to stop the current softload in  */
        /* progress. This message could come from a variety of tasks     */
        /* and hence we do not check for the node or task id.            */ if (pSLS -> SLS_In_Progress)
            SLS_Abort(SL_SOFTLOAD_ABORTED);
        break;

case SL_CUTOVER_REQ:

/* SL_CUTOVER_REQ tells the slave to attempt a cutover from a    */
        /* specified memory card in the node. This card should ofcourse  */
        /* have new software and should have a valid software release.   */

SLS_CutOver(pMsg);
        break;

case SL_LOADBACK_STS:

/* SL_LOADBACK_STS is the response from the master on a loadback */
        /* request by the slave task due to anamolous softload           */
        /* operation. It lets the slave know that a loadback was not     */
        /* attempted either because the master was busy doing a          */
        /* softload itself or that there was no reason to perform the    */
        /* loadback (no dirty memory card)                               */

SLS_LoadBack(pMsg);
        break;

case SL_CUTBACK_REQ:

/* SL_CUTBACK_REQ tells the slave to quit using a current trial  */
        /* memory card and switch back to an existing old SW memory      */
        /* card. This card should ofcourse have good old code!           */

SLS_CutBack(pMsg);
        break;

case SL_SLIP_QUERY:

/* SL_SLIP_QUERY is used to determine if there is a softload in  */
        /* progress.                                                     */ pMsg -> Return = 0;
        if( pSLS -> SLS_In_Progress )
            pMsg -> Return = SL_SLAVE_SL_IN_PROG;

SL_SendMsg(pMsg -> OrigNode, pMsg -> Type, SLS_Tid, pMsg -> OrigTid,
                   EX_RESPONSE, pMsg -> Return, 0);
        break;

default:
        break;
    }

/* For all message types that are not SL_DATA_PKT, free the message.*/ if( Type != SL_DATA_PKT )
        FreeMem(pMsg);

return(SUCCESS);

}
/*
```

```
                                                                  sl_slave.c
*/
SLS_ProgramHandler()
{
    unsigned short                      Card;           Status = RC;
    int
    register struct SLS_Local_Data      *pSLS;

pSLS = (struct SLS_Local_Data *)GlobalP;
    Card = pSLS -> SLS_MemCard[ pSLS -> SLS_Dest ].SL_Card_Sts.SL_Card;

/* For a S20 node, the Card which receives the software is the CLB      */
    /* card. If the card descriptor array in the Slave local data area      */
    /* has the processor id as the card to softload, then we need to        */
    /* program only RAM and not memory card !!!                             */

If( Card == GetProcId() )
        Status = SLS_CLBProgramProms();
    else
endif    /* S20 */
    {
        if(     ( Status = SL_TasMemCard(Card, &pSLS -> SLS_TasCard) ) == SUCCESS )
        {
            /* We can now start programming the data on the memory card.    */
            /* There is a built in serial nature of this write from prom    */
            /* to prom, consequently we can afford to run around a few      */
            /* times before giving up the Tas and letting someone else get  */
            /* to this memory card.                                         */

Counter = SL_MAX_PROGRAM_TRIES;
            while ( --Counter >= 0 )
                if( (Status = SLS_ProgramProms(Card)) != SUCCESS )
                    break;

SL_UnTasMemCard(Card, &pSLS -> SLS_TasCard);

If (Status == SL_NO_MORE_PROM_DATA)
            {
                /* If there is no more data to program, then see if we have */
                /* received all the messages and ack the batch. If we have not */
                /* received all the messages, we will time out after a certain */
                /* period, and will ack the messages so far received.       */

Status = SUCCESS;
                Counter = pSLS -> SLS_CurrNbrMsgs;
                if (Counter && (SLS_CountMsgs() == Counter) )
                    SLS_SendAck();
            }
        }
        else if( Status != SUCCESS )
            SLS_Abort(Status);
    }
    return(Status);
}

*/
SLS_Start (pMsg)
struct SL_NodeCard_Packet                   *pMsg;
{
    unsigned char                           Card, Nod
    unsigned short
    int
    struct SL_MemCard                       *pCard;
    register struct SLS_Local_Data          *pSLS;
    struct Tid                              SrcTid;

pSLS = (struct SLS_Local_Data *)GlobalP;
    Card = pMsg -> SL_Src.SL_CardNo;
    Node = pMsg -> SL_ItcHdr.OrigNode;
    SrcTid = pMsg -> SL_ItcHdr.OrigTid;

#ifdef ERNIE_PROM_CODE

/* If we are running basic system code on an Ernie, we should           */
    /* disallow softload because it might clash with an autoload in         */
    /* progress.                                                            */

RC = SL_S20_BASIC_CODE_RUNNING;

#else

/* This request is valid if no softload is currently in progress        */
    /* and if there is a loadback request pending, the message should be    */
    /* from the master in this node.                                        */

RC = SL_SLAVE_SL_IN_PROG;
    if( !(pSLS -> SLS_In_Progress) )
    { ifdef S20

/* If no card has been specified, then we possibly need to d    */
            /* a softload to an S20 node. This involves a restart of the    */
            /* off-line CLB if present, or the on-line CLB if that is the   */
            /* only one!.                                                   */ if( Card == 0xffff )
            {
                ((struct SL_OM_Msg *)pMsg)->SL_OMItcHdr = pMsg->SL_ItcHdr;
                SL_TellOM(SL_OM_CLBLOAD, pMsg);
                SL_DelayForever();
            }
            else endif    /* S20 */
            {
                RC = SL_WAITING_FOR_LOADBACK;
                If( !(pSLS -> SLS_LoadBack) || Node == GetNodeId() )
                {
                    /* At his time we have the memory card information    */
                    /* available because the master task should have requeste */
                    /* this information before asking to start. The master  */
                    /* knows what it is doing so just go ahead blindly     */
                    /* following its orders.                               */

RC = SL_CARD_NOT_FOUND;
                    pCard = &pSLS -> SLS_MemCard[0];
``` sl_slave.c

```
           for(Counter = 0;Counter < SL_MAX_MEM_CARDS;Counter++, pCa
               if (Card == pCard -> SL_Card_Sts.SL_Card)
               {
                   /* If the card exists, change its softwar
                   /* to dirty before starting. Also go thro
                   /* the headers in each of the sockets on
                   /* memory card and invalidate them, so th
                   /* memory card will be completely mutilat
                   /* we begin.

Status = SL_Change_SW_Sts(Card, SL_DIRTY_
                   if (Status == SUCCESS)
                   {
                       /* Setup the softload parameters
                       /* event.

pSLS  -> SLS_Dest          = Counter;
                       pSLS  -> SLS_LastBatchTime = GetT
                       pSLS  -> SLS_SrcNode       = Node;
                       pSLS  -> SLS_SrcTid        = SrcTid;
                       Status = EV_SLS_SOFTLOAD_INITIATE if (pSLS -> SLS_LoadBack)
                       {
                           pSLS -> SLS_LoadBack     = 0;
                           pSLS -> SLS_LoadBackTime
                           pSLS -> SLS_In_Progress
                           Status = EV_SLS_LOADBACK_
                       }
                       else
                           pSLS   -> SLS_In_Progress SendEventLogMsg(EV_TYPE_SL, Statu
                                                        C
                       pSLS  -> SLS_CurrBatchNo  = 1;
                       pCard -> SL_Card_Sts.SL_State  = S
                       Status = SL_ACK;
                       RC     = SUCCESS;
                   }
                   else
                   {
                       if( Status == FAILURE )
                           RC = SL_DB_STS_ERROR;
                       else
                           RC = SL_TAS_ERROR;
                       Status = SL_NAK;
                   }
                   break;
               }
           }

/* S20_BASIC_CODE_RUNNING
#endif
           Status = SL_SendMsg(pMsg -> SL_ItcHdr.OrigNode, Status, SLS_Tid, SrcTid,
                               EX_RESPONSE, RC, NULL);

if ( (Status != SUCCESS) && (pSLS -> SLS_In_Progress) )
               SLS_FlushLocalBatch();

return(SUCCESS);
           }
                                                          /*
``` sl_slave.c

```c
*/
SLS_Packet (pMsg)
struct SL_Data_Msg           *pMsg;
{
    unsigned char            Prom, Seq;
    unsigned short           Batch,j,Status;
    struct   SL_Data_Msg     *pTemp;
    struct   SL_Batch_Header *pBatch;
    register struct SL_Status_Packet *pSLS;

pSLS   = (struct SLS_Local_Data *)GlobalP;
    pBatch = &pMsg -> SL_Batch_Hdr;
    Seq    = pBatch -> SL_BatchSeqNo;

/* If the batch that has been just received is the batch that is
    /* expected, initialize the number of messages expected and the
    /* number of acks sent (0) for the first message of this batch only.*/ if( (Batch = pBatch -> SL_BatchNo) == pSLS -> SLS_CurrBatchNo )
    {
        if( !(pSLS -> SLS_CurrNbrMsgs) )
        {
            pSLS -> SLS_CurrNbrMsgs = pBatch -> SL_BatchNbrMsgs;
            pSLS -> SLS_NbrAcks = 0;
        }

/* If this is the first time this message number for this batch */
        /* has been received, set it up in the linked list of messages. */ if( !(pSLS -> SLS_CurrSeqNo[Seq - 1]) )
        {
            pSLS -> SLS_CurrSeqNo[Seq - 1] = 1;
            Prom = pBatch -> SL_BatchPromNo;
            pBatch -> SL_pNextMsg = NULL;

if( pSLS -> SLS_pMsg[Prom - 1] == NULL )
                pSLS -> SLS_pMsg[Prom - 1] = pMsg;
            else
            {
                pTemp = pSLS -> SLS_pMsg[Prom - 1];
                while( pTemp -> SL_Batch_Hdr.SL_pNextMsg != NULL )
                    pTemp = pTemp -> SL_Batch_Hdr.SL_pNextMsg;
                pTemp -> SL_Batch_Hdr.SL_pNextMsg = pMsg;
            }
        }
        else
            pMsg = NULL;
    } else if( (Batch == (pSLS->SLS_CurrBatchNo -1))
    { /* If the previous ACK was lost, we need to retransmit the ACK */
    /* (BUGR #2372). We need to retransmit the ACK as long as the master */
    /* is sending a message regarding the previous batch. If there is
    /* fault in the trunk...atleast one ACK should make it through */
    /* This error recovery mechanism will alleviate the problem of */
    /* unnecessary timeouts due to intermittent trunk failure */
    /* All duplicate messages should be freed */ if( (Status = SL_ReqMem(&pSts, sizeof (*pSts), -1)) != SUCCESS )
        {
            SLS_Abort (Status);
            FreeMem(pMsg);
            return(FAILURE);
        } for (j = 0; j < SL_MAX_BATCH_SEQ; j ++)
        {
            pSts->SL_Sts_Pkt.SL_Sts_BatchSeqNo[j] = 1;
        }
        pSts->SL_Sts_Pkt.SL_Sts_BatchNo = Batch;

#ifdef PRINTF
        printdbg("\nSLS: ");
        printdbg("Acking Batch %d of %d messages from Node %d",
            pSts -> SL_Sts_Pkt.SL_Sts_BatchNo,
            pBatch -> SL_BatchNbrMsgs, pSLS -> SLS_SrcNode);

printdbg("\nSLS: ");
        printdbg("Received the following messages:");
        pseq = &pSts -> SL_Sts_Pkt.SL_Sts_BatchSeqNo[0];
        for( Status = 0; Status < SL_MAX_BATCH_SEQ; ++Status )
        {
            if (*pSeq)
                printdbg(" %d", (Status + 1));
            ++pSeq;
        }
        printdbg("\n");

/* PRINTF */
        pSts -> SL_ItcHdr.Length = sizeof (*pSts) - sizeof (struct ItcHeader);
        Status = SL_SendMsg(pSLS -> SLS_SrcNode, SL_BATCH_STS, SLS_TId,
                            pSLS -> SLS_SrcTid, EX_INITIAL, 0, pSts);
        if (Status != SUCCESS)
            SLS_Abort(SL_CANT_SEND_MSG);
endif if( pMsg != NULL )
            FreeMem(pMsg);

return(SUCCESS);
    }
    /*
``` sl_slave.c

```c
*/
SLS_Stop(pMsg)
struct ItcHeader        *pMsg;
{
    unsigned char          RC = SUCCESS, Sta
    unsigned short         Card;
    int
    register struct SLS_Local_Data   *pSLS;

/* Get a pointer to the global area. Get the memory card being      */
    /* programmed. Determine if this a loadback of a normal softload and */
    /* set the software state accordingly. (NEW_SW for normal loads and */
    /* OLD for loadbacks).                                              */ pSLS = (struct SLS_Local_Data *)GlobalP;
    Card = pSLS -> SLS_MemCard(pSLS -> SLS_Dest].SL_Card_Sts.SL_Card;

/* If we are doing a loadback, the memory card will be marked OLD  */
    /* If this node is running OLD software had NEW otherwise !!        */ if( pSLS -> SLS_In_Progress > 1 && SW_State == SL_OLD_SW )
        State = SL_OLD_SW;

#ifdef S20

/* If RAM was being programmed, verify checksums on only the RAM */
    /* code.                                                          */ if( Card == GetProcId() )
    {
        if( (Status = SL_VerifyMemory()) != SUCCESS )
            RC = SL_CHECKSUM_ERROR;
    }
    else endif /* S20 */
    {
        /* Verify the software code checksums for each socket to ensure   */
        /* that the programming was flawless. We could fail to Tas the    */
        /* card here or fail on the checksum itself. None the less the   */
        /* master will know that this was a checksum error              */ if( (Status = SL_VerifyChecksums(Card, &pSLS->SLS_TasCard)) != SUCCESS )
        {
            if( Status < FAILURE )
                RC = SL_TAS_ERROR;
            else
                RC = SL_CHECKSUM_ERROR;
        }
        else if( (Status = SL_Change_SW_Sts(Card, State, SLS_TId)) != SUCCESS )
        {
            /* Change the software status to new from dirty. If the       */
            /* change retrun an error.                                    */
            /* This situation will arise if the database task in the      */
            /* node is not present or is suspended etc. !! We will        */
            /* however flag this as a successful load                     */ if( Status < FAILURE )
                RC = SL_TAS_ERROR;
            else
                RC = SL_DB_STS_ERROR;
            Status = SUCCESS;
        }
    }

/* Inform the sender of the message the status of the softload */

SL_SendMsg(pSLS->SLS_SrcNode, SL_BATCH_STS, SLS_TId, pSLS -> SLS_SrcTId,
                EX_INITIAL, RC, NULL);

if( Status == SUCCESS )
    {
        /* Log a successful completion and                        */
        /* Flush the global area to get ready for the next one    */

SendEventLogMsg(EV_TYPE_SL, EV_SLS_SOFTLOAD_COMPLETE,
                        CardNetAddr(Card), pSLS -> SLS_SrcNode);

SLS_FlushLocalData();

#ifdef S20

/* If we were softloading to this CLB, we should now restart the */
        /* CLB so that we start executing the software right away.       */
        /* Also set the software state to Trial.                         */ if( Card == GetProcId() )
        {
            xyamnu(0);
            SW_State = SL_TRIAL_SW;
            xyamnu(1);
            SL_TellOM(SL_OM_CLBLOAD_COMPLETE, NULL);
            SL_DelayForever();
        } endif /* S20 */
    }
    else
    {
        /* Abort the softload, send event log message start loadback if */
        /* neccessary, and flush the local data area                    */

SLS_Abort(Status);
    } return(SUCCESS);
}

/*
``` sl_slave.c

```c
*/
SLS_Abort(Type)
int
{
    unsigned short                                              Dirty_Card;
    register struct SLS_Local_Data        *pSLS;

/* Get a pointer to the global area and determine the current dirty */
    /* card.                                                             */ pSLS = (struct SLS_Local_Data *)GlobalP;
    Dirty_Card = pSLS -> SLS_MemCard[pSLS->SLS_Dest].SL_Card_Sts.SL_Card;

/* Send the aborted event log message. This should be network       */
    /* significant and also cause a major alarm.                        */

SendEventLogMsg(EV_TYPE_SL,
                    (pSLS -> SLS_In_Progress > 1 ? EV_SLS_LOADBACK_AB
                    CardNetAddr(Dirty_Card), Type);

/* If a normal softload is being aborted, try a loadback if an       */
    /* alternate card exists. If no alternate card exists then we are   */
    /* in trouble, because this card has been trashed and we not be     */
    /* able to run starting with the next restart. Mark this as a       */
    /* critical network significant alarm !!                            */ printe("\nSLS: ");
    if( pSLS -> SLS_In_Progress < 2 )
    {
        printe("Softload aborted, Status = %d.\n", Type);

/* Inform the master (not on the current node) that softload is  */
        /* being aborted. If the type is SL_SOFTLOAD_ABORTED then the    */
        /* master already knows about it, since it sent the command in   */
        /* the first place.                                              */ if( Type != SL_SOFTLOAD_ABORTED &&
            pSLS -> SLS_SrcNode != GetNodeId() )

SL_SendMsg( pSLS -> SLS_SrcNode, SL_ABORT_SL, SLS_Tid, SLM_Tid,
                        EX_INITIAL, Type, NULL );

#ifdef S20

/* The S20 node does not do loadback - it will just restart and  */
        /* a CLB load or Neighborload will occur.                        */ if( Dirty_Card == GetProcId() )
        {
            SLS_FlushLocalData();
            SL_TelICM(SL_OM_CIBLOAD_ABORT, NULL);
            SL_DelayForever();
        }
        else
        { endif  /* S20 */ ifdef PRINTF printdbg("SLS: Attempting to initiate loadback\n");
```

```c
#endif

/* Now send a message to the local master to start recove */
            SLS_QueryHandler(GetNodeId(), SLM_Tid, SL_INFO_REQ,
                             SL_LOADBACK_REQ, EX_INITIAL, TRU /* Set up the parameters for loadback. If the master does not */
            /* respond with a SL_CUBACK_STS or SL_BEGIN_SL response within */
            /* the specified timeframe this request will time out.        */ pSLS -> SLS_LoadBack = 1;
            pSLS -> SLS_LoadBackTime = GetTime();

/* Log an event that a loadback is being attempted. */

SendEventLogMsg(EV_TYPE_SL, EV_SLS_LOADBACK_ATTEMPTED,
                            CardNetAddr(Dirty_Card));

/* If there is a problem during the loadback stage, we are in */
            /* deep trouble. All we are left to do is to copy the code from */
            /* the CPU. !                                                  */ printdbg("Failure during active loadback - no further attempts.\n");

SL_SendMsg( pSLS -> SLS_SrcNode, SL_ABORT_LB, SLS_Tid, SLM_Tid,
                        EX_INITIAL, Type, NULL );
        }
    else
    { ifdef PRINTF endif

SLS_FlushLocalData();

return(SUCCESS);
    }
```

```
/*
SLS_CutOver(pMsg)
struct SL_NodeCard_Packet    *pMsg;
{
    unsigned char                                RC = SL_CARD_NOT_
    unsigned short                                   Card;
    int                                          c
    struct  SL_MemCard                           *pMemCard;
    register struct SLS_Local_Data               *pSLS;

pSLS = (struct SLS_Local_Data *)GlobalP;
    Card = pMsg -> SL_Strc.SL_CardNo;

/* Attempt to look at this request only if we are not already
    /* running trial mode !!

RC = SL_TRIAL_RUNNING;
    If( SW_State != SL_TRIAL_SW )
    {

/* Attempt to look at this request only if there is no current
        /* softload in progress from this node.

RC = SL_SLAVE_SL_IN_PROG;
        If( !(pSLS -> SLS_In_Progress) )
        {

/* Now get information about the memory cards currently existing*
            /* in the node and search for the one requested to cutover from.*

SLS_MemCardHandler();
            RC = SL_CARD_NOT_FOUND;
            pMemCard = &pSLS -> SLS_MemCard[0];
            Counter = SL_MAX_MEM_CARDS;
            while(--Counter >= 0)
            {
                If(pMemCard -> SL_Card_Sts.SL_Card == Card)
                {
                    /* If the software status is not new, this card 1
                    /* godd as a cutover candidate.

If( pMemCard -> SL_Card_Sts.SL_State != SL_NEW_SW
                        RC = SL_NOT_NEW_CARD;

/* If the software on this card is not internally
                    /* consistent, this card is no good either.

else If( pMemCard -> SL_Card_Sts.SL_Rel.SL_Versio
                        RC = SL_CARD_SW_VERSION_ERROR;

/* If we are unable to change the software status
                    /* this card to trial, we will never be able to c
                    /* to this card, and hence this is useless.

else If( SL_Change_SW_Sts(Card, SL_TRIAL_SW, SLS_
                                                     != SUCCESS )
                        RC = SL_DB_STS_ERROR;

/* Having passed all these stringent requirements
                    /* will allow this card to be the cutover target else
                    {
                        RC = SUCCESS;
```

```
                                                    Status = SL_ACK;
                                                    break;
                                                }
                                                ++pMemCard;
                                            }

/* Send the message to the cutover requestor specifying whats going */
                                            /* on.

SL_SendMsg(pMsg -> SL_ItcHdr.OrigNode, Status, SLS_Tid,
                                                       pMsg -> SL_ItcHdr.OrigTid, EX_RESPONSE, RC, NULL);

/* If the slave is ready to do the cutover, just wait a bit, verify */
                                            /* that the card is indeed set up correctly and than go for it.

If( Status == SL_ACK )
                                            {
                                                Delay(TWO_SECONDS);
                                                If ( (Status = SL_Read_SW_Sts(Card)) == SL_TRIAL_SW )
                                                {
                                                    SendEventLogMsg(EV_TYPE_SL, EV_SLS_CUTOVER_ATTEMPT,
                                                                    CardNetAddr(Card),
                                                                    SW_Release, SW_Version, SW_Edit,
                                                                    pMemCard -> SL_Card_Sts.SL_Rel.SL
                                                                    pMemCard -> SL_Card_Sts.SL_Rel.SL
                                                                    pMemCard -> SL_Card_Sts.SL_Rel.SL /* Tell all OM's about this cutover!! This is to insure t
                                                    /* all CPU's will restart and reload.

SL_TellOM(SL_OM_CUTOVER, NULL);

/* Just delay for the CPU to crash - do not accept any
                                                    /* queries in this time period.

SL_DelayForever();
                                                }
                                                else
                                                {
                                                    printf("\nSLS: ");
                                                    printf("Cutover attempt aborted because Ctd is in 0xtx state.\n",
                                                           Card, Status);
                                                }
                                            } return(SUCCESS);
``` sl_slave.c

```c
*/
SLS_CutBack(pMsg)
struct  ItcHeader       *pMsg;
{
    unsigned char           RC = SL_CARD_NOT_FOUND;
                                                            O
                                                            N
    unsigned short          Card;                           C
    int                     *pMemCard;
    struct  SL_MemCard      *pSLS;
    register struct SLS_Local_Data  *)GlobalP;
    pSLS = (struct SLS_Local_Data *)GlobalP;

/* Attempt to look at this request only if there is no current
    /* softload in progress from this node.

RC = SL_SLAVE_SL_IN_PROG;
    if( !(pSLS -> SLS_In_Progress) )
    {
        /* If the current node is not running trial software there is
        /* no point to continue.

RC = SL_TRIAL_NOT_RUNNING;
        if( SW_State == SL_TRIAL_SW )
        {
            /* Now get information about the memory cards currently existing*
            /* in the node and see if an old card exists. If so, make sure
            /* that only one trial card exists, and change its status to new.

SLS_MemCardHandler();
            pMemCard = &pSLS -> SLS_MemCard[0];
            Counter = SL_MAX_MEM_CARDS;
            while(--Counter >= 0)
            {
                if( pMemCard -> SL_Card_Sts.SL_Card == 0xffff )
                    break;

if( pMemCard -> SL_Card_Sts.SL_State == SL_OLD_SW )
                {
                    if( pMemCard -> SL_Card_Sts.SL_Rel.SL_Version !=
                        OldExists = 1;
                }
                else if( pMemCard -> SL_Card_Sts.SL_State == SL_TRIAL_SW
                {
                    if( pMemCard -> SL_Card_Sts.SL_Rel.SL_Version ==
                                    SW_Version &&
                        pMemCard -> SL_Card_Sts.SL_Rel.SL_Edit ==
                    {
                        TrialExists = 1;
                        Card = pMemCard -> SL_Card_Sts.SL_Card;
                    }
                    ++NbrTrial;
                }
                ++pMemCard;
            }
            if( NbrTrial > 1)
                RC = SL_2_TRIAL_CARDS;
            else if( TrialExists )
            {
                RC = SL_NO_TRIAL_CARD;
            }
            else if( !OldExists )
                RC = SL_CARD_NOT_FOUND;

/* If we are unable to change the software status of
                /* this card to old, we will never be able to cutback
                /* from this card, and hence this is useless.

else if( SL_Change_SW_Sts(Card, SL_NEW_SW, SLS_Tid) != SUCCESS )
                    RC = SL_DB_STS_ERROR;

/* Having passed all these stringent requirements
                /* will allow a cutback else
                {
                    RC = SUCCESS;
                    Status = SL_ACK;
                }
            }
        }
    }

/* Send the message to the cutover requestor specifying whats going */
    /* on.

SL_SendMsg(pMsg -> OrigNode, Status, SLS_Tid, pMsg -> OrigTid,
               EX_RESPONSE, RC, NULL);

/* If the slave is ready to do the cutover, just wait a bit, verify */
    /* that the card is indeed set up correctly and than go for it.

if( Status == SL_ACK )
    {
        Delay(TWO_SECONDS);
        if( (Status = SL_Read_SW_Sts(Card)) == SL_NEW_SW )
        {
            SendEventLogMsg(EV_TYPE_SL, EV_SLS_CUTBACK_ATTEMPT,
                            CardNetAddr(Card),
                            SW_Release, SW_SubRelease, SW_Edi /* Tell all OM's about this cutback!! This is to insure t
            /* all CPU's will restart and reload.

SL_TellOM(SL_OM_CUTBACK, NULL);

/* Just delay for the CPU to crash - do not accept any
            /* queries in this time period.

SL_DelayForever();
        }
        else
        {
            printf("\nSLS: ");
            printf("Cutback attempt aborted because Ctd is in 0xtx state.\n",
                    Card, Status);
        }
    }
    return(SUCCESS);
}
/*
```

```
/*
SLS_LoadBack(pMsg)
*/
struct  ItcHeader           *pMsg;
{
    register struct SLS_Local_Data   *pSLS;

pSLS = (struct SLS_Local_Data *)GlobalP;

/* This message is an indication of the fact that the master had to */
    /* do nothing for the loadback request that it had received from    */
    /* this slave task. The slave is unable to do any recovery at this  */
    /* point.                                                           */ if( pSLS -> SLS_LoadBack &&
        pMsg -> OrigNode == GetNodeId() )
    {
        /* Reset the loadback parameters, so that the slave will not */
        /* time out on the loadback request.                         */ pSLS -> SLS_LoadBack = 0;
        pSLS -> SLS_LoadBackTime = 0;

/* Print the appropriate message */ printe("\nSLS: ");

if( pMsg -> Return == SL_MASTER_SL_IN_PROG )
            printe("Loadback not attempted - SLM softload in progress.\n");
        else if( pMsg -> Return == SUCCESS )
            printe("Loadback not necessary since no dirty card exists.\n");
        else
            printe("Memory card being salvaged from the CPU code in RAM.\n");
    } return(SUCCESS);
}
``` sl_slave.c

```
/*
SLS_SendAck()
*/
{
    int                         *pSeq;
    struct  SL_Status_Packet    *pSts;
    register struct SLS_Local_Data   *pSLS;
    unsigned char pSLS = (struct SLS_Local_Data *)GlobalP;

/* Get the current time and check if it is necessary to acknowledge */
    /* the last batch being received.                                   */ if( (GetTime() - pSLS -> SLS_LastBatchTime) >= SL_LOAD_TIMEOUT )
    {
        /* If it is time to ack and already this batch has been acked */
        /* more times than necessary, timeout on this softload in     */
        /* progress.                                                  */ if( pSLS -> SLS_NbrAcks >= SL_MAX_MSG_RETRIES )
        {
            SLS_Abort(SL_TIMEOUT);
            return(FAILURE);
        }

/* Now we are ready to ack the batch. Get the memory block for the */
        /* status message.                                                 */ if( (Status = SL_ReqMem(&pSts, sizeof (*pSts), -1)) != SUCCESS )
        {
            SLS_Abort(Status);
            return(FAILURE);
        }

/* Copy the current or batch sequences numbers that were          */
        /* received, and if the whole batch was successfully received,    */
        /* initialize the current batch sequence numbers.                 */

SL_CopyBytes(pSLS -> SLS_CurrSeqNo,
                     pSLS -> SL_Sts_Pkt.SL_Sts_BatchSeqNo, SL_MAX_BATCH_SEQ);
        pSLS -> SL_Sts_Pkt.SL_Sts_BatchNo = pSLS -> SLS_CurrBatchNo;

if(SLS_CountMsgs() == pSLS -> SLS_CurrNbrMsgs )
        {
            SL_InitBytes(pSLS->SLS_CurrSeqNo, sizeof (pSLS->SLS_CurrSeqNo), 0);
            ++pSLS -> SLS_CurrBatchNo;
            pSLS -> SLS_CurrNbrMsgs = 0;
        }

/* Increment the number of acks for the batch and save the current */
        /* time when the message was sent.                                 */

++pSLS -> SLS_NbrAcks;
        pSLS -> SLS_LastBatchTime = GetTime();

#ifdef PRINTF
        printdbg("\nSLS: ");
        printdbg("Acking batch %d of %d messages from Node %d",
                 pSLS -> SL_Sts_Pkt.SL_Sts_BatchNo,
                 pSLS -> SLS_CurrNbrMsgs, pSLS -> SLS_OrigNode);
``` sl_slave.c

```
        printdbg("\nsLS: ");
        printdbg("Received the following messages:");
        pSeq = &pSts -> SL_Sts_Pkt.SL_Sts_BatchSeqNo[0];
        for( Status = 0; Status < SL_MAX_BATCH_SEQ; ++Status )
        {
            if (*pSeq)
                printdbg(" %d", (Status + 1));
            ++pSeq;
        }
        printdbg("\n");
endif  /* PRINTF */ pSts -> SL_ItcHdr.Length = sizeof (*pSts) - sizeof (struct ItcHeader);
        Status = SL_SendMsg(pSLS -> SLS_SrcNode, SL_BATCH_STS, SLS_TId,
                            pSLS -> SLS_SrcTId, EX_INITIAL, 0, pSts);

if (Status != SUCCESS)
            SLS_Abort (SL_CANT_SEND_MSG);

return(Status);
}
/*
*/
SLS_ProgramProms(Card)
unsigned short                              Card;
{
    unsigned char                           Write[SL_MAX_PROMS], *pWr
                                                                 Counter,
    int
    struct      SL_Data_Msg                 *pMsg, *pMsgsv;
    struct      SL_Batch_Header             *pBatchHdr;
    register struct SLS_Local_Data          *pSLS;

pSLS = (struct SLS_Local_Data *)GlobalP;
    pWrite = &Write[0];
    SL_InitBytes(pWrite, sizeof (Write), 0);
    NbrProms = 0;

/* For each of the proms that have a current message containing
    /* software pertaining to the prom, start programming the memory
    /* card.

for( Counter = 0; Counter < SL_MAX_PROMS; ++Counter, ++pWrite )
    {
        *pWrite = 0;
        if( (pMsg = pSLS -> SLS_pMsg[Counter]) != NULL )
        {
            pBatchHdr = &pMsg -> SL_Batch_Hdr;
            Status = SL_PromIO(pMsg, SL_WRITE_BYTE);

if( Status == SL_NO_MORE_PROM_DATA )
            {
                /* If there is no more data in the message, set u
                /* next message for programming.

pMsgsv = pBatchHdr -> SL_pNextMsg;
                FreeMem(pMsg);
                pSLS -> SLS_pMsg[Counter] = pMsgsv;
                Status = SUCCESS;
            }
            else if( Status == SL_DELAY_WRITE)
            {
                /* If the byte was written out set up a way to ve Status = SUCCESS;
                *pWrite = ( (*pWrite) | 0x11 );
            }
            else
            {
                /* If the write was successful there is no need to verify
                /* the byte.

Status = SUCCESS;
                *pWrite = ( (*pWrite) | 0x01 );
            }
        }
        else
            ++NbrProms;
    }

/* If all the proms are out of data, return SL_NO_MORE_PROM_DATA if( NbrProms == SL_MAX_PROMS )
        return(SL_NO_MORE_PROM_DATA);
``` sl_slave.c

```c
/*
 *#ifdef S20
 */
SLS_ClBProgramProms()
{
    unsigned char              *pSrc;
    int                        SL_Data_Msg              *pMsg;
    struct                     SL_Batch_Header          *pBatchHdr;
    register struct            SLS_Local_Data           *pSLS;
    struct                     EP_Header                *pHdr;

pSLS = (struct SLS_Local_Data *)GlobalP;

/* For each of the proms that have a current message containing   */
    /* software pertaining to the prom, start programming the memory  */
    /* card.                                                          */ for( Counter = 0; Counter < SL_MAX_PROMS; ++Counter )
    {
        while( (pMsg = pSLS -> SLS_pMsg[Counter]) != NULL )
        {
            pBatchHdr = &pMsg -> SL_Batch_Hdr;
            pHdr = &BootData.EpHdr[pBatchHdr->SL_BatchPromNo];

/* Determine if we are writing to this header for the fir */
            /* time. If so, first write the header into the BootData  */
            /* area and then continue.                                */ pSrc = pMsg->SL_Data.SL_Byte_Data;
            if( ! (pBatchHdr->SL_StartByte) )
            {
                xyammu(0);
                *pHdr = *(struct EP_Header *) (pSrc);
                xyammu(1);
                pBatchHdr->SL_StartByte += sizeof( struct EP_Header );
                pBatchHdr->SL_ByteCount -= sizeof( struct EP_Header );
                pSrc = &pMsg->SL_Data.SL_Byte_Data[sizeof(struct EP_Heade
            } xyammu(0);
            SL_CopyBytes(pSrc,    (pHdr->BaseAddress + pBatchHdr->SL_Start
                                   sizeof( struct EP_Header
                                   pBatchHdr->SL_ByteCount);
            xyammu(1);
            pSLS -> SLS_pMsg[Counter] = pBatchHdr -> SL_pNextMsg;
            FreeMem(pMsg);

/* Delay, so that other tasks of the same priority may ru */

Delay(10);
        }
    } return(SL_NO_MORE_PROM_DATA);
} endif  /* S20 */
/*
```

/* Now run through one more time verifying whether the write    */
/* actually took place or not. If there is any failure abort !! */ pWrite = &Write[0];
for( Counter = 0; Counter < SL_MAX_PROMS; ++Counter, ++pWrite )
{
    if( *pWrite )
    {
        if( (pMsg = pSLS -> SLS_pMsg[Counter]) != NULL )
        {
            pBatchHdr = &pMsg -> SL_Batch_Hdr;
            if( *pWrite & 0x11 )
            {
                if( (Status = SL_PromIO(pMsg, SL_VERIFY_BYTE)) !=
                {
                    SendEventLogMsg(EV_TYPE_SL, EV_SLS_WRITE_
                                     CardNetAd
                                     SL_PromSo
                    pBatchHdr
                    (int)&EPR
                    pBatchHdr
                    pBatchHdr Status = SL_WRITE_TIMED_OUT;
                    break;
                }
            }
            ++pBatchHdr -> SL_NextByte;
        }
    }
} return(Status);

sl_slave.c

```
*/
SLS_InitLocalArea()
{
    int
    struct SL_MemCard                              *pMemCard;
    register struct SLS_Local_Data                 *pSLS;

pSLS = (struct SLS_Local_Data *)lGlobalP;
    pMemCard = &pSLS -> SLS_MemCard[0];

Counter = SL_MAX_MEM_CARDS;
    while( --Counter >= 0 )
        SL_InitCard(pMemCard++);

pSLS -> SLS_TasCard.SL_CardTassed = 0xffff;

#ifdef S20

/* If this node is an S20 and the node has restarted due to reason   */
        /* of SoftLoad in Progress, confirm that we still have connections   */
        /* to the source node for this softload to occur.                    */ ifndef CLBDBG
        NodeIsErnie() &&
#endif
        (BootData.StartUpSaveCodes & SOFTLOAD_IN_PROGRESS) )
    {
        if( BootData.SoftLoadNode )
        {
            Counter = 60;
            while(--Counter)
            {
                /* Make sure that there is a route to the node th */
                /* intiated softload.                              */ if( Route(BootData.SoftLoadNode) == 0 )
                    Delay(5*ONE_SECOND);
                else
                {
                    SLS_SetupCLBForSoftLoad();
                    break;
                }
            }
        }
        if( !(pSLS -> SLS_In_Progress) )
        {
            SendEventLogMsg(EV_TYPE_SL, EV_SLS_CLBSLLOAD_ABORT,
                                     CPUNetLAddr(), BootData.So
                                     SL_CLB_ISOLATED_FROM_SOUR xyammu(0);
            BootData.StartUpSaveCodes &= ~(SOFTLOAD_IN_PROGRESS);
            BootData.SoftLoadNode = 0;
            BootData.SoftLoadTId.Generic = 0;
            BootData.SoftLoadTId.Instance = 0;
            xyammu(1);

SL_TellOM(SL_OM_CLBLOAD_IMPOSSIBLE, NULL);

/* The Object Manager should kill this task and b */
            /* either CLBLoad or Neighborload, whichever is    */
            /* judicious in this case.                         */

SL_DelayForever();
        }
    }
#endif
    return(SUCCESS);
}
/*
``` sl_slave.c

```c
/*
SLS_FlushLocalData()
*/
{
    register struct SLS_Local_Data       *pSLS;

pSLS = (struct SLS_Local_Data *)GlobalP;

pSLS -> SLS_In_Progress = 0;
    pSLS -> SLS_NbrAcks = 0;
    pSLS -> SLS_SrcNode = 0;
    pSLS -> SLS_SrcTid.Generic = 0;
    pSLS -> SLS_SrcTid.Instance = 0;
    pSLS -> SLS_PrevBatchNo = 0;
    pSLS -> SLS_CurrBatchNo = 0;
    pSLS -> SLS_PrevNbrMsgs = 0;
    pSLS -> SLS_CurrNbrMsgs = 0;

SL_InitBytes(pSLS -> SLS_PrevSeqNo,sizeof (pSLS -> SLS_PrevSeqNo),0);
    SL_InitBytes(pSLS -> SLS_CurrSeqNo,sizeof (pSLS -> SLS_CurrSeqNo),0);

pSLS -> SLS_Dest = 0xff;
    if( pSLS -> SLS_LoadBack == 0 )
        pSLS -> SLS_LoadBackTime = 0;
    pSLS -> SLS_NbrMemCards = 0;

SLS_FlushMsgs();

pSLS -> SLS_LastBatchTime = 0;
    pSLS -> SLS_Time = 0;

return(SUCCESS);
}

/*
SLS_FlushMsgs()
*/
{
    int                                  *pTemp, *pNext;
    struct SL_Data_Msg
    register struct SLS_Local_Data       *pSLS;

pSLS = (struct SLS_Local_Data *)GlobalP;
    Counter = SL_MAX_PROMS;
    while( --Counter >= 0 )
    {                                    /* Walk down the linked freeing all the memory pTemp = pSLS -> SLS_pMsg[Counter];
        while( pTemp != NULL )
        {
            pNext = pTemp -> SL_Batch_Hdr.SL_pNextMsg;
            FreeMem(pTemp);
            pTemp = pNext;
        }
    }
    SL_InitBytes(&pSLS -> SLS_pMsg[0], sizeof (pSLS -> SLS_pMsg), NULL);
    return(SUCCESS);
}
``` sl_slave.c

```c
/*
SLS_CountMsgs()
*/
{
    unsigned char                               *pSeq;
    int
    register struct SLS_Local_Data              *pSLS;

pSLS = (struct SLS_Local_Data *)GlobalP;
    pSeq = &pSLS -> SLS_CurSeqNo[0];

Counter = pSLS -> SLS_CurrNbrMsgs;
    while( --Counter >= 0 )
    {
        if ( *pSeq++ )
            MsgsRcvd += 1;
    }
    return(MsgsRcvd);
}

/*
SLS_TimerHandler()
*/
{
    unsigned int                                Now, Delta = TEN_
    register struct SLS_Local_Data              *pSLS;

pSLS = (struct SLS_Local_Data *)GlobalP;
    Now = GetTime();

/* If there is a softload in progress, ack the current batch if
    /* necessary.
    */
    if( pSLS -> SLS_In_Progress )
    {
        Delta = Now - pSLS -> SLS_LastBatchTime;
        if (Delta >= SL_LOAD_TIMEOUT)
        {
            /* If there are current batch messages received send the
            /* current batch ack.
            */
            if( pSLS -> SLS_CurrNbrMsgs )
                SLS_SendAck();

/* If we have timed-out, abort this softload
            */
            else if( Delta >= (3 * SL_LOAD_TIMEOUT) )
            {
                SendEventLogMsg(EV_TYPE_SL, EV_SLS_SOFTLOAD_TIMEOUT,
                                CardNetAddr( pSLS -> SLS_
                                             [pSLS -> SLS_Dest
                                pSLS -> SLS_SrcNode);
                SLS_Abort (SL_TIMEOUT);
            }

/* Set this to the lowest possible delay - this ensures
            /* that if there are no messages, ReqMsg will return
            /* immediately.
            */
            else
                Delta = 0;
        }
    }
    /* If a loadback has been requested, the master should respond with
    /* either a SL_LOADBACK_SYS or a SL_BEGIN_SL. If we wait timeout on
    /* these responses, abort the loadback.
    */
    else if( pSLS -> SLS_LoadBack )
    {
        Delta = Now - pSLS -> SLS_LoadBackTime;
        if( Delta >= SL_LOADBACK_TIMEOUT )
        {
            SendEventLogMsg(EV_TYPE_SL, EV_SLS_LOADBACK_TIMEOUT, GetNodeId());
            pSLS -> SLS_LoadBack = 0;
            SLS_FlushLocalData();
        }
        else
            Delta = ONE_SECOND;
    }

/* Make sure that the longest wait is only ten seconds for messages
    */
    if( Delta > TEN_SECONDS )
        Delta = TEN_SECONDS;
``` sl_slave.c

```
}       return(Delta);

#ifdef S20
/*
 */
SLS_SetupCLBForSoftLoad()
{
    register struct SLS_Local_Data      *pSLS;

pSLS = (struct SLS_Local_Data *)GlobalP;

if( SL_SendMsg(BootData.SoftLoadNode,SL_ACK,SLS_TId,BootData.SoftLoadTId,
                   EX_RESPONSE, GetProcId(), NULL) == SUCCESS )
    {
        pSLS = (struct SLS_Local_Data *)GlobalP;

pSLS -> SLS_Dest        = SL_MAX_MEM_CARDS - 1;
        pSLS -> SLS_LastBatchTime = GetTime();
        pSLS -> SLS_SrcNode     = BootData.SoftLoadNode;
        pSLS -> SLS_SrcTId      = BootData.SoftLoadTId;
        pSLS -> SLS_In_Progress = 1;
        pSLS -> SLS_CurrBatchNo = 1;
        pSLS -> SLS_MemCard[SL_MAX_MEM_CARDS-1].SL_Card_Sts.SL_Card
                                = GetProcId();

SendEventLogMsg(EV_TYPE_SL, EV_SLS_CLBSLLOAD_INITIATED,
                        CPUNetAddr(), BootData.SoftLoadNode);

/* Now clean up the BootData area so that there is no such
                        /* confusion to softload on later restarts.

xyammu(0);
        BootData.StartUpSaveCodes &= ~(SOFTLOAD_IN_PROGRESS);
        BootData.SoftLoadNode = 0;
        BootData.SoftLoadTId.Generic = 0;
        BootData.SoftLoadTId.Instance = 0;
        xyammu(1);

return(SUCCESS);
    } return(FAILURE);
}
#endif
```

APPENDIX C of

UPDATING SOFTWARE IN A COMMUNICATION NETWORK

Inventor : Ashish Mathur

NETW6268DEL/SKL

```
sl_utils.c

/*$Header: /nb/v17/.rcs/RCS/sl_utils.c,v 17.1 88/04/27 08:52:17 krishr Exp $*/
/************************************************/
/*                                              */
/*       Network Equipment Technologies          */
/*       *  *    IDNX    *  *                   */
/*                                              */
/*       SOFTLOAD: utility functions            */
/*                                              */
/************************************************/
/*                                              */
/*            Copyright Statement               */
/*                                              */
/*          Copyright (c) 1987 by               */
/*       Network Equipment Technologies          */
/*       Redwood City, California 94063          */
/*                                              */
/*          All Rights Reserved                 */
/*                                              */
/************************************************/
/*                                              */
/* This software is furnished under a license and may be used */
/* only in accordance with the terms of such license. This    */
/* software may not be copied, provided, or otherwise made    */
/* available to anyone other than the licensee. Title to and  */
/* ownership of this software remains with Network Equipment  */
/* Technologies. This listing of source code is confidential, */
/* and may not be copied, provided, or otherwise made available */
/* to any person or third party not authorized by Network      */
/* Equipment Technologies.                                     */
/*                                              */
/************************************************/ include    "global_def.h"
include    "kernel_def.h"
#include    "OM_def.h"
#include    "softload_def.h"
#include    "cboot_def.h"
#include    "extern_def.h"
#include    "macros_def.h"

#define     EPIIS2          sizeof( struct EP_Header )

unsigned char                   SL_PromSocketMap [] =
#if (RELEASE==6)
{
    0xFF,
    0,      8,      16,     24,
    1,      9,      17,     25,
    2,      10,     18,     26,
    3,      11,     19,     27,
    4,      12,     20,     28,
    5,      13,     21,     29,
    6,      14,     22,     30,
    7,      15,     23,     31,
    0xFF,   0xFF,   0xFF,   0xFF
};
#else
{
    0xFF,
    0,      2,      3,      7,      11,     15,     19,     23,
    4,      6,      10,     14,     18,     22,     26,     30,
    8,      13,     17,     21,     25,     29,
    12,     16,     20,     24,     28,
    20,     22,     26,
    24,     26,
    0xFF,   0xFF,   0xFF,   0xFF,   0xFF,   0xFF,   0xFF,   0xFF
};
endif unsigned char                   SL_SocketPromMap [] =
if (RELEASE==6)
{
    1,      5,      9,      13,     17,     21,     25,     29,
    2,      6,      10,     14,     18,     22,     26,     30,
    3,      7,      11,     15,     19,     23,     27,     31,
    4,      8,      12,     16,     20,     24,     28,     32
};
#else
{
    1,      2,      3,      4,      5,      6,      7,      8,
    9,      10,     11,     12,     13,     14,     15,     16,
    17,     18,     19,     20,     21,     22,     23,     24,
    15,     26,     27,     28,     29,     30,     31,     32
};
endif static unsigned char            *pSWStrings[0] =
{
    "OLD",
    "DIRTY",
    "NEW",
    "TRIAL",
    "EXTEND "
};

static unsigned char            *pPromStrings[0] =
{
    "UNKNOWN",
    "1M",
    "512K",
    "256K",
    "64K"
};

static unsigned char            *pYesNoStrings[0] =
{
    "NO",
    "YES",
    "UNKNOWN"
};

static char                     **pGenericStrings[0] =
{
    NULL,
    pSWStrings,
    pPromStrings,
    pYesNoStrings
};

static struct   Tid             DB_Tid =        TID_D_B_C
{
/*
``` sl_utils.c

```
/*****************************************************************
 *
 *   Routine Name:   SL_TasMemCard
 *
 *   Function:       This function provides the capability to TAS a
 *                   specified memory card for read/write access to the
 *                   card and the proms on it. It first needs to program
 *                   the Cbus Device Id to the card in question, access
 *                   the card and TAS it. The maximum wait time for the
 *                   TAS is 6 seconds.
 *
 *   Input:          CardNo    : The memory card to TAS
 *                   pTasCard  : Pointer to the CardNo that was last tas
 *                                card tassed at a time
 *   Return Codes:   CANT_TAS_2_MEMORY_CARDS : Just to be sure, only one
 *                                card tassed at a time
 *                   SL_NOT_A_MEMORY_CARD, SL_MEMORY_CARD_TIMEOUT
 *                   SL_CANT_TAS_MEMORY_CARD, Success
 *
 *****************************************************************/

SL_TasMemCard(CardNo, pTasCard)
unsigned short          CardNo;
struct SL_TasCard       *pTasCard;
{
    unsigned char       Event;
    short               Retry;          Status = SUCCESS;
    int
    struct MemoryCard   *pMemCard = &MemoryCard;

/*  If another card is being tassed currently, disallow the TAS
    if( (pTasCard -> SL_CardTassed != 0xffff) &&
        (pTasCard -> SL_CardTassed >= CARD_NONE) )
    {
        Status = SL_CANT_TAS_2_MEMORY_CARDS;
        Event  = EV_SLU_TWO_CARDS_TASSED;
    }

/*  Now verify whether the card id specified is indeed that of
        /*  a memory card that can be read over the Cbus.
    else if( (SL_VerifyCard(CardNo, CARD_CPU_MEMORY) == CARD_NONE)
    {
        Status = SL_NOT_A_MEMORY_CARD;
        Event  = EV_SLU_NON_MEMORY_TASSED;
    }

/*  Program the Cbus Device Id for this CardNo and then:
        /*  Confirm whether the card is indeed the type that we are
        /*  looking for. There might be cases where the card has been
        /*  pulled out, so the TAS should return a failure
    else
    {
        PgmCbev(CardNo);

if ( CBusCardType != CARD_CPU_MEMORY )
        {
            if ( PgmCbev(INVALID_CARD) < 0 )
            {
                Status = SL_MEMORY_CARD_TIMEOUT;
                Event  = EV_SLU_CARD_TIMED_OUT;
            }
            else
            {
                Status = SL_NOT_A_MEMORY_CARD;
                Event  = EV_SLU_NON_MEMORY_TASSED;
            }
        }
        else
        {
            /*  Now we are ready to TAS the card. Try for atleast
            /*  seconds. The wait required here is minimal if the
            /*  is not currently in use by other tasks.
            Retry = SL_MAX_TAS_RETRIES;
            while ((--Retry) > 0)
            {
                if ( TAS (&pMemCard -> TAS) )
                {
                    pTasCard -> SL_CardTassed = CardNo;
                    break;
                }
                Delay(2);           /* Wait for 16 - 24 milliseconds
            }
            if ( !(Retry) )
            {
                Status = SL_CANT_TAS_MEMORY_CARD;
                Event  = EV_SLU_TAS_UNSUCCESSFUL;
            }
        }
    }

/* If we could not get the tas, we are in trouble, log the event*
    if( Status != SUCCESS)
    {
        SendEventLogMsg(EV_TYPE_SL, Event, CardNetAddr(CardNo),
                                    CardNetAddr(pTasCard -> SL_CardTassed));
    }
    return(Status);
}
``` sl_utils.c

```
/*****************************************************************
    Routine Name:   SL_UnTasMemCard Function:       This function UnTases the memory card that has been
                    tassed before. This is used by users that have
                    completed use of the memory card and would like to
                    give access to others now that they are done with
                    it.

Input:          CardNo   : The memory card to UnTas
                    pTasCard : Pointer to the CardNo that was last
                               tassed.

Return Codes:   SL_WRONG_CARD_TO_UNTAS, SL_NOT_A_MEMORY_CARD
                    Success
*****************************************************************/

SL_UnTasMemCard(CardNo, pTasCard)
unsigned short          CardNo;
struct SL_TasCard       *pTasCard;
{
    unsigned char       Event;      zero= 0;    Status = SUCCESS;
    short               int
    struct MemoryCard   *pMemCard = &MemoryCard;

/*  If the card being untassed is not the one that was tassed,
     *  there is no point to continue
     */
    if ( pTasCard -> SL_CardTassed != CardNo )
    {
        Status = SL_WRONG_CARD_TO_UNTAS;
        Event = EV_SLU_WRONG_CARD_UNTASSED;
    }
    else
    {
        /*  Is this the right card we are trying to Untass ?
         *  Now verify whether the card id specified is indeed that of
         *  a memory card that can be read over the Cbus.
         */
        if( (SL_VerifyCard(CardNo, CARD_CPU_MEMORY)) == CARD_NONE)
        {
            Status = SL_NOT_A_MEMORY_CARD;
            Event = EV_SLU_NON_MEMORY_UNTASSED;
        }
        else
        {
            /*  Yes it is, so untass it and make it known that there is n
             *  card that is being currently tassed.
             */
            pMemCard -> TAS = zero;
        }
        pTasCard -> SL_CardTassed = -1;
    } if( Status != SUCCESS)
    {
        SendEventLogMsg(EV_TYPE_SL, Event, CardNo, CardNetAddr(CardNo),
                                        CardNetAddr(pTasCard -> SL_CardTassed));
    }
    return(Status);
}
``` sl_utils.c

```c
/*******************************************************************
Routine Name:   SL_GetSocketData Function:       This function gets information about a socket on a
                memory card. This information consists of items
                like the prom type and size, the type of data in
                the prom i.e which release of software, seq and
                other various parameters of value in a memory card
                socket.

Side Effects:   This procedure calls the function SL_GetPromType
                which writes to the prom to determine if it is prog-
                rammable or not. If due to some failure, the system
                crashes at this time, the header on the prom will
                be destroyed. However, the boot will become
                intelligent enough to determine whether the header
                has been corrupted and will attempt to fix it.

Input:          pMemSocket: Pointer to the Socket structure.
                Socket    : The socket to get the header from.
                CardNo    : The memory card on which the socket
                            resides.
                pTasCard:   Pointer to the CardNo that was last
                            tassed.

Return Codes:   Failure if the card or socket specified is
                incorrect or could not be tassed.
                These codes are SL_NOT_A_MEMORY_CARD and
                SL_INVALID_SOCKET.

Success otherwise.
********************************************************************/
SL_GetSocketData(pMemSocket, Socket, CardNo, pTasCard)
struct  *SL_MemSocket   *pMemSocket;
unsigned char           Socket;
unsigned short          CardNo;
struct  SL_TasCard      *pTasCard;
{
    int                 Status;
    struct  EP_Header   Hdr, *pHdr;

/*  Invalidate the socket first, so that if this returns a
     *  failure, there is no socket data available to the calling
     *  routine.
     */
    pMemSocket -> SL_PromSeqNo = 0;

/*  Now determine the socket number supplied by the caller. If
     *  it is not valid, or is one of the database proms, return
     *  failure.
     */
    if( (Socket >= SL_MAX_SOCKETS) || (Socket == SL_DB_SOCKET)
#if BIG_DBC
        || (Socket == SL_DB_SOCKET - 1)
#endif
        )
        return(SL_INVALID_SOCKET);

/*  Ready to Test and Set the Card for read/write. If we are
     *  unable to TAS the card, we return failure.
     */
    if( (Status = SL_TasMemCard(CardNo, pTasCard)) != SUCCESS )
        return(Status);

/*  The brunt of the work begins here. First the PromType is
     *  determined, through a function call. This involves the
     *  crazy side-effect mentioned in the procedure prolog.
     */
    if (pMemSocket -> SL_PromType = SL_GetPromType(Socket, CardNo)) !=
        SL_EMPTY_SOCKET )
    {
        /*  Next the header is read and placed in a local stack data
         *  area. In the header resides good information like the
         *  software release number, the prom number and sequence, et
         */
        pHdr = &Hdr;
        SL_ReadSocket(Socket, &EPROM_Hdr, pHdr, (EPHSZ >> 2), SL_INT);

/*  Now the header information is transferred from the local
         *  data area to the callers data area. If the header
         *  Identifier is 0, there is no good data in the prom
         */
        pMemSocket -> SL_PromNo        = pHdr -> EpromNumber;
        pMemSocket -> SL_PromSeqNo     = pHdr -> Identifier;
        pMemSocket -> SL_NbrProms      = pHdr -> NbrEproms;
        pMemSocket -> SL_BaseAddr      = pHdr -> BaseAddress;
        pMemSocket -> SL_NbrBytes      = pHdr -> NoofBytes;
        pMemSocket -> SL_Checksum      = pHdr -> EpromChecksum;
        pMemSocket -> SL_Socket_Rel.SL_Release    = pHdr -> Release;
        pMemSocket -> SL_Socket_Rel.SL_SubRelease = 0;
        pMemSocket -> SL_Socket_Rel.SL_Version    = pHdr -> Version;
        pMemSocket -> SL_Socket_Rel.SL_Edit       = pHdr -> Edit;
    }

/*  After having read the header, we have no further
     *  information to derive from this socket, so the card is
     *  UnTassed for others to utilize.
     */
    SL_UnTasMemCard(CardNo, pTasCard);

return(SUCCESS);
}

/*
``` sl_utils.c

```
/*******************************************************************/
/*                                                                  */
/*  Routine Name:  SL_VerifyCard                                    */
/*                                                                  */
/*  Function:      This function verifies that a user supplied card */
/*                 type exists at a user specified slot. If the user*/
/*                 does specifies a CARD_NONE card type, the card at*/
/*                 the slot specified will be returned.             */
/*                                                                  */
/*  Input:         CardNo   : The slot at which the card should     */
/*                            reside                                */
/*                 CardType : The card type that should be at the   */
/*                            slot specified.                       */
/*                                                                  */
/*  Return Codes:  CARD_NONE: If there specified card/slot          */
/*                            combination is invalid.               */
/*                 CARD_XXX : The CardType at the slot specified if */
/*                            correct.                              */
/*                                                                  */
/*******************************************************************/

SL_VerifyCard(CardNo, CardType)
unsigned short          CardNo;
int                     CardType;
{
    unsigned char       actual_card;

/* Verify the slot number specified. It has to match the slots */
    /* available.                                                  */ if (CardNo >= MAXCARDS)
        return(CARD_NONE);

/* Read the card type from the Cbus. This returns CARD_NONE if */
    /* there is no card or there is a timeout on the Cbus read     */ actual_card = GetCBusByte(CardNo, &CBusCardType);

/* Based on the card type returned, determine the return card   */
    /* type for the caller. If the caller had not specified a card  */
    /* type, return the card type found. If the caller had asked    */
    /* for a specific card type and it does not match, return       */
    /* CARD_NONE. Otherwise return the card type itself, thus       */
    /* verifying the user query.                                    */ if (CardType != CARD_NONE)
        if (actual_card != CardType)
            actual_card = CARD_NONE;
    else if (actual_card < 0)
        actual_card = CARD_NONE;

return(actual_card);
}

/*******************************************************************/
/*                                                                  */
/*  Routine Name:  SL_GetPromType                                   */
/*                                                                  */
/*  Function:      This function determines what type of prom exists*/
/*                 on a socket of a memory card. This includes      */
/*                 information on both the size of the prom and the */
/*                 fact whether it is programmable or not. In this  */
/*                 determination it writes a value in the prom header*/
/*                 spare int. It restores the value after its done. */
/*                                                                  */
/*  Input:         Socket : The socket number in question           */
/*                 Card   : The Card on which this socket resides   */
/*                                                                  */
/*  Return Codes:  SL_EMPTY_SOCKET                                  */
/*                 SL_< <E EE>PROM NVRAM> <1M 512K 256K 64K>        */
/*                                                                  */
/*******************************************************************/

SL_GetPromType(Socket, Card)
unsigned char           Socket;
unsigned short          Card;
{
    unsigned char       *pChar, WriteChar, SaveChar,
                        PromType, Program
                        Int1, Int2;
    int                 *pEprom = &EPROM_Hdr;
    struct  EP_Header   *pMemCard = &MemoryCard;
    struct  MemoryCard pMemCard -> PromSelect = Socket;

/* Get a pointer to the known location. This is an unused field in */
    /* the prom header, and under normal conditions it has a value of 0*/ pChar = (char *)&(pEprom -> Spare2);
    SaveChar = *pChar;

/* Determine the value that should be deposited in the known    */
    /* location. This is the value that will be expected to be      */
    /* returned*/
    /* if the prom is soft programmable. Write this value in and if it*/
    /* worked put the old value back.                               */

WriteChar = ( (SaveChar == SL_DIRTY_SW) ? SL_NEW_SW : SL_DIRTY_SW );

if ( SL_WriteSocket(Socket, &WriteChar, pChar, 1, SL_WRITE_BYTE, Card)
            == SUCCESS )
        Programmable = 1;
    else if (SL_WriteSocket(Socket,&WriteChar,pChar,1,SL_VERIFY_BYTE,Card) )
        Programmable = 2;

if (Programmable)
        SL_WriteSocket(Socket,&SaveChar,pChar,1,SL_WRITE_AND_VERIFY, Card);

/* Now Check to see which point the prom is aliased at. If it is   */
    /* aliased around the 8K byte boundary, it has to be a 64K Prom. If*/
    /* it is aliased around the 16K boundary then the Prom is a 256K   */
    /* Prom. For now we will assume that if it is neither of the above */
    /* two categories, it is a 512K prom.                              */ if ( SL_VerifyPromExists() != SUCCESS )
    {
        PromType = SL_EMPTY_SOCKET;
``` sl_utils.c

```c
    if (Programmable)
    {
        if (*(pChar + SL_8K_BOUNDARY) == SaveChar)
            PromType = SL_EPROM_64K;
        else if (*(pChar + SL_16K_BOUNDARY) == SaveChar)
            PromType = SL_EPROM_256K;
    }
    else if (SL_VerifyPromAlias(SL_8K_BOUNDARY >> 2) == SUCCESS)
        PromType = SL_EPROM_64K;
    else if (SL_VerifyPromAlias(SL_16K_BOUNDARY >> 2) == SUCCESS)
        PromType = SL_EPROM_256K;
    else
    {
        Int1 = *((int *)EPROM_Hdr);
        MemoryCard.PromSelect = Socket | SL_OTHER_PAGE;
        Int2 = *((int *)EPROM_Hdr);
        if (Int1 != Int2)
            PromType = SL_EPROM_512K;
        else
            PromType = SL_EPROM_256K;
    }
    if (Programmable > 1)
        PromType <<= 4;
    else if (Programmable > 0)
        PromType |= (PromType << 4);

return(PromType);
}

/*****************************************************************/
/*                                                               */
/* Routine Name: SL_VerifyPromAlias                              */
/*                                                               */
/* Function:     This function determines if a prom is aliased   */
/*               around a particular integer boundary as specified*/
/*               by the caller.                                  */
/*                                                               */
/* Input:        IntBoundary : The integer boundary at which the */
/*                             alias is seeked.                  */
/*                                                               */
/* Return Codes: Failure, Success                                */
/*                                                               */
/*****************************************************************/
SL_VerifyPromAlias(IntBoundary)
int                                            IntBoundary;
{
    int                                        *pEprom = (int *)EPROM_H if ( ( pEprom[0] == pEprom [IntBoundary    ] ) &&
         ( pEprom[1] == pEprom [IntBoundary + 1] ) &&
         ( pEprom[2] == pEprom [IntBoundary + 2] ) &&
         ( pEprom[3] == pEprom [IntBoundary + 3] ) )
            return(SUCCESS);
    return(FAILURE);
}

/*****************************************************************/
/*                                                               */
/* Routine Name: SL_VerifyPromExists                             */
/*                                                               */
/* Function:     This function determines if a prom exists in the*/
/*               current socket.                                 */
/*                                                               */
/* Return Codes: Failure, Success                                */
/*                                                               */
/*****************************************************************/
SL_VerifyPromExists()
{
    int                                        *pEprom = (int *)

if ( (pEprom[0] == SL_PROM_ABSENT_PATTERN) &&
         (pEprom[1] == SL_PROM_ABSENT_PATTERN) &&
         (pEprom[2] == SL_PROM_ABSENT_PATTERN) &&
         (pEprom[3] == SL_PROM_ABSENT_PATTERN) )
            return(FAILURE);
    return(SUCCESS);
}
``` sl_utils.c

```
/****************************************************************
 *
 *  Routine Name:   SL_PromIO
 *
 *  Function:       This function performs prom IO through a message
 *                  structure. This structure is the one that master
 *                  and slave tasks will use to read/write data on the
 *                  proms on a memory card. Read requests that will be
 *                  supported are SL_READ and SL_READ_HEADER.
 *                  All reads to a prom will be integer reads.
 *                  The write requests supported will be SL_WRITE_BYTE
 *                  to support single byte reads, SL_WRITE_AND_VERIFY
 *                  for one or more contiguous set of bytes, and
 *                  SL_VERIFY and SL_VERIFY_BYTE for write verification
 *
 *  Input:      pData       SL_Request  : A pointer to the message structure
 *                                      : One of the ones supported as shown
 *                                        above.
 *
 *  Return Codes:   Failure, Success, SL_NO_MORE_PROM_DATA
 *                                    SL_INVALID_PARAMETER
 *
 ****************************************************************/

SL_PromIO(pData, SL_Request)
struct   SL_Data_Msg         *pData;
int                                                 SL_Request;
{
    unsigned char                        Socket, *pMemData, *pUser
    unsigned int                         StartByte, Bytes;        Status
    int                                  Status;
    struct   SL_Batch_Header             *pBatchHdr;

/*  First initialize variables from the data packet received. This is
     *  the same for both read and write requests. The IO is between the
     *  user data area and the memory card area. In case of a read it is
     *  from the memory card to the user data area and the opposite in
     *  case of a write.
     */ pBatchHdr  = &pData -> SL_Batch_Hdr;
    Socket     = SL_PromToSocket( pBatchHdr -> SL_BatchPromNo );
    pMemData   = (unsigned char *)&PROM_Hdr;
    StartByte  = pBatchHdr -> SL_StartByte;
    pUserData  = &pData -> SL_Data.SL_Byte_Data[0];

/*  For read requests, the prom header has to be read. The prom
     *  header provides the maximum number of bytes that can be read of
     *  that prom. Then the actual number of bytes that are to be read
     *  and the starting location of the prom to read are determined.
     *  In case of SL_READ_HEADER, the header is immediately available,
     *  so no further reads are requested.
     */
```

```
    switch (SL_Request) { case    SL_READ_HEADER:
            SL_ReadSocket(Socket,pMemData,pUserData,(EPHSZ >> 2),SL_INT);
            pBatchHdr -> SL_StartByte  = 0;
            pBatchHdr -> SL_ByteCount  = (unsigned short)EPHSZ;
            break;

case    SL_READ:
            Bytes = pBatchHdr -> SL_ByteCount;
            pMemData += StartByte;
            SL_ReadSocket(Socket,pMemData,pUserData,(Bytes >> 2),SL_INT);

/*  In the case of write, it is necessary to determine the number of
             *  bytes to write and the location to start from. If SL_WRITE_ONLY
             *  is requested, it will assume that only 1 byte will be written.
             */
            break;
    case    SL_WRITE:
    case    SL_WRITE_BYTE:
    case    SL_WRITE_AND_VERIFY:
    case    SL_VERIFY:
    case    SL_VERIFY_BYTE:
            Bytes = pBatchHdr -> SL_NextByte;
            if ( (pBatchHdr -> SL_ByteCount - Bytes) <= 0)
                Status = SL_NO_MORE_PROM_DATA;
            else
            {
                pUserData += Bytes;
                pMemData  += (StartByte + Bytes);
                if ( SL_Request == SL_WRITE_BYTE ||
                     SL_Request == SL_VERIFY_BYTE )
                    Bytes = 1;
                else
                    Bytes = (pBatchHdr -> SL_ByteCount - Bytes);
                Status = SL_WriteSocket(Socket, pUserData, pMemData, Bytes,
                                                 SL_Request, 0xff
            }
            break;

default:
            Status = SL_INVALID_PARAMETER;
            break;
    }
    return(Status);
}
``` sl_utils.c

```
/*****************************************************************/
//
//      Routine Name:   SL_ReadSocket
//
//      Function:       This function performs socket reads given a socket
//                      number and a start address. It performs integer,
//                      short and byte reads. It performs page flips and
//                      odd byte flips as required to ensure correct prom
//                      operation.
//
//      Input:  Socket   : The socket numer in question
//              pSource  : The start address for the read operation
//              pDest    : The plac eto keep the data to be read
//              HowMany  : The number of characters to be read
//              ReadType : Either SL_INT or SL_SHORT
//
//      Return Codes:   Success
//
/*****************************************************************/

SL_ReadSocket(Socket, pSource, pDest, HowMany, ReadType)
unsigned char           Socket;
unsigned int            *pSource, *pDest;
int                     HowMany, ReadType;

{
    unsigned char       Control;
    struct MemoryCard   *pMemCard = &MemoryCard;
Control = Socket;
while (--HowMany >= 0)
{ if ( (int)pSource >= SL_MEMCARD_16K )
        Control = Socket | SL_OTHER_PAGE;
    pMemCard -> PromSelect = Control;

switch (ReadType) {
        case SL_INT:
            *pDest++ = *pSource++;
            break;

case SL_SHORT:
            *((short *)pDest)++ = *(short *)pSource)++;
            break;

case SL_BYTE:
            *((char *)pDest)++ = *((char *)pSource)++;
            break;
    }
} return(SUCCESS);
}
```

```
/*****************************************************************/
//
//      Routine Name:   SL_WriteSocket
//
//      Function:       This function performs socket write given a socket
//                      number and a start address. It performs only byte
//                      writes and performs page flips and byte flips as
//                      required to ensure correct prom operation.
//                      If a write operation fails once, it will try again
//
//      Input:  Socket   : The socket numer in question
//              pSource  : The start address for the write operation
//              pDest    : The plac to keep the data to be written
//              HowMany  : The number of characters to be written
//              WriteType: Either SL_WRITE, SL_VERIFY, SL_WRITE_BYTE,
//                         SL_WRITE_AND_VERIFY or SL_VERIFY_
//
//      Return Codes:   Success, Failure, SL_DELAY_WRITE
//
/*****************************************************************/

SL_WriteSocket(Socket, pSource, pDest, HowMany, WriteType, Card)
unsigned char           Socket;
unsigned char           *pSource, *pDest;
int                     HowMany, WriteType;
unsigned short          Card;

{
    unsigned char       Control;
    int                 Status = SUCCESS;
    struct MemoryCard   *pMemCard = &MemoryCard;

pMemCard -> RevReadledWrite = 0;
/*
```

```c
                                          sl_utils.c

/*/////////////////////////////////////////////////////////////////////////
    //
    //      Routine Name:   SL_CheckWrite
    //
    //      Function:       This function checks whether the byte written to
    //                      the memory card has settled or not. To determine
    //                      this it busy waits, but not on the CBUS.
    //
    //      Input:          pSource : A pointer to the source byte pointer
    //                      pDest   : The detination byte pointer
    //
    //      Return Codes:   Success, Failure
    //
    /////////////////////////////////////////////////////////////////////////*/
    SL_CheckWrite(pSource, pDest)
    unsigned char           *pSource, *pDest;
    {
            int             LoopCount = 0x4c00;

while (--LoopCount)
            {
                    if ( ((LoopCount & 0x3ff) == 0x3ff) && (pDest == *pSource) )
                            return(SUCCESS);
            } return(FAILURE);
    }

/*
    while ( (--HowMany) >= 0 )
    {
            Control = Socket;
            if ( ((int)pDest >= SL_MEMCARD_16K )
                    Control = Socket | SL_OTHER_PAGE;
            if ( ((int)pDest & 1) )
                    Control |= SL_OTHER_BYTE;
            pMemCard -> PromSelect = Control;

switch (WriteType) { case SL_WRITE:
            case SL_WRITE_BYTE:             /* Single Byte Writes Only */ if (*pDest != *pSource)
                    {
                            *pDest = *pSource;
                            if (*pDest != *pSource)
                                    return(SL_DELAY_WRITE);
                    }
                    break;

case SL_WRITE_AND_VERIFY:

if (*pDest != *pSource)
                    {
                            *pDest = *pSource;
                            if (SL_CheckWrite(pSource, pDest) != SUCCESS )
                            {
                                    *pDest = *pSource;
                                    if( (Status = SL_CheckWrite(pSource,pDest)) != SU
                                    {
                                            SendEventLogMsg(EV_TYPE_SL, EV_SLU_MEM_WR
                                                    CardNet,Ad
                                                    *pSource)

return(Status);
                                    }
                            }
                    }
                    break;

case SL_VERIFY:
            case SL_VERIFY_BYTE:            /* Single Byte Verifies Only */ if   ( (*pDest != *pSource) &&
                         ((Status = SL_CheckWrite(pSource, pDest)) != SUCCESS) )
                            return(Status);

break;
            } pDest++;
            pSource++;
    } return(status);
*/
``` sl_utils.c

```c
/*************************************************************
    Routine Name:   SL_Read_SW_Sts
    Function:       This function reads the status of software on a memory card.*/
    Input:          CardNo : The card in question
    Return Codes:   The status (old, dirty, trial and new)
*************************************************************/

SL_Read_SW_Sts(CardNo)
unsigned short              CardNo;
{
    unsigned char           SW_Sts = 0xff;
    int                     Status;
    struct SL_TasCard       TasCard;

SW_Sts = SL_DIRTY_SW;
    TasCard.SL_CardTassed = 0xfff;

/* Tas the card for access */
    if( (Status = SL_TasMemCard(CardNo, &TasCard)) == SUCCESS)
    {
        /* Now go ahead and read the database socket for the software
        /* status
        SL_ReadSocket(SL_DB_SOCKET,&SL_DB_SW_STS,&SW_Sts,1,SL_BYTE);
        SL_UnTasMemCard(CardNo, &TasCard);
        if (SW_Sts == 0xff)
            SW_Sts = SL_OLD_SW;
    }
    return(SW_Sts);
}
/*

/*************************************************************
    Routine Name:   SL_Write_SW_Sts
    Function:       This function writes the status of software on a memory card.*/
    Input:          CardNo : The card in question
                    SW_Sts : The software status to write
    Return Codes:   Success, Failure
*************************************************************/

SL_Write_SW_Sts(CardNo, SW_Sts)
unsigned short              CardNo;
unsigned char               SW_Sts;
{
    int                     Status;
    struct SL_TasCard       TasCard;

TasCard.SL_CardTassed = 0xfff;

if( (Status = SL_TasMemCard(CardNo, &TasCard)) == SUCCESS )
    {
        Status = SL_WriteSocket(SL_DB_SOCKET, &SL_DB_SW_STS, &SW_Sts,
                                1, SL_WRITE_AND_VERIFY, CardNo);
        SL_UnTasMemCard(CardNo, &TasCard);
    }
    return(Status);
}
/*
```

```
                                                                                    sl_utils.c /*
SL_Change_SW_Sts(Card, SW_Sts, OrigTid)

unsigned short                          Card;
unsigned char                           SW_Sts;
struct Tid                              OrigTid;
{
    unsigned short                      TasCard = 0xffff;
    int                                 s
    struct  SL_DB_Msg                   *pMsg;

Status = SL_ReqMem(&pMsg, sizeof (*pMsg), -1);

if (Status == SUCCESS)
    {
        pMsg -> SL_DB_Card = Card;
        pMsg -> SL_DB_SW_Sts = SW_Sts;
        pMsg -> SL_ItcHdr.Length = sizeof (*pMsg) - sizeof(struct ItcHeader);
        Status = SL_SendMsg((unsigned short)GetNodeId(), DB_CHANGE_SW_STS_MSG,
                            OrigTid, DB_Tid, EX_INITIAL, 0, p if(Status != SUCCESS)
        {
            SendEventLogMsg(EV_TYPE_SL, EV_SLU_DB_REQUEST_ERROR,
                            CardNetAddr(Card), SW_Sts,
                            EV_TOK_TASK_ID(GetNodeId()), OrigT }
        else if( OrigTid.Generic == TID_SOFTLOAD_SLAVE ||
                 OrigTid.Generic == TID_SOFTLOAD_MASTER) &&
                 SW_Sts == SL_DIRTY_SW )
        {
            /* If the request was from the sl tasks and it was asking
            /* to change the status of the card to dirty, go through
            /* the sockets and change the header, erasing it effectua SW_Sts = 0xff;
            if( (Status = SL_TasMemCard(Card, &TasCard)) == SUCCESS )
            {
                Counter = SL_MAX_SOCKETS;
                while( --Counter >= 0 )
                {
#if BIG_DBC
                    if(( Counter == SL_DB_SOCKET )
                       || (Counter == SL_DB_SOCKET - 1)
#endif
                       )
                        continue;

SL_WriteSocket(Counter, &SW_Sts, &EPROM_Hdr.Ident
                                   SL_WRITE_AND_VERIFY, C }
                SL_UnTasMemCard(Card, &TasCard);
            }
        }
    }
    return(Status);
}
/*
```

```
/*******************************************************/
/*                                                     */
/*  Routine Name:  SL_PromToSocket                     */
/*                                                     */
/*  Function:      Conversion from a prom number to a socket number */
/*                                                     */
/*  Input:         Prom:  The prom number to convert   */
/*                                                     */
/*  Return Codes:  The Socket number or -1             */
/*                                                     */
/*******************************************************/

SL_PromToSocket(Prom)
unsigned char                           Prom;
{
    if( (Prom < 1) || (Prom > SL_MAX_PROMS) )
        return(-1);
    else
        return( SL_PromSocketMap [Prom] );
}

/*******************************************************/
/*                                                     */
/*  Routine Name:  SL_SocketToProm                     */
/*                                                     */
/*  Function:      Conversion from a Socket number to a Prom number */
/*                                                     */
/*  Input:         Socket: The Socket number to convert */
/*                                                     */
/*  Return Codes:  The Prom number or -1               */
/*                                                     */
/*******************************************************/

SL_SocketToProm(Socket)
unsigned char                           Socket;
{
    if ( Socket >= SL_MAX_SOCKETS )
        return(-1);
    else
        return( SL_SocketPromMap [Socket] );
}
/*
``` sl_utils.c

```c
/*****************************************************************
    Routine Name:  SL_InitCard Function:      This function initializes the SL_MemCard structure
                   to known values Input:         pCard :  A pointer to a SL_MemCard structure Return Codes:  Success
*****************************************************************/
SL_InitCard(pCard)
struct SL_MemCard    *pCard;
{
    SL_InitBytes(pCard, sizeof (*pCard), 0);

pCard -> SL_Card_Sts.SL_Card = 0xffff;
    pCard -> SL_Card_Sts.SL_State = SL_DIRTY_SW;

return(SUCCESS);
}

/*****************************************************************
    Routine Name:  SL_CopyBytes Function:      This function copies "Length" bytes from one area
                   to another Input:         pSrc:   A pointer to the source area
                   pDest:  A pointer to the destination area
                   Length: The number of bytes to copy Return Codes:  Success
*****************************************************************/
SL_CopyBytes(pSrc, pDest, Length)
unsigned char    *pSrc, *pDest;
int              Length;
{
    while (--Length >= 0)
        *pDest++ = *pSrc++;

return(SUCCESS);
}

/*****************************************************************
    Routine Name:  SL_InitBytes Function:      This function initializes a memory area to known
                   values Input:         pDest:  A pointer to the destination area
                   Length: The number of bytes to initialize
                   Value:  The value to initialize Return Codes:  Success
*****************************************************************/
SL_InitBytes(pDest, Length, Value)
char             *pDest;
int              Length;
unsigned int     Value;
{
    int          NbrInts, *pInt;

if (Length > 0)
    {
        Value = Value | (Value << 8) | (Value << 16) | (Value << 24);
        /*    Initialize the initial odd byte if any       */
        if ( (int)pDest & 1 )
        {
            *pDest++ = (char)Value;
            --Length;
        }

/* Now initialize the integers in the remaining length */
        NbrInts = Length >> 2;
        pInt = (int *)pDest;
        while (--NbrInts >= 0)
            *pInt++ = Value;

/* If there are any words or bytes left over, initialize them too ! */
        if ( (Length &= 3) )
        {
            pDest = (char *)pInt;
            while (--Length >= 0)
                *pDest++ = (char)Value;
        }
    } return(SUCCESS);
}
``` sl_utils.c

```
/*****************************************************************
    Routine Name:   SL_ReqMem Function:       This function is the single source point for all
                    memory requests.

Input:          pmsg    : A pointer to the memory area
                    Size    : The size requested
                    Delay   : The time to delay if no memory available Return Codes:   Success, SL_NO_MEMORY
*****************************************************************/

SL_ReqMem(pMsg, Size, Delay)

int     *pMsg;
int     Size;
int     Delay;
{
    int     Status = if (Delay < 0)
        Delay = MAXTIME_MEM;

*pMsg = NULL;
    *pMsg = ReqMem(Size, Delay);

if (*pMsg != NULL)
    {
        SL_InitBytes(*pMsg, Size, 0);
        Status = SUCCESS;
    } return(Status);
}

/*
/*****************************************************************
    Routine Name:   SL_ReqMsg Function:       This function is the single source point for all
                    message requests.

Input:          pmsg          : A pointer to the message area
                    Exchange_Mask : The mask of exchanges to look at
                    Delay         : The time to delay if no message is available Return Codes:   Success, Failure
*****************************************************************/

SL_ReqMsg(pMsg, Exchange_Mask, Delay)

int     *pMsg;
int     Exchange_Mask;
int     Delay;
{
    int     Status = FAILURE;

if (Delay < 0)                          /* Wait for one minutes at least
        Delay = NULL;

*pMsg = NULL;

if ( !(Delay) )
        *pMsg = GetMsg(Exchange_Mask);
    else
        *pMsg = ReqMsg(Exchange_Mask, Delay);

if (*pMsg != NULL)
        Status = SUCCESS;

return(Status);
}
/*
``` sl_utils.c

```c
/*****************************************************************/
/*                                                               */
/*   Routine Name:  SL_GetTime                                   */
/*                                                               */
/*   Function:      This function returns elapsed time in the SL_TOD */
/*                  structure                                    */
/*                                                               */
/*   Input:         OldTime : The old time value                 */
/*                  NewTime : The new time value                 */
/*                  pTime   : A pointer to the SL_TOD time structure */
/*                                                               */
/*   Return Codes:  Success                                      */
/*                                                               */
/*****************************************************************/

SL_GetTime(OldTime, NewTime, pTime)
   register unsigned int       OldTime, NewTime;
   struct  SL_TOD              *pTime;
{
   register unsigned int       Seconds;
                               MSeconds;

MSeconds  = NewTime - OldTime;
   Seconds   = MSeconds / (short)125;
   MSeconds  = MSeconds - Seconds * 8;

pTime -> SL_Days    = (int)Seconds / (int)(3600 * 24);
   Seconds             -= pTime -> SL_Days  * 3600 * 24;
   pTime -> SL_Hours   = Seconds / 3600;
   Seconds             -= (pTime -> SL_Hours * 3600);
   pTime -> SL_Minutes = Seconds / 60;
   pTime -> SL_Seconds = Seconds % 60;
   pTime -> SL_MSeconds = MSeconds;

return(SUCCESS);
}

/* This procedure commented out right now - used only for debugging !!! */

SL_MemCardDisplay(pMemCard, NbrCards)
   struct  SL_MemCard      *pMemCard;
   int                     NbrCards;
{
   int                     Slot, Socket;
   struct  SL_MemSocket    *pSocket;

Slot = NbrCards;
   while ( --Slot >= 0 )
   {
      if (pMemCard -> SL_Card_Sts.SL_Card == 0x(fff))
         break;
      printf("\n\nCard: %x\tState: %d.%d.%d",
             pMemCard -> SL_Card_Sts.SL_Card,
             pMemCard -> SL_Card_Sts.SL_State,
             pMemCard -> SL_Card_Sts.SL_Rel.SL_Release,
             pMemCard -> SL_Card_Sts.SL_Rel.SL_Version,
             pMemCard -> SL_Card_Sts.SL_Rel.SL_Edit);
      printf("\tType: %x", pMemCard -> SL_Card_Sts.SL_Type);
      printf("\nSoc  Version    Prom Seq   Address     Size   Type");
      printf("\n---  -------    --------   -------     ----   ----");
      Socket  = -1;
      pSocket = &pMemCard -> SL_Socket[0];
      while ( (++Socket) < SL_MAX_SOCKETS )
      {
         if ( (pSocket->SL_PromSeqNo > 0) &&
              (pSocket->SL_PromSeqNo <= SL_MAX_PROMS) )
            printf("\n%3d  %2d.%3d  %4d  %2d",
                   Socket,
                   pSocket -> SL_Socket_Rel.SL_Release,
                   pSocket -> SL_Socket_Rel.SL_Version,
                   pSocket -> SL_Socket_Rel.SL_Edit,
                   pSocket -> SL_PromNo,
                   pSocket -> SL_PromSeqNo,
                   pSocket -> SL_NbrProms);
            printf("  0x%6x  %4x  0x%2x",
                   pSocket -> SL_BaseAddr,
                   pSocket -> SL_NbrBytes,
                   pSocket -> SL_PromType);
         ++pSocket;
      }
      ++pMemCard;
   }
   printf("\n");
   return(SUCCESS);
}
```

```
/*****************************************************************
    Routine Name:   SL_SendMsg Function:       This function is the single source point for all
                    message send requests.

Input:          TgtNode  : The node to send the message
                    MsgType  : The type of message
                    SrcTid   : The Tid of the sending task
                    TgtTid   : The Tid of the sendee or receiver task
                    Exc      : The Exchange to use
                    RC       : The return code
                    pmsg     : A pointer to the message area Return Codes:   Success, Failure
*****************************************************************/

SL_SendMsg(TgtNode, MsgType, SrcTid, TgtTid, Exc, RC, pMsg)

unsigned short                              TgtNode;        MsgType;
int                                         SrcTid, TgtTid; Exc, RC;
struct   Tid
int                                         *pMsg;
struct   ItcHeader
{
    unsigned short                          Size = 0;
    int                                                     Status = SUCCESS;
    register struct ItcHeader               *pItc;

/* If the user has not provided a message area, get one !! */
    /* Make sure that the length is correctly retained         */
    if (pMsg == NULL)
        Status = SL_ReqMem(&pMsg, sizeof(*pMsg), -1);
    else
        Size = pMsg -> Length;

/*                                                                      */
    /* If the message area has been set up, go ahead and fill it in with    */
    /* the relevant message header information.                             */
    /*                                                                      */
    if (Status == SUCCESS)
    {
        pItc = pMsg;
        pItc -> DestNode         = TgtNode;
        pItc -> OrigNode         = GetNodeId();
        pItc -> Type             = MsgType;
        pItc -> DestTid.Instance = TgtTid.Instance;
        pItc -> DestTid.Generic  = TgtTid.Generic;
        pItc -> OrigTid.Instance = SrcTid.Instance;
        pItc -> OrigTid.Generic  = SrcTid.Generic;
        pItc -> Exchange         = Exc;
        pItc -> Return           = RC;
        pItc -> Length           = Size;

/* If the message is to be sent to local node use SendMsg */
        /* rather than DsendMsg !! (some optimization !)          */
        if (TgtNode == GetNodeId())
            Status = SendMsg(pItc);
        else
            Status = DSendMsg(pItc);
    }
    return(Status);
}
/*
``` sl_utils.c sl_utils.c

```c
/*
 SL_MemCardMgr(pMemCard)
*/
struct  SL_MemCard      *pMemCard;
{
        unsigned char           Seq, PromNo, NbrProms = 0,
                                FirstSet = 0, Ver
                                Counter, Status =
        int                     SL_MemSocket    *pSocket;
        struct  SL_SW_Release   *pSts;
        struct  SL_PromMgr      SLM_PromMgr[SL_MAX_PROMS+1], *pPM pPM = &SLM_PromMgr[0];
        pMemCard -> SL_Card_Sts.SL_Type = SL_EMPTY_SOCKET;
        pSts = &pMemCard -> SL_Card_Sts.SL_Rel;
        pSts -> SL_Release = 0;
        pSts -> SL_SubRelease = 0;
        pSts -> SL_Version = 0;
        pSts -> SL_Edit = 0;
        SL_InitBytes(pPM, sizeof (SLM_PromMgr), 0);
        Counter = SL_MAX_PROMS + 1;
        while ( --Counter >= 0 )
                pPM++ -> SL_PM_Sts = 1;

pSocket = &pMemCard -> SL_Socket[0];
        for (Counter = 0; Counter < SL_MAX_SOCKETS; Counter++, pSocket++)
        {
#if BIG_DBG
                if ( (Counter == SL_DB_SOCKET - 1) ||
#endif
                     ( pSocket -> SL_PromSeqNo < 1) ||
                     ( pSocket -> SL_PromSeqNo > SL_MAX_PROMS )
                   )
                        continue;

if ( (PromNo = pSocket -> SL_PromNo) > SL_MAX_PROMS )
                        continue;

pPM = &SLM_PromMgr[PromNo];

if (pPM -> SL_PM_Exists)
                        pPM -> SL_PM_Sts = 0;
                else
                {
                        pPM -> SL_PM_SeqNo     = pSocket -> SL_PromSeqNo;
                        pPM -> SL_PM_NbrProms  = pSocket -> SL_NbrProms;
                        pPM -> SL_PM_Socket    = Counter;
                        pPM -> SL_PM_Type      = pSocket -> SL_PromType;
                        pPM -> SL_PM_Exists    = 1;
                        pPM -> SL_PM_Edit      = pSocket -> SL_Socket_Rel.SL_Edit;
                        pPM -> SL_PM_Version   = pSocket -> SL_Socket_Rel.SL_Version;
                        pPM -> SL_PM_Release   = pSocket -> SL_Socket_Rel.SL_Release;
                        ++NbrProms;
                }
        }

/*
        pPM = &SLM_PromMgr[0];
        Counter = SL_MAX_PROMS;
        while((Counter--) > 0)
        {
                if ( !(pPM -> SL_PM_Sts) || !(pPM -> SL_PM_Exists) )
                {
                        pPM++;
                        continue;
                } if( (pPM -> SL_PM_SeqNo != 1) )
                {
                        pPM -> SL_PM_Sts = 0;
                        pPM++;
                        continue;
                } pPMSet = pPM;
                if (FirstSet == 0)
                {
                        pMemCard -> SL_Card_Sts.SL_Type = pPM -> SL_PM_Type;
                        pSts -> SL_Version     = pPM -> SL_PM_Version
                        pSts -> SL_Release     = pPM -> SL_PM_Release;
                        pSts -> SL_Edit        = pPM -> SL_PM_Edit;
                        pSts -> SL_SubRelease  = 0;
                        FirstSet = 1;
                }

Version = pPM -> SL_PM_Version;
                Edit    = pPM -> SL_PM_Edit;
                for (Seq = 1; Seq <= pPM -> SL_PM_NbrProms; Seq++, pPMSet++)
                {
                        if ( !(pPMSet -> SL_PM_Exists) ||
                             (pPMSet -> SL_PM_SeqNo != Seq) ||
                             (pPMSet -> SL_PM_Edit != Edit) ||
                             (pPMSet->SL_PM_Version != Version) )
                                pPMSet -> SL_PM_Sts = 0;

Counter--;   /* to account for decrement at the top of the loo
                } pPM = pPMSet;
                Counter++;
        } pPM = &SLM_PromMgr[0];
        for (Counter = 0; Counter <= SL_MAX_PROMS; Counter++, pPM++)
        {
                if (pPM -> SL_PM_Sts)
                        continue;
                Status = FAILURE;
                break;
        } if (Status == SUCCESS)
        {
                if ( (NbrProms == 0) || (FirstSet == 0) ||
                     (pMemCard -> SL_Card_Sts.SL_State == SL_DIRTY_SW) )
                        Status = FAILURE;
        } if (Status == FAILURE)
        {
                pSts -> SL_Release    = 0;
                pSts -> SL_SubRelease = 0;
                pSts -> SL_Version    = 0;
                pSts -> SL_Edit       = 0;
                if (pMemCard -> SL_Card_Sts.SL_Type == SL_EMPTY_SOCKET)
```

```
                    pMemCard -> SL_Card_Sts.SL_Type =
                        pMemCard -> SL_Socket[0].SL_PromType;
    }
    return(Status);
}
/*
 */
``` sl_utils.c

```c
/*
SL_GetString(pstr, Category, Type)
*/
unsigned char       *pstr;
unsigned int        Category, Type;
{
    unsigned char   **pTypeStr, *pstring, dummy = 0,
                     *pPromStr;

*pstr = 0;
    if (Category > 0 && Category <= SL_YESNO_CATEGORY)
    {
        pTypeStr = pGenericStrings[Category];

switch (Category) { case SL_SW_CATEGORY:
            dummy = Type;
            if (dummy == 0x55)
                Type = 1;
            else if (dummy == 0xa5)
                Type = 2;
            else if (dummy == 0x5a)
                Type = 3;
            else if (dummy)
                Type = 4;
            break;

case SL_PROM_CATEGORY:
            pPromStr = "EPROM";
            if ( (Type &= 0x77) > 4 )
            {
                if (Type && 0x07)
                {
                    pPromStr = "NVRAM";
                    dummy = 2;
                }
                else
                    dummy = 1;
                Type >>= 4;
            }
            if ( Type > 4 )
                Type = 0;
            break;

case SL_YESNO_CATEGORY:
            if (Type > 1)
                Type = 1;
            break;

default:
            break;
        } pstring = pTypeStr[Type];
        while (*pstr++ = *pstring++);
        if (Category == SL_PROM_CATEGORY)
        {
            --pstr;
            *pstr++ = '-';
            if (Type > 0)
            {
                if (dummy == 1)
```

```c
            *pstr++ = 'E';
        while(*pstr++ = *pPromStr++);
    }
    return(SUCCESS);
}
/*
 */
SL_MemCardCopy(Card, pTasCard)
    unsigned short      Card;
    struct  SL_TasCard  *pTasCard;
{
    unsigned char   NbrBasicSet;
    int             Counter;
    struct EP_Header *pHdr = &BootData.EpHdr[1]

NbrBasicSet = pHdr -> NbrEproms;

for( Counter = 1 ; Counter < NO_OF_HEADERS; Counter++, pHdr++)
    {
        /* Only copy those proms that have an Eprom number and are part
        /* of the basic set.
        */
        if( pHdr->EpromNumber <= 0 || pHdr -> NbrEproms != NbrBasicSet )
            continue;

/* Tas the card first.
        */
        if( (Status = SL_TasMemCard(Card, pTasCard) != SUCCESS )
            break;

/* Write the entire prom out to the NVRAM minus the header
        /* If there are any errors in writing this out, abort the
        /* process immediately.
        */
        if( (Status = SL_WriteSocket(SL_PromSocketMap[pHdr -> EpromNumber],
                                     pHdr -> BaseAddr
                                     (char *)(&EPROM
                                     pHdr -> NoofByte
                                     SL_WRITE_AND_VER
        {
            SL_UnTasMemCard(Card, pTasCard);
            break;
        }

/* Now write the header out to the NVRAM.
        */
        Status = SL_WriteSocket(SL_PromSocketMap[pHdr -> EpromNumber],
                                pHdr, &EPROM_Hdr, sizeof
                                SL_WRITE_AND_VERIFY, Card /* UnTas the card and delay a bit inorder to let others get
        /* in. This is a heavy CBus activity, we need a rest.
        */
        SL_UnTasMemCard(Card, pTasCard);
        Delay(1);

/* Check if there are any errors in the NVRAM (checksum)
        /* and report accordingly.
        /* VerifyChecksums does its own Tassing and Untassing.
        */
        if( Status != SUCCESS ||
            (Status = SL_VerifyChecksums(Card, pTasCard)) != SUCCESS )
            break;
    } return(Status);
}
``` sl_utils.c sl_utils.c

```c
/*
SL_VerifyChecksums(Card, pTasCard)
unsigned short        Card;
struct   SL_TasCard   *pTasCard;
{
    unsigned char     Socket;
    int /*    Tas the destination memory card first
*/
    if( ( status = SL_TasMemCard(Card, pTasCard) ) != SUCCESS )
        return(status);

/*    For each of the sockets in the destination memory card verify
/*    the code checksums
*/
    Counter = SL_MAX_SOCKETS;
    while(--Counter >= 0)
    {
        /*    Program the socket number
        /*    Skip the database socket, it does not contain any softwar
        */
#if BIG_DBC
        if(( (Socket = SL_MAX_SOCKETS - Counter - 1) == SL_DB_SOCKET )
            || (Socket == SL_DB_SOCKET - 1)
#endif
            continue;

/*    Verify the checksum now, the header first, the code next
        */
        if( SL_VerifyEpromChecksum(Socket, &Checksum, &Actual) != SUCCESS )
        {
            SendEventLogMsg(EV_TYPE_SL, EV_SLU_MEM_CHECKSUM_ERROR,
                            CardNetAddr(Card), Socket, Actual
            Status = FAILURE;
            break;
        }
    }

/*    Now untas the memory card before exiting
    */
    SL_UnTasMemCard(Card, pTasCard);

return(status);
}

/*
SL_VerifyEpromChecksum(Socket, pChecksum, pExpectedChecksum)
unsigned char
int
{
    unsigned short        Socket;
    unsigned int          IntCount;
    int                   NbrIntsToChecksum;

/*    We checksum the entire PROM except for the first 4
    /*    bytes, which hold the checksum itself.
    */
    MemoryCard.PromSelect = Socket;

if (EPROM_Hdr.Identifier <= 0)
        return(SUCCESS);

*pChecksum = 0;
    *pExpectedChecksum = EPROM_Hdr.HeaderChecksum;

/*    Look out for bad headers    */
    if( SL_VerifyHeaderChecksum(&EPROM_Hdr, pChecksum) != SUCCESS )
        return(FAILURE);

*pChecksum = 0;
    *pExpectedChecksum = EPROM_Hdr.EpromChecksum;
    EpromChecksum = 0;
    IntCount = 8;
    ptrSource = (int *) &EPROM_Hdr;
    ptrSource += 8;

/*    Get the number of Ints, based upon the Byte Count
    */
    NbrIntsToChecksum = EPROM_Hdr.NooIbytes >> 2;

/*    Watch out for bad values    */
    if (NbrIntsToChecksum > ((1 << 14) - 8) )
        return(FAILURE);

do {
        EpromChecksum += *ptrSource++;
        if( EpromChecksum >= 0)
            EpromChecksum <<= 1;
        else
        {
            EpromChecksum <<= 1;
            EpromChecksum++;
        }

/*    Always page-flip on 32 Kbyte boundary
        /*    ans also flip on 16 Kbyte boundary if this
        /*    is a 256K EEPROM or Static.
        */
        if( ++IntCount == 8192)
        {
            ptrSource = (int *) &EPROM_Hdr;
            MemoryCard.PromSelect = 0x20 | Socket;
        }
        if( (IntCount == 4096) &&
            (SL_VerifyPromAlloc(SL_16K_BOUNDARY >> 2) == SUCCESS) )
            MemoryCard.PromSelect = 0x20 | Socket;
    } while( --NbrIntsToChecksum > 0);
``` sl_utils.c

```c
*/
SL_VerifyHeaderChecksum(ptrHeader, pEpromChecksum)
struct   EP_Header   *ptrHeader;
int                  *pEpromChecksum;
{
    unsigned short   ExpectedChecksum;
    int              EpromChecksum;
    int              IntCount;

ExpectedChecksum = ptrHeader->HeaderChecksum;
    EpromChecksum = 0;
    ptrSource = (int *) ptrHeader;
    ptrSource += 2;

for( IntCount = 0; IntCount < 6; IntCount++)
    {
        EpromChecksum += *ptrSource++;
        if( EpromChecksum >= 0)
            EpromChecksum <<= 1;
        else
        {
            EpromChecksum <<= 1;
            EpromChecksum++;
        }
    }

*pEpromChecksum = EpromChecksum;
    if(EpromChecksum == ExpectedChecksum)
        return(SUCCESS);

return(FAILURE);
}
``` sl_utils.c

```c
88/07/20
07:24:26
*/
SL_VerifyMemory()
{
    unsigned char       NbrBasicSet, NbrF
    int                                  C
                                         s
    struct  EP_Header        *pHdr = &BootData NbrBasicSet = 0xff;
    NbrFound = 0;

if( pHdr -> EpromNumber && pHdr -> Identifier > 0 &&
        (SL_VerifyHeaderCheksum(pHdr, &ComputedChecksum) == SUCCESS ) )
        NbrBasicSet = pHdr -> NbrEproms;

for( Counter = 1 ; Counter < NO_OF_HEADERS; Counter++, pHdr++)
    {
        /* Skip over fields with zero EPROM numbers
        if( pHdr -> EpromNumber == 0)
            continue;

/* Skip over fields with sequence numbers other than the basic  *
        /* set.

if( pHdr -> NbrEproms != NbrBasicSet )
            continue;

if( SL_VerifyHeaderChecksum(pHdr, &ComputedChecksum) != SUCCESS )
        {
            SendEventLogMsg(EV_TYPE_SL, EV_SLU_HDR_CHECKSUM_ERROR,
                            CPUNetAddr(), pHdr -> EpromNumber
                            pHdr -> HeaderChecksum, ComputedC
            Status = FAILURE;
            continue;
        } if( SL_VerifyRAMChecksum(Counter, &ComputedChecksum) != SUCCESS )
        {
            SendEventLogMsg(EV_TYPE_SL, EV_SLU_CODE_CHECKSUM_ERROR,
                            CPUNetAddr(), pHdr -> EpromNumber
                            pHdr -> EpromChecksum, ComputedC
            Status = FAILURE;
            continue;
        }
        ++NbrFound;
    }

/* If the set in memory is otherwise good, but there are few proms
    /* missing, then we should log an incomplete message.

if( (NbrBasicSet != NbrFound) && (Status == SUCCESS) )
    {
        SendEventLogMsg( EV_TYPE_SL, EV_SLU_INCOMPLETE_CODE, GetProcId(),
                        NbrBasicSet, NbrFound );
        Status = FAILURE;
    }
    return(Status);
} unsigned char
SL_VerifyRAMChecksum(Prom, pChecksum)
                                                Prom;
                                                *pChecksum
{
    unsigned int    NbrIntsToChecksum;
    int             *pSource,
    struct  EP_Header    *pHdr;

pHdr = &BootData.EpHdr[Prom];

EpromChecksum = 0;
    pSource = (int *) pHdr->BaseAddress;
    NbrIntsToChecksum = pHdr->NoofBytes >> 2;
    do
    {
        EpromChecksum += *pSource++;
        if( EpromChecksum >= 0)
            EpromChecksum <<= 1;
        else
        {
            EpromChecksum <<= 1;
            EpromChecksum++;
        }
    }
    while( --NbrIntsToChecksum > 0);
    *pChecksum = EpromChecksum;

if(EpromChecksum == pHdr->EpromChecksum)
        return(SUCCESS);

return(FAILURE);
}
```

sl_utils.c

```
*/
SL_TelOM(Type, pMsg)
unsigned char           Type;
struct   SL_OM_Msg      *pMsg;
{
    struct    Tid                OMTId, My;

/* This informs the master OM of a software change about to occur - */
    /* The return codes are:
    /*      1 - CutOver         (SL_OM_CUTOVER)
    /*      2 - CutBack         (SL_OM_CUTBACK) Operator Initiated
    /*      3 - Update          (SL_OM_UPDATE)
    /*      4 - CutBack         (SL_OM_CUTBACK_ISOLATED)
    /*      5 - ClBLoad         (SL_OM_CLBLOAD) - Has a PMsg
    /*      6 - No ClBLoad      (SL_OM_CLBLOAD_IMPOSSIBLE)
    /*      7 - ClBLoad Done    (SL_OM_CLBLOAD_COMPLETE)
    /*      8 - ClBLoad Abort   (SL_OM_CLBLOAD_ABORT)

OMTId.Generic = TID_OBJ_MANAGER;
    OMTId.Instance = 0xfe;                   /* Go to the master OM !!
    GetTid(&MyTId);

/* Note that all Message Types have a NULL PMsg except for ClBLoad
    /* type message.

SL_SendMsg(GetNodeId(), SL_ACK, MyTId, OMTId, EX_INITIAL, Type, pMsg);

return(SUCCESS);
}

/*
*/
SL_DelayForever()
{
    while(TRUE)
        Delay(10 * ONE_MINUTE);
}

SL_MemCardPromInfo(Card,pHdr)
unsigned short Card;
struct EP_Header *pHdr;
{
    struct  SL_TasCard          TasCard;
    int     Socket;
    char    CodeType;

/* returns the CodeType of the first valid prom */

TasCard.SL_CardTassed = 0xffff;
    if( SL_TasMemCard(Card, &TasCard) != SUCCESS )
        return(-1);
    pHdr->CodeType = 0;
    for (Socket = 0; Socket < SL_MAX_SOCKETS; Socket++)
    {
        if (SL_GetPromType(Socket, Card) == SL_EMPTY_SOCKET )
        {
            continue;
        }
        SL_ReadSocket (Socket, &EPROM_Hdr,pHdr, (EPHSZ >> 2), SL_INT);
        if ((pHdr->Identifier == 0) || (pHdr->Identifier == -1))
        {
            continue;
        }
        break;
    }
    SL_UnTasMemCard(Card,&TasCard);
    return(SUCCESS);
}
```

I claim:

1. A maintenance method for updating system software for a plurality of processing units in a communication network from a first version to a second version, the processing units being distributed among multiple nodes being linked by communication channels, each of the processing units being coupled to one or more storage units each having a status identification, the method comprising the steps of:

installing the second version in a storage unit of a source node;

transmitting the second version through the network to one or more specified storage units in other nodes, including the steps of assigning a first status to the status identification of the specified storage units; and for at least one storage unit and a coupled processing unit in at least one of said other nodes, changing the status identification of the specified storage unit to a second status upon successfully transmitting the second version thereto;

initiating a trial use of the second version in the processing unit of the one of said other nodes, including the step of changing the status identification of the storage unit containing the second version to a third status;

detecting in the processing unit of the one of said other nodes whether the second version operates successfully or fails to operate successfully in the one of said other nodes during the trial use;

restoring, upon detecting that the second version fails to operate successfully during the trial use, the one of said other nodes to the first version, including the step of changing the status identification of the storage units containing the second version to the second status; and designating, upon detecting that the second version operates successfully during the trial use, the second version as a preferred version of system software in the one of said other nodes including the step of changing the status identification of the storage units containing the second version to a fourth status.

2. A method as in claim 1, further comprising the step of performing a consistency check on the second version of system software before the transmitting step.

3. A method as in claim 2, wherein the checking step comprises the steps of partitioning the second version into a prespecified number of modules and performing a checksum operation on each module.

4. A method as in claim 1, wherein the step of initiating a trial use comprises the steps of loading the second version from a storage unit for the one of said other nodes and executing the second version in the processing unit.

5. A method as in claim 4, wherein the detection step includes the step of monitoring for errors during the loading and execution o the second version.

6. A method as in claim 1, wherein the detecting step includes the steps of communicating one or more messages between a node and another node in the network and monitoring for errors during the communication.

7. A method as in claim 1, further comprising the steps, in response to a failure in the transmitting step, of:

locating a particular storage unit having the fourth status, copying the contents of the particular storage unit having the fourth status to a storage unit receiving the second version, and changing the status of the storage unit receiving the second version to a fourth status if the copying is successful.

8. A method as in claim 1, further comprising the steps, upon detecting a failure during the trial use, of:

locating a particular storage unit having a fourth status, copying the contents of the particular storage unit having a fourth status to the storage unit containing the second version, and changing the status identification of the storage unit containing the second version to the second status.

9. A method as in claim 1, further comprising, in a node with one or more additional processing units, the step of loading the one or more additional processing units with the second version after the second version has been designated as the preferred operational version.

10. A method as in claim 1, further including the step, in a node with one ore more additional processing units, of transferring processing from said processing unit to said one or more additional processing units in the node.

11. A method as in claim 1, wherein the step of transmitting the second version is initiated by a command entered at one of the processing units.

12. In a communication network having a plurality of processing units distributed among multiple nodes linked by communication channels where each of the processing units is coupled to at least one memory unit and where each memory unit has a status identification, maintenance apparatus for updating system software among the processing units from a first version to a second version comprising:

first means in a source node for receiving the second version;

second means coupled to the first means for transmitting the second version through the network to one or more specified memory units in one or more other nodes, including means for assigning a first status to the specified memory units, and means for changing the first status to a second status upon successfully communicating the second version thereto;

for at least one of said other nodes, third means for initiating a trial use of the second version in a processing unit of the one of said other nodes, including means for changing the status of memory units containing the second version to a third status;

fourth means for detecting whether the second version operates successfully or fails to operate successfully during the trial use;

said fourth means including, in response to a detection that the second version fails to operate successfully during the trial use means, for restoring the one of said other nodes to the first version, including means for changing the memory units containing the second version to the second status; and fifth means, in response to a detection that the second version operates successfully during the trial use, for designating the second version as a preferred version of system software, including means for changing the status of the memory units containing the second version to a fourth status.

13. The apparatus as in claim 12, further comprising means for performing a consistency check of the second version before transmitting the second version through the network.

14. The apparatus as in claim 13, comprising means for partitioning the second version into a number of modules and means for calculating a checksum for each module, and wherein the means for performing the consistency check further comprises means for checking checksums of the modules in the second version.

15. The apparatus as in claim 12, wherein the means for of initiating a trial use includes storage unit means for loading the second version for execution in the processing unit of the one of said other nodes.

16. The apparatus as in claim 12, wherein the detecting means includes means for monitoring for errors during the loading and execution of the second version.

17. The apparatus as in claim 12, wherein the detection means includes means for communicating at least one message between a node and another node in the network and means for monitoring for errors in communication of the message.

18. An apparatus as in claim 12, further comprising means, responsive to a failure in transmitting the second version to one of said one or more specified memory units, for locating a memory unit having a fourth status, means for copying the second version form the memory unit having the fourth status to said one of said one or more specified memory units, and means for changing the status of said one of said one or more specified memory units to the fourth status if the copying of the second version is successful.

19. An apparatus as in claim 12, further comprising in a node with one or more additional processing units, means for loading said one or more additional processing units with the second version after the second version has been designated as the preferred operational version.

20. An apparatus as in claim 12, further including, in a node with one ore more additional processing units, means for transferring processing from said processing unit to said one or more additional processing units in the node.

21. A network maintenance apparatus as in claim 12, further including means for receiving a command entered at one of the processing units for initiating a trial use by said third means.

* * * * *